(12) United States Patent
Sento

(10) Patent No.: US 11,575,830 B2
(45) Date of Patent: *Feb. 7, 2023

(54) IMAGE PROCESSING DEVICE AND ASSOCIATED METHODOLOGY FOR GENERATING PANORAMIC IMAGES

(71) Applicant: Sony Group Corporation, Tokyo (JP)

(72) Inventor: Kazuya Sento, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/230,361

(22) Filed: Apr. 14, 2021

(65) Prior Publication Data

US 2021/0235013 A1 Jul. 29, 2021

Related U.S. Application Data

(63) Continuation of application No. 16/253,821, filed on Jan. 22, 2019, now Pat. No. 11,025,819, which is a
(Continued)

(30) Foreign Application Priority Data

Aug. 2, 2011 (JP) .................................. 2011-168862

(51) Int. Cl.
*H04N 5/232* (2006.01)
*G06T 11/60* (2006.01)
(Continued)

(52) U.S. Cl.
CPC ......... *H04N 5/23238* (2013.01); *G03B 17/12* (2013.01); *G03B 17/20* (2013.01);
(Continued)

(58) Field of Classification Search
CPC ............. H04N 5/23238; H04N 5/2258; H04N 5/232935; H04N 5/232945; H04N 5/247;
(Continued)

(56) References Cited

U.S. PATENT DOCUMENTS 6,377,294 B2 4/2002 Toyofuku et al.
6,466,701 B1 10/2002 Ejiri et al.
(Continued)

FOREIGN PATENT DOCUMENTS

EP     1 750 431 A2    2/2007
EP       1850583 A2 * 10/2007 ............. G03B 37/00
(Continued)

OTHER PUBLICATIONS

Extended European Search Report dated Nov. 26, 2012, in European Patent Application No. 12177786.6.
(Continued)

*Primary Examiner* — Michael Lee
(74) *Attorney, Agent, or Firm* — Oblon, McClelland, Maier & Neustadt, L.L.P.

(57) ABSTRACT

One embodiment of an apparatus includes a reference position receiving unit configured to receive intermediate or end panorama reference position information input by a user, and a control unit configured to control an imaging device to begin generating a plurality of images to be used to generate a panoramic image based on the intermediate or end panorama reference position information input by the user after the reference position receiving unit receives the intermediate or end panorama reference position information.

13 Claims, 33 Drawing Sheets

Related U.S. Application Data continuation of application No. 15/079,578, filed on Mar. 24, 2016, now Pat. No. 10,237,474, which is a continuation of application No. 14/873,548, filed on Oct. 2, 2015, now Pat. No. 9,906,719, which is a continuation of application No. 13/551,663, filed on Jul. 18, 2012, now Pat. No. 9,185,287.

(51) Int. Cl.
| | | |
|---|---|---|
| G06T 5/00 | (2006.01) | |
| G06T 7/70 | (2017.01) | |
| G03B 37/02 | (2021.01) | |
| H04N 5/225 | (2006.01) | |
| H04N 5/247 | (2006.01) | |
| G03B 17/12 | (2021.01) | |
| G03B 17/20 | (2021.01) | |
| G03B 37/04 | (2021.01) | |
| G06T 3/40 | (2006.01) | |
| H04N 5/341 | (2011.01) | |
| H04N 5/347 | (2011.01) | |

(52) U.S. Cl.
CPC ............ *G03B 37/02* (2013.01); *G03B 37/04* (2013.01); *G06T 3/4038* (2013.01); *G06T 5/007* (2013.01); *G06T 5/009* (2013.01); *G06T 7/70* (2017.01); *G06T 11/60* (2013.01); *H04N 5/2258* (2013.01); *H04N 5/232935* (2018.08); *H04N 5/232945* (2018.08); *H04N 5/247* (2013.01); *H04N 5/347* (2013.01); *H04N 5/3415* (2013.01); *H04N 5/23216* (2013.01); *H04N 5/23293* (2013.01)

(58) Field of Classification Search
CPC .. H04N 5/3415; H04N 5/347; H04N 5/23216; H04N 5/23293; H04N 5/225; H04N 5/232; H04N 5/262; H04N 5/91; G03B 17/12; G03B 17/20; G03B 37/02; G03B 37/04; G06T 3/4038; G06T 5/007; G06T 5/009; G06T 7/70; G06T 11/60
USPC .......................................................... 348/36
See application file for complete search history.

(56) References Cited

U.S. PATENT DOCUMENTS

| | | | |
|---|---|---|---|
| 6,661,455 B1 | 12/2003 | Toyofuku et al. | |
| 6,930,703 B1* | 8/2005 | Hubel | G03B 37/04 |
| | | | 348/E5.042 |
| 7,042,504 B1 | 5/2006 | Toyofuku et al. | |
| 9,185,287 B2 | 11/2015 | Sento | |
| 10,237,474 B2 | 3/2019 | Senta | |
| 11,025,819 B2* | 6/2021 | Sento | G03B 17/20 |
| 2001/0026684 A1* | 10/2001 | Sorek | G03B 37/00 |
| | | | 348/E5.042 |
| 2004/0189849 A1 | 9/2004 | Hofer | |
| 2005/0168594 A1 | 8/2005 | Larson | |
| 2005/0185070 A1* | 8/2005 | Cheatle | H04N 5/232945 |
| | | | 348/E5.047 |
| 2005/0206743 A1 | 9/2005 | Sim | |
| 2005/0270385 A1 | 12/2005 | Shioya | |
| 2006/0039693 A1 | 2/2006 | Lee | |
| 2006/0238536 A1 | 10/2006 | Katayama et al. | |
| 2007/0025723 A1 | 2/2007 | Baudisch et al. | |
| 2007/0030341 A1 | 2/2007 | Morimoto | |
| 2007/0091124 A1 | 4/2007 | Hasegawa et al. | |
| 2007/0147812 A1 | 6/2007 | Nenonen | |
| 2007/0269193 A1 | 11/2007 | Erofeev et al. | |
| 2007/0269198 A1 | 11/2007 | Park et al. | |
| 2008/0066000 A1 | 3/2008 | Ofek et al. | |
| 2008/0074489 A1 | 3/2008 | Zhang | |
| 2008/0074506 A1* | 3/2008 | Oh | H04N 5/23238 |
| | | | 348/E5.042 |
| 2008/0158342 A1* | 7/2008 | Jeong | H04N 5/23238 |
| | | | 348/E7.091 |
| 2008/0180550 A1 | 7/2008 | Gulliksson | |
| 2008/0192125 A1 | 8/2008 | Kang et al. | |
| 2008/0204566 A1* | 8/2008 | Yamazaki | H04N 5/23258 |
| | | | 348/E5.022 |
| 2008/0252717 A1 | 10/2008 | Moon | |
| 2008/0310734 A1 | 12/2008 | Ahammad | |
| 2009/0021576 A1 | 1/2009 | Linder | |
| 2009/0058990 A1 | 3/2009 | Kim | |
| 2009/0115840 A1 | 5/2009 | Kim | |
| 2009/0153685 A1* | 6/2009 | Son | H04N 5/232935 |
| | | | 348/208.99 |
| 2009/0208062 A1 | 8/2009 | Sorek et al. | |
| 2009/0284582 A1 | 11/2009 | Mei et al. | |
| 2009/0290013 A1 | 11/2009 | Hayashi | |
| 2010/0006681 A1 | 1/2010 | Ryu et al. | |
| 2010/0331693 A1 | 12/2010 | Matsunaga et al. | |
| 2011/0012989 A1* | 1/2011 | Tseng | G03B 17/20 |
| | | | 348/E7.001 |
| 2011/0058015 A1 | 3/2011 | Moriyama | |
| 2011/0149015 A1 | 6/2011 | Lin | |
| 2011/0181690 A1 | 7/2011 | Yoshizumi | |
| 2011/0211038 A1 | 9/2011 | Noguchi et al. | |
| 2011/0234750 A1 | 9/2011 | Lai et al. | |
| 2012/0002019 A1 | 1/2012 | Hashimoto | |
| 2012/0120187 A1 | 5/2012 | Goto et al. | |
| 2012/0120188 A1 | 5/2012 | Arai et al. | |
| 2012/0176515 A1 | 7/2012 | Teo | |
| 2012/0320149 A1 | 12/2012 | Kim | |
| 2013/0033567 A1 | 2/2013 | Jeong | |
| 2013/0314493 A1 | 11/2013 | Sakanaba | |
| 2014/0218469 A1 | 8/2014 | Lee | |
| 2014/0285617 A1 | 9/2014 | Arai et al. | |
| 2017/0111583 A1 | 4/2017 | Kim | |

FOREIGN PATENT DOCUMENTS

| | | |
|---|---|---|
| EP | 2 164 244 A1 | 3/2010 |
| EP | 2 453 645 A1 | 5/2012 |
| JP | 3-265633 | 11/1991 |
| JP | 6-235981 | 8/1994 |
| JP | 8-265633 A | 10/1996 |
| JP | 11-8844 | 1/1999 |
| JP | 2000-175185 | 6/2000 |
| JP | 2002-90820 | 3/2002 |
| JP | 2002-223382 | 8/2002 |
| JP | 2005-229290 | 8/2005 |
| JP | 2006-217478 A | 8/2006 |
| JP | 2007-316982 | 12/2007 |
| JP | 2008-176430 | 7/2008 |
| JP | 2009-60278 A | 3/2009 |
| JP | 2009-232275 A | 10/2009 |
| JP | 2009-232276 | 10/2009 |
| JP | 2009-268037 | 11/2009 |
| KR | 10-0758632 B1 | 9/2007 |
| KR | 10-2008-0075954 A | 8/2008 |
| KR | 10-2010-0002231 | 1/2010 |
| WO | WO 2006/074161 A2 | 7/2006 |
| WO | WO 2008/087721 A1 | 7/2008 |
| WO | WO 2009/142327 A1 | 11/2009 |

OTHER PUBLICATIONS

Office Action dated Feb. 2, 2017 in Korean Patent Application No. 10-2012-0080914 (with English translation).

Office Action dated Jul. 4, 2017 in Korean Patent application 10-2017-0043102 with English Translation.

Office Action dated Feb. 27, 2018 in Korean Patent Application No. 10-2018-0007261, with English-language Translation, 6 pages.

(56) References Cited

OTHER PUBLICATIONS

Office Action dated Aug. 2, 2019 in corresponding Korean Patent Application No. 10-2019-0039435 (with English Translation), 6 pages.

\* cited by examiner

HOLD IMAGE

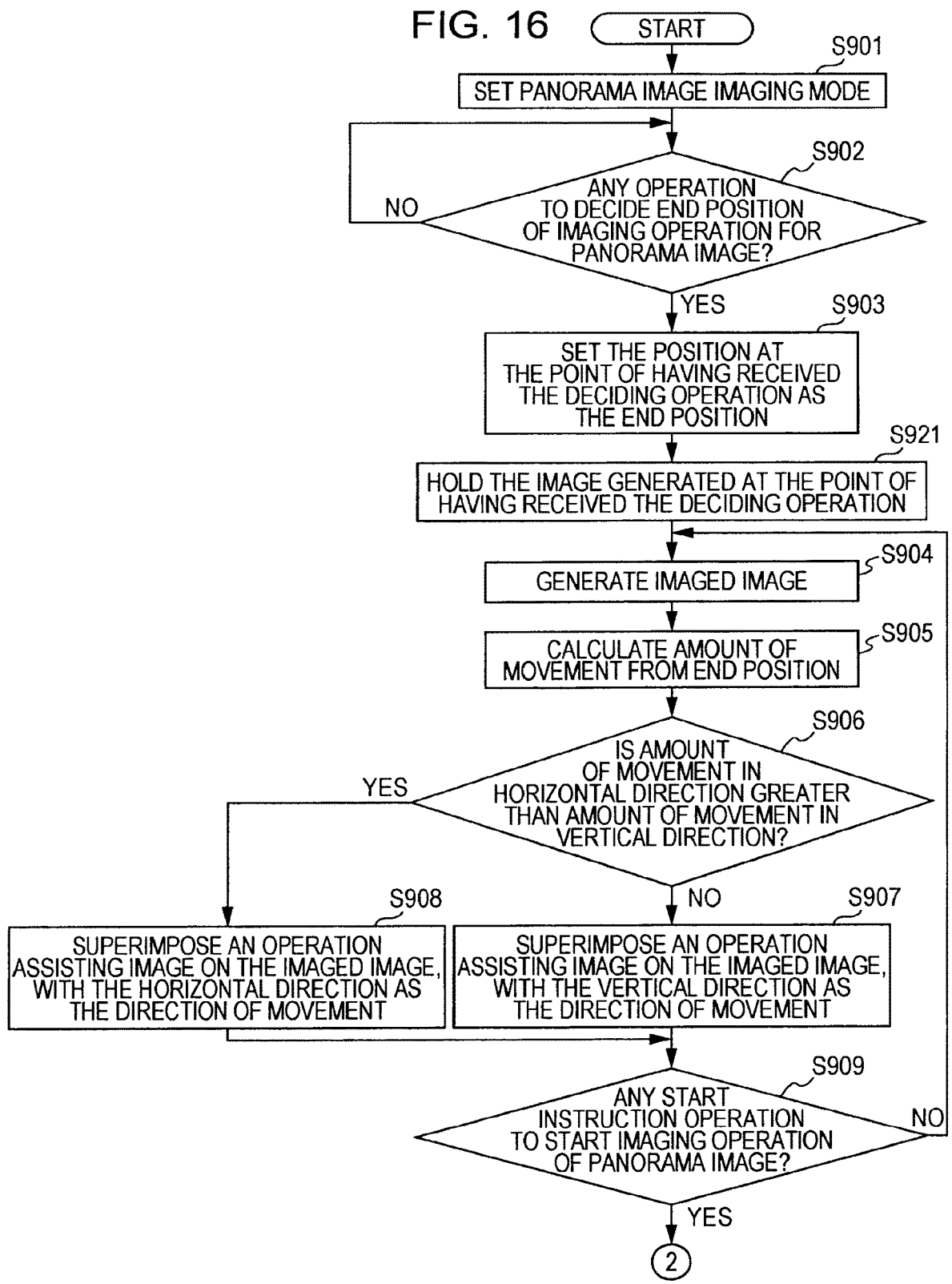

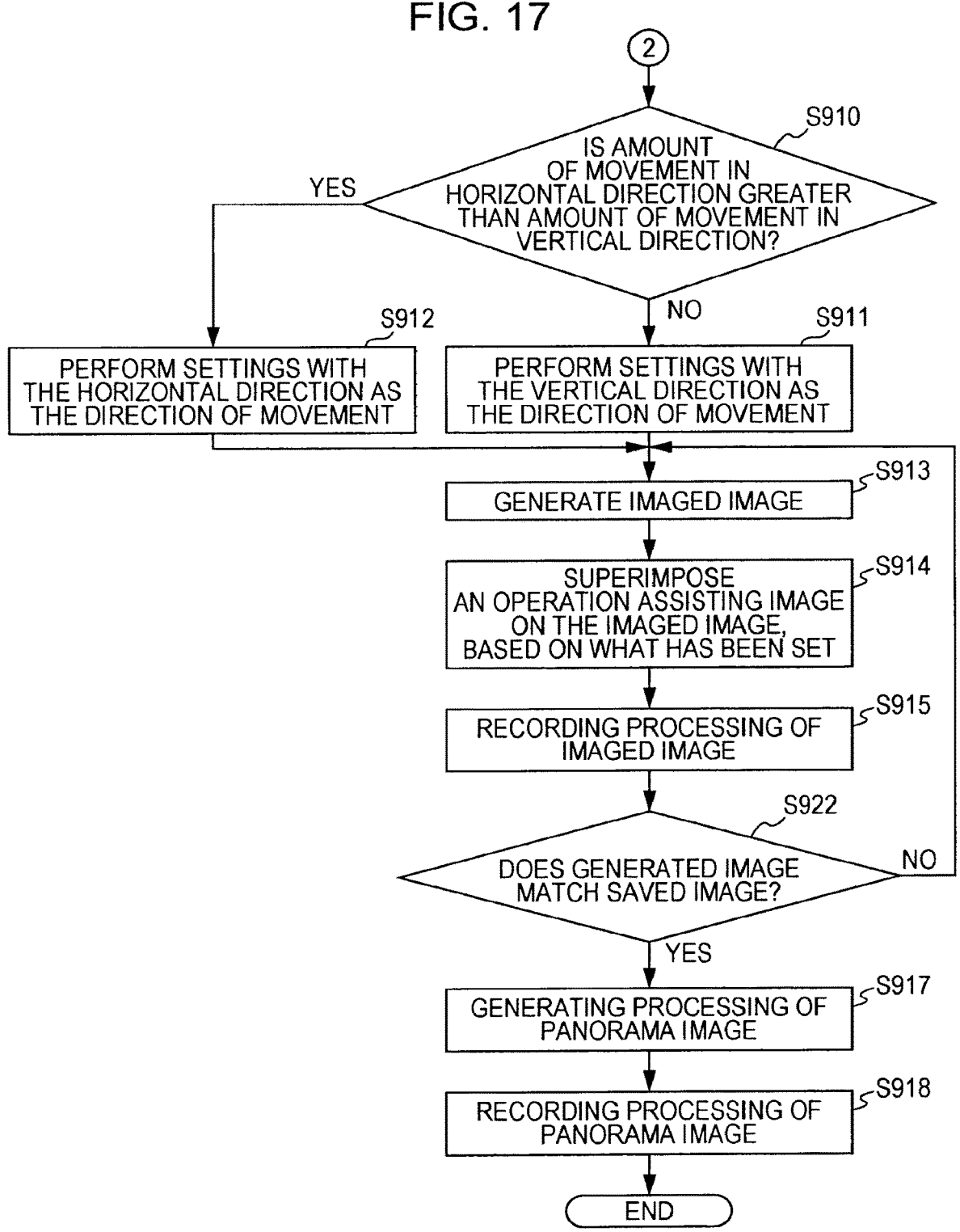

IMAGE PROCESSING DEVICE AND ASSOCIATED METHODOLOGY FOR GENERATING PANORAMIC IMAGES

CROSS-REFERENCE TO RELATED APPLICATIONS

The present application is a continuation of U.S. application Ser. No. 16/253,821, filed Jan. 22, 2019, which is a continuation of U.S. application Ser. No. 15/079,578 filed Mar. 24, 2016, which is a continuation of U.S. application Ser. No. 14/873,548 filed Oct. 2, 2015, which is a continuation of U.S. application Ser. No. 13/551,663 filed Jul. 18, 2012 and is based upon and claims the benefit of priority under 35 U.S.C. § 119 of Japanese Priority Patent Application JP 2011-168862 filed in the Japanese Patent Office on Aug. 2, 2011. The entire contents of each of which are hereby incorporated by reference.

BACKGROUND

The present technology relates to an image processing device, and more particularly relates to an image processing device which handles panorama images, a control method thereof, and a program encoded on a non-transitory computer readable medium causing a computer to execute the method.

As of recent, imaging apparatuses such as digital still cameras or the like which generate an image (image data) by imaging a subject such as scenery or the like, and record the generated image as an image file, have come into widespread use. Also, there have been proposed imaging apparatuses which generate multiple images continuously in time sequence, and use the multiple generated images to generate a panorama image including the subject over a relative wide range.

For example, there has been proposed an imaging apparatus which generates multiple image while moving the imaging apparatus along an arc of which the axis is behind the imaging apparatus (e.g., the position of the photographer), and uses the multiple images to generate a panorama image (e.g., Japanese Unexamined Patent Application Publication No. 2009-268037).

SUMMARY

According to the above-described related art, a panorama image imaging operation can be performed by the user moving the imaging apparatus along an arc while holding the imaging apparatus in the hand, so the user can perform the imaging operation in a relatively easy manner.

For example, in the event of performing a panorama image imaging operation with the above related art, the user visually confirms the subject of the panorama image by looking around, and then performs a start operation for the imaging operation. However, since a panorama image is an image including a subject over a relatively wide range, it can be expected that just the user visually confirming before the start operation for the imaging operation may not yield the imaging range which the user has intended. Accordingly, in order to generate a panorama image according to user preferences, it is important for a panorama image imaging range according to user preferences to be able to be easily decided.

It has been found desirable to enable a panorama image imaging range according to user preferences to be easily decided.

The present invention broadly comprises an image processing device, a control method thereof, and a program encoded on a non-transitory computer readable medium to cause a computer to execute the control method. In one embodiment, the image processing device includes: an operation accepting unit configured to accept a deciding operation to decide a reference position in a panorama image after starting an imaging operation of the panorama image using a plurality of image sequentially generated by an imaging unit which consecutively images subjects in time sequence, before starting the imaging operation of the panorama image; and a control unit configured to control deciding of an imaging range of the panorama image in the subject, based on the decided reference position. Accordingly, accepting the deciding operation to decide the reference position in the panorama image after starting the panorama image imaging operation, before starting of the panorama image imaging operation, has the effect of deciding the panorama image imaging operation based on the decided reference position.

In another embodiment, the apparatus includes a reference position receiving unit configured to receive intermediate or end panorama reference position information input by a user, and a control unit configured to control an imaging device to begin generating a plurality of images to be used to generate a panoramic image based on the intermediate or end panorama reference position information input by the user after the reference position receiving unit receives the intermediate or end panorama reference position information.

In a further embodiment, the apparatus includes a reference position receiving unit configured to receive panorama reference position information for a plurality of reference points input by a user, and a control unit configured to control an imaging device to begin generating a plurality of images to be used to generate a panoramic image based on the panorama reference position information for the plurality of reference points input by the user after the reference position receiving unit receives the panorama reference position information for the plurality of reference points.

In still a further embodiment, the apparatus includes a reference position receiving unit configured to receive an end panorama reference position image, and a control unit configured to control an imaging device to begin generating a plurality of images to be used to generate a panoramic image based on the end panorama reference position image input by the user after the reference position receiving unit receives the end panorama reference position image, and to control the imaging device to end generating the plurality of images when a current image matches the end panorama reference position image.

The image processing device may further include a display control unit configured to display, on an image generated by the imaging unit, an operation supporting screen representing the decided imaging range, during the imaging operation of the panorama image by the imaging unit. This has the effect of displaying, on an image generated by the imaging unit, an operation supporting screen representing the decided imaging range, during the imaging operation of the panorama image by the imaging unit.

The display control unit may display, of the subject included in images generated by the imaging unit, an image to identify a subject included in the decided imaging range, on the display unit as the operation supporting screen. This has the effect of displaying, of the subject included in images generated by the imaging unit, an image (operation supporting image) to identify a subject included in the decided imaging range.

The image processing device may further include an attitude detecting unit configured to detect change in the attitude of the imaging apparatus, with the display control unit changing the display form of the operation supporting screen based on the detected attitude change, which is displayed. This has the effect of changing the display form of the operation supporting screen based on the detected attitude change, which is displayed.

The display control unit may display an image representing the outline of a generally rectangular form corresponding to the panorama image, on the display unit as the operation supporting screen. This has the effect of displaying an image (operation supporting image) representing the outline of a generally rectangular form corresponding to the panorama image.

The operation accepting unit may accept setting operations to set the longitudinal direction size of the imaging range of the panorama image, with the control unit deciding the imaging range of the panorama image based on the set size and the decide reference position. This has the effect of deciding the panorama image imaging range based on the set size and decided reference position.

In a case where the panorama image is generated using a plurality of images generated by the imaging unit during turning motion of the imaging apparatus in a particular direction on an axis which is a position of the imaging apparatus or a position near the imaging apparatus, the operation accepting unit may accept the deciding operation deciding an end position of the turning movement to be the reference position; with the control unit determining whether or not an image generated by the imaging unit at the time of the deciding operation being accepted, and an image generated by the imaging unit after change in attitude of the imaging apparatus after the deciding operation, match, and in the event that these images match, effecting control to stop the imaging operation of the panorama image by the imaging unit. This has the effect of determining whether an image generated by the imaging unit at the time of the deciding operation deciding the end position (reference position) of the turning movement of the imaging apparatus being accepted, and an image generated by the imaging unit after change in attitude of the imaging apparatus after the deciding operation, match, and in the event that these images match, to stop the imaging operation of the panorama image.

In the event that the panorama image is generated using a plurality of images generated by the imaging unit during turning motion of the imaging apparatus in a particular direction on an axis which is a position of the imaging apparatus or a position near the imaging apparatus, the operation accepting unit may accept the deciding operation deciding an intermediate position of the turning movement to be the reference position; with the control unit deciding the start position and end position of imaging operation of the panorama image by the imaging unit, based on the decided intermediate position. This has the effect that, in the event that a deciding operation deciding the intermediate position (reference position) of the turning motion of the imaging apparatus is accepted, the start position and end position of the panorama image imaging operation are decided based on the decided intermediate position.

The image processing device may further include: an attitude detecting unit configured to detect change in the attitude of the imaging apparatus; wherein, in the event that the turning motion of the imaging apparatus in a particular direction on an axis which is a position of the imaging apparatus or a position near the imaging apparatus is detected as the attitude change, the control unit decides the imaging range of the panorama image such that the particular direction is the longitudinal direction thereof, and in the event that the turning motion of the imaging apparatus in an orthogonal direction orthogonal to the particular direction on an axis which is a position of the imaging apparatus or a position near the imaging apparatus is detected as the attitude change, the control unit decides the imaging range of the panorama image such that the orthogonal direction is the longitudinal direction thereof. This has the effect that, in the event that turning motion of the imaging apparatus in a particular direction is detected, a panorama image imaging range with the particular direction as the longitudinal direction is decided, and in the event that turning motion of the imaging apparatus in an orthogonal direction is detected, a panorama image imaging range with the orthogonal direction as the longitudinal direction is decided.

The image processing device may further include: a first imaging unit; and a second imaging unit disposed so as to have an optical axis direction different from the optical axis direction of the imaging unit; wherein, in the event that the panorama image is generated using a plurality of images generated by the imaging unit during turning motion of the imaging apparatus in a particular direction on an axis which is a position of the imaging apparatus or a position near the imaging apparatus, the operation accepting unit accepts the deciding operation deciding an intermediate position of the turning movement to be the reference position; and wherein, in the event that the deciding operation is accepted in a state where the optical axis direction of the second imaging unit faces the start position or end position in the imaging operation of the panorama image, the control unit decides the imaging range of the panorama image based on the positional relation between the first imaging unit and the second imaging unit. This has an effect that, in the event that a deciding operation deciding the intermediate position (reference position) of turning motion of the imaging apparatus in a state with the optical axis direction of the second imaging unit toward the start position or end position in the panorama image imaging operation, the panorama image imaging range is decided based on the placement relation between the first imaging unit and the second imaging unit.

The second imaging unit may generate a plurality of images under exposure conditions different from exposure conditions of the first imaging unit during imaging operations of the panorama image; with a plurality of images generated by the first imaging unit, and a plurality of images generated by the second imaging unit, being combined to generated the panorama image, in which at least a partial region has an expanded dynamic range. This has the effect that, by combining multiple images generated by the first imaging unit, and multiple images generated by the second imaging unit, a panorama image is generated in which at least a partial region has an expanded dynamic range.

According to the present technology, an excellent advantage can be had in that a panorama image imaging range according to user preferences can be easily decided.

BRIEF DESCRIPTION OF THE DRAWINGS

FIG. 16 is a flowchart illustrating an example of processing procedures of imaging control processing by the imaging apparatus according to the second embodiment of the present technology;

FIG. 17 is a flowchart illustrating an example of processing procedures of imaging control processing by the imaging apparatus according to the second embodiment of the present technology;

DETAILED DESCRIPTION OF EMBODIMENTS

Figure 1:
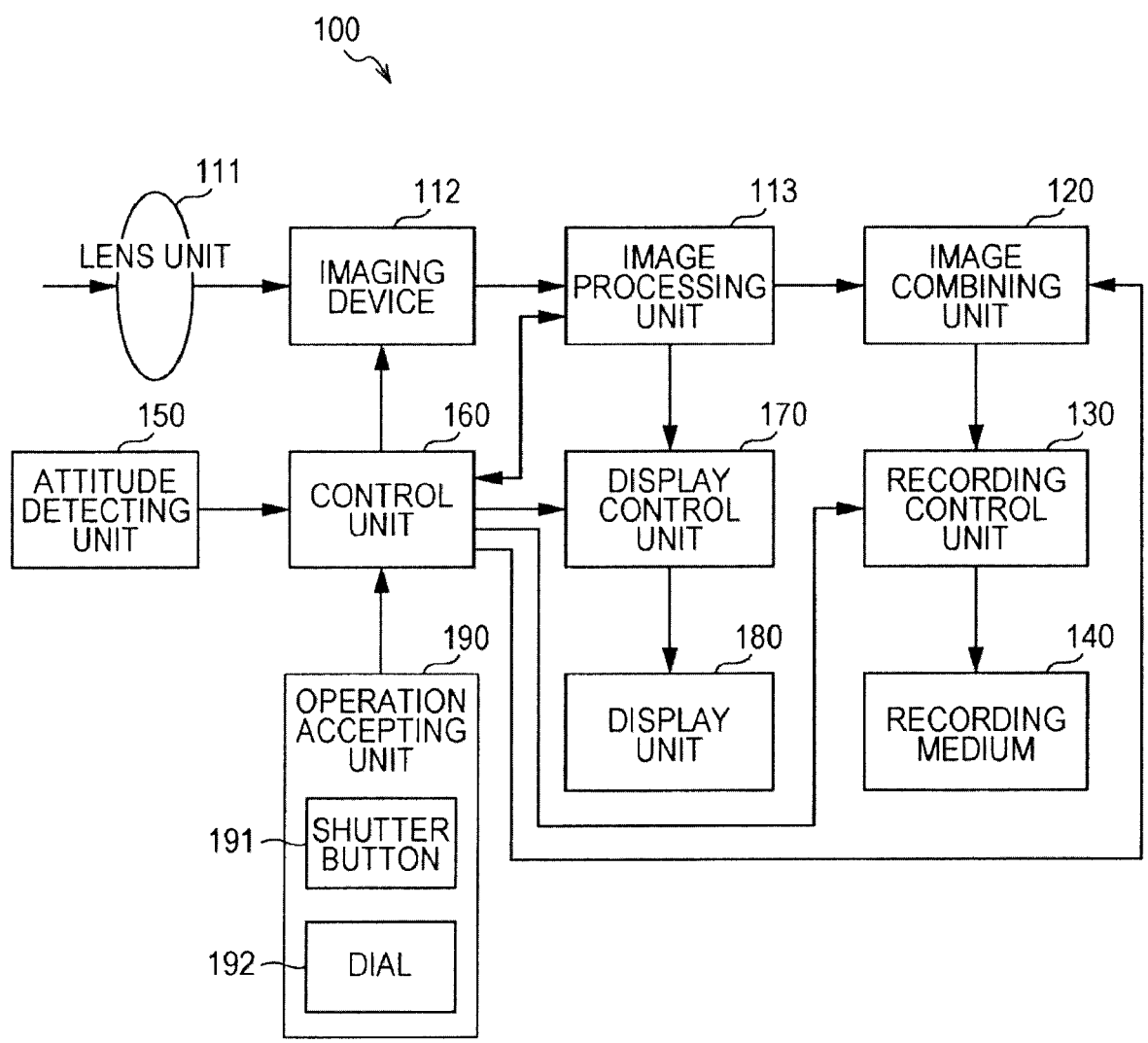
FIG. 1 is a block diagram illustrating a functional configuration example of an imaging apparatus according to a first embodiment of the present technology.

The following is a description of embodiments for carrying out the present technology (hereinafter referred to as "embodiments"). Description will be made in the following order.
1. First Embodiment (example of deciding imaging range of panorama image based on a reference position in the panorama image decided by user operations)
2. Second Embodiment (example of deciding ending timing of imaging operation of panorama image based on matching processing using a reference position in the panorama image decided by user operations)
3. Third Embodiment (example of deciding intermediate position in panorama image as reference position)
4. Fourth Embodiment (example of performing imaging operation of panorama image using imaging apparatus having multiple imaging units)
5. Modifications
1. First Embodiment Functional Configuration Example of Imaging Apparatus FIG. 1 is a block diagram illustrating a functional configuration example of an imaging apparatus 100 according to a first embodiment of the present technology.

The imaging apparatus 100 includes a lens unit 111, an imaging device 112, an image processing unit 113, an image combining unit 120, a recording control unit 130, a recording medium 140, an attitude detecting unit 150, a control unit 160, a display control unit 170, a display unit 180, and an operation accepting unit 190. The imaging apparatus 100 can be realized by a digital still camera which is capable of generating multiple images (image data) by imaging a subject, for example, and performing various types of image processing regarding these multiple images.

The lens unit 111 is configured of multiple lenses which collect light from the subject (zoom lens, focusing lens, etc.), and supplies the light from the subject that has been input via these lenses and an iris to the imaging device 112.

Based on the control of the control unit 160, the imaging device 112 converts the incident light form the subject to generate an image (image data), and the generated image is supplied to the image processing unit 113. Specifically, an optical image of the subject input via the lens unit 111 is imaged on the imaging face of the imaging device 112, and an image (image data) is generated by the imaging device 112 performing an imaging operation in this state. Also, in the event that a panorama image imaging mode has been set, the imaging device 112 sequentially generates multiple images by consecutively imaging the subject in time sequence, and supplies the multiple imaged images to the image processing unit 113. Examples of the imaging device 112 which can be used include a CCD (Charge Coupled Device), a CMOS (Complementary Metal Oxide Semiconductor), or the like.

Based on the control of the control unit 160, the image processing unit 113 performs various types of image processing based on the image (image data) generated by the imaging device 112, and supplies the image (image data) which has been subjected to the image processing to the image combining unit 120 and display control unit 170.

The image processing unit 113 temporarily holds the image (image data) generated by the imaging device 112 in image memory (not shown) for example, and performs image processing on the image held therein. The image memory is configured of DRAM (Dynamic Random Access Memory), for example.

For example, the image processing unit 113 performs image processing for display regarding the image (image data) generated by the imaging device 112, and outputs the image subjected to this image processing to the display control unit 170 so as to be displayed on the display unit 180. Also, in the event that the panorama image imaging mode has been set, the image processing unit 113 perform image processing for panorama image regarding the image (image data) generated by the imaging device 112, and outputs to the image combining unit 120.

Also, in the event that the panorama image imaging mode has been set, the image processing unit 113 detects the amount of movement and the direction of movement between images adjacent on the temporal axis, for the images held in the image memory (not shown). The image processing unit 113 then outputs information relating to the amount of movement and the direction of movement (movement information) that has been detected to the image combining unit 120 and control unit 160. For example, the image processing unit 113 performs matching processing between the pixels making up the two adjacent images (i.e., matching processing to distinguish imaging regions of the same subject), and calculates the number of pixels for the movement between the images. In the matching processing, processing is performed assuming that the subject is basically still. Note that in the event that the subject includes moving bodies, motion vectors which differ from the motion vector of the overall image are detected, and the motion vectors corresponding to these moving bodies are processed as being exempt from detection. That is to say, only a motion vector (global motion vector, also abbreviated to "GMV") corresponding to the motion of the overall image occurring due to motion of the imaging apparatus 100 is detected.

Based on the control of the control unit 160, the image combining unit 120 generates a panorama image using the multiple images supplied from the image processing unit 113, and supplies the generated panorama image to the recording control unit 130. For example, the image combining unit 120 temporarily holds the multiple images supplied from the image processing unit 113 in image memory (not shown), and generates a panorama image using these multiple images that are held.

In another embodiment, the apparatus 100 is in communication with a server, and transmits the multiple images supplied from the image processing unit 113 to the server. The server then generates the panoramic image and sends the panoramic image to apparatus 100. The apparatus 100 may be a mobile phone in such an embodiment.

Also, based on the analysis results output from the control unit 160 (the analysis results of amount in change of the attitude of the imaging apparatus 100), the image combining unit 120 calculates the regions to be combined in each of the multiple images held in the image memory (not shown). The image combining unit 120 then extracts images from the regions to be combined of each of the multiple images, and generates a panorama image by combining these extracted images. In this case, the image combining unit 120 overlays and combines the extracted images based on the movement information (amount of movement and the direction of movement) output from the image processing unit 113.

Under control of the control unit 160, the recording control unit 130 performs control to record the image (image data) subjected to image processing by the image processing unit 113 in the recording medium 140. Also, in the event that the panorama image imaging mode has been set, the recording control unit 130 records the panorama image (image data) generated by the image combining unit 120 in the recording medium 140.

The recording medium 140 is a device which records images subjected to image processing by the image processing unit 113 and panorama images generated by the image combining unit 120 as image files (image contents), under control of the recording control unit 130. For example, various types of data such as JPEG format image data or the like are recorded in the recording medium 140. The recording medium 140 may be built into the imaging apparatus 100, or may be detachable from the imaging apparatus 100. Examples of the recording medium 140 which can be used include various types of recording media such as semiconductor memory, optical recording media, magnetic disks, HDD (Hard Disk Drive), and so forth. Note that examples of optical recording media include recordable DVDs (Digital Versatile Disk), recordable CDs (Compact Disc), Blu-ray discs (registered trademark), and so forth.

The attitude detecting unit 150 detects change in the imaging apparatus 100 by detecting acceleration, motion, tile, and the like of the imaging apparatus 100, and outputs attitude information relating to change in attitude that has been detected to the control unit 160. An example of the attitude detecting unit 150 which can be used is a gyro sensor. This gyro sensor detects the angular acceleration of the imaging apparatus 100, whereby change in attitude of the imaging apparatus 100 is detected. Note that an arrangement may be made where a sensor other than a gyro sensor (e.g., an acceleration sensor) is used to detect the acceleration, motion, tilt, and so forth of the imaging apparatus 100, so as to detect the attitude and the change thereof of the imaging apparatus 100.

Under control of the control unit 160, display control unit 170 displays various types of images on the display unit 180. For example, the display control unit 170 displays the image supplied from the image processing unit 113 as a display image (e.g., a live view image (also called "LV image")) on the display unit 180. The display control unit 170 displays various setting screens (e.g., an image size setting screen 300 shown in FIG. 3) on the display unit 180. Also, the display control unit 170 combines images (e.g., operation supporting images 317 and 318 shown in FIG. 6B) with images supplied from the image processing unit 113 (e.g., LV images) so as to be displayed on the display unit 180.

For example, while performing a panorama image imaging operation, the display control unit 170 overlaps an operation supporting image representing the imaging range of the panorama image upon an image supplied from the image processing unit 113 (e.g., LV image). This operation supporting image is an image for identifying, out of the subjects included in an LV image, an image of a subject included in the imaging range of the panorama image (e.g., an image representing a generally rectangular shape corresponding to the panorama image) as shown in FIGS. 6B, 7B, 8B, 9B, and 10B. Also, the display control unit 170 changes the display form of the operation supporting image based on change in the attitude detected by the attitude detecting unit 150, as shown in FIGS. 6B, 7B, 8B, 9B, and 10B. That is to say, the display control unit 170 causes display to be performed such that the operation supporting image moves based on the analysis results output from the control unit 160 (the analysis results of the amount of change in attitude of the imaging apparatus 100).

Figure 3:
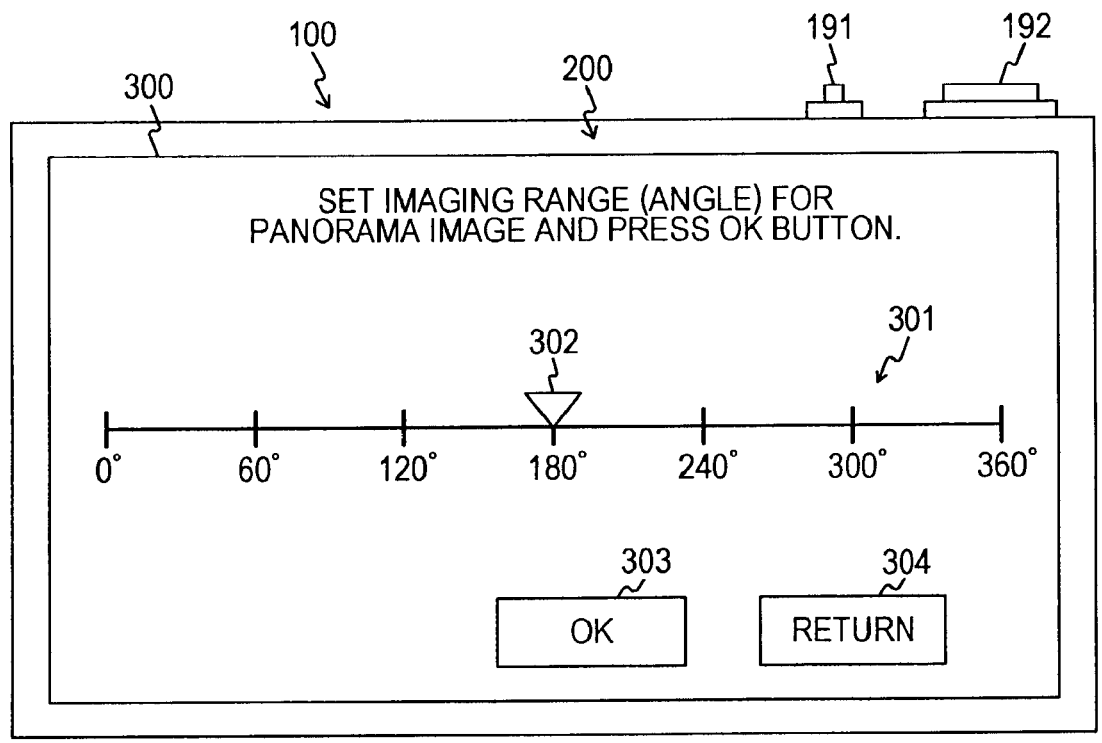
FIG. 3 is a diagram illustrating an example of a settings screen (image size setting screen) displayed on an input/output panel of the imaging apparatus according to the first embodiment of the present technology.

The display unit 180 is a display unit which displays various types of images under control of the display control unit 170. The display unit 180 sequentially displays images generated by the imaging device 112 as LV images. Note that an example of the display unit 180 which can be used is a display panel such as an organic EL (Electro Luminescence) panel or the like. Also, a touch panel whereby the user can perform operations by bringing his/her fingers into contact or in close proximity to the display screen thereof may be used, as shown in FIG. 3.

Figure 6A:
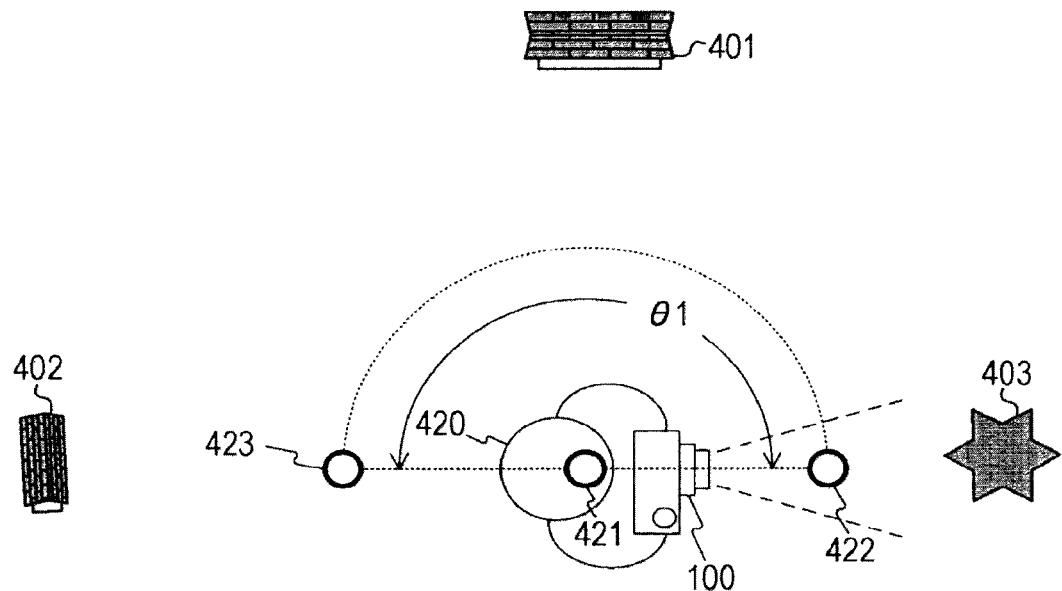
FIG. 6A is a diagram schematically illustrating a transition example of the attitude of the imaging apparatus according to the first embodiment of the present technology and a display screen displayed on the input/output panel.

The operation accepting unit 190 is an operation accepting unit which accepts operation input from user operations, and outputs operation signals corresponding to the accepted operation input to the control unit 160. The operation accepting unit 190 includes operating members such as a shutter button 191 and a dial 192 and so forth. As shown in FIG. 6A, for example, the operation accepting unit 190 accepts operations for deciding a reference position (e.g., an end position) in a panorama image after panorama image imaging operations have started, before starting the panorama image imaging operation. Also, the operation accepting unit 190 accepts setting operations to set the size (image size) of the panorama image in the longitudinal direction of the imaging range of the panorama image, as shown in FIG. 3 for example. Note that the display unit 180 and operation accepting unit 190 may be integrally formed as an input/output panel 200, as shown in FIG. 2B.

The control unit 160 controls the members of the imaging apparatus 100 based on the operating signals from the operation accepting unit 190 and the attitude information from the attitude detecting unit 150. For example, in the event that an imaging mode setting operation has been accepted by the operation accepting unit 190, the control unit 160 sets the imaging mode corresponding to that setting operation. Note that with the first embodiment of the present technology, a case will be described in which the panorama image imaging mode is set to generate a panorama image, as an example. Also, in the event that a setting operation for image size (shown in FIG. 3) is accepted by the operation accepting unit 190, the image size is set according to that setting operation.

Also, based on the attitude information output from the attitude detecting unit 150 the control unit 160 analyzes the amount of change of attitude of the imaging apparatus 100 (direction of movement, amount of movement, etc.), and outputs the analysis results thereof to the image combining unit 120 and the display control unit 170.

Also, in the event that a deciding operation to decide a reference position (e.g., end position) has been accepted by the operation accepting unit 190, the control unit 160 effects control to decide the imaging range of the panorama image based on the decided reference position. As shown in FIG. 6A, the imaging range of the panorama image (e.g., a rotational angle identified by a start position 423 and end position 422) is decided based on a set image size (e.g., θ1) and the decided reference position (e.g., end position 422). This having been decided decides the panorama image imaging range of the subject.

External Configuration Example of Imaging Apparatus

Figure 2A:
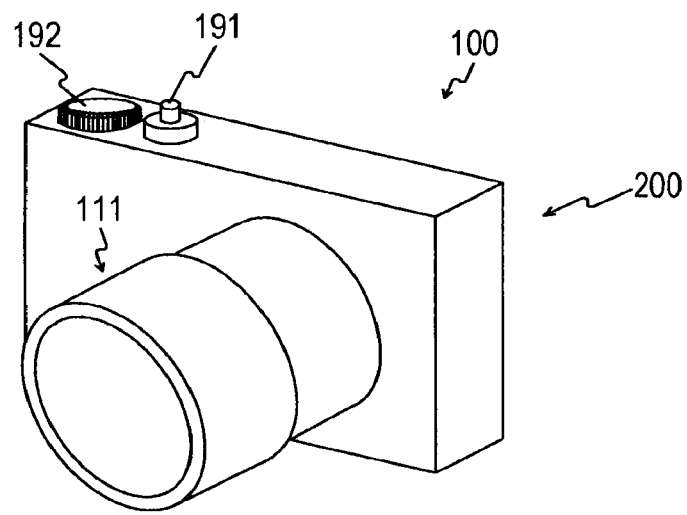
FIG. 2A is a perspective view showing an external view of the imaging apparatus according to the first embodiment of the present technology.
Figure 2B:
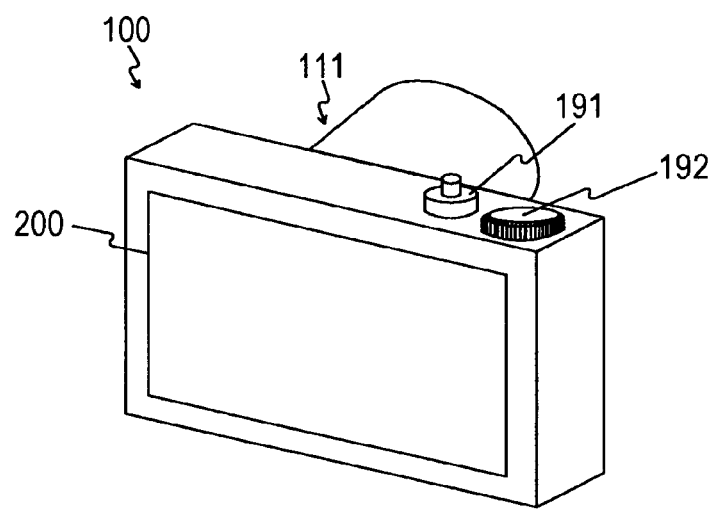
FIG. 2B is another perspective view showing another external view of the imaging apparatus according to the first embodiment of the present technology.

FIGS. 2A and 2B are perspective views showing external views of the imaging apparatus 100 according to the first embodiment of the present technology. FIG. 2A is a perspective view illustrating the outer view of the frontal side of the imaging apparatus 100 (i.e., the face where the lens unit 111 to be directed toward the subject is provided). Also, FIG. 2B is a perspective view illustrating the outer view of the rear side of the imaging apparatus 100 (i.e., the face where the input/output panel 200 to be directed toward the photographer is provided).

The imaging apparatus 100 has a lens unit 111, shutter button 191, dial 192, and input/output panel 200. Note that while the imaging apparatus 100 has other operating members such as a power switch, mode switchover switch, zoom button, and so forth, illustration and description thereof will be omitted here.

The shutter button 191 is a button pressed by the user at the time of recording an image (image data) generated by the imaging device 112 as an image content. For example, in a case where a still image imaging mode has been set to record a still image, and the shutter button 191 is half-pressed, focusing control is effected to perform autofocusing. Also, in the event that the shutter button 191 is fully pressed, the focus control is effected, and the image generated by the imaging device 112 at the time of fully pressing is recorded in the recording medium 140 as an image file (still image file). Pressing operations of the shutter button 191 in the event that the panorama image imaging mode has been set will be described in detail with reference to FIGS. 5A through 10B and others.

The dial 192 is a dial used to perform various types of adjustment or the like. For example, the dial 192 is operated to set the imaging range (image size) of a panorama image.

The input/output panel 200 displays various types of images, and also accepts operation input from the user by detecting touch operations on the input/output panel 200. The input/output panel 200 is realized by a touch panel, for example. The input/output panel 200 corresponds to the display unit 180 and operation accepting unit 190 shown in FIG. 1.

Note that with the description of the first embodiment of the present technology, a rotating operation where the imaging apparatus 100 is rotated in a particular direction (e.g., horizontal direction, vertical direction) with the current position of the imaging apparatus 100 (or a position nearby the imaging apparatus 100 (e.g., a position behind)) as an axis will be called a "swing operation". Also, the operation direction thereof will be called "swing direction". Such rotation of apparatus 100 may be performed by the user, by another apparatus attached to the apparatus 100, or by a rotary actuator included in apparatus 100.

Example of Image Size Setting Screen

FIG. 3 is a diagram illustrating an example of a setting screen (image size setting screen 300) displayed on the input/output panel 200 of the first embodiment of the present technology.

The image size setting screen 300 is a screen displayed on the input/output panel 200 at the time of setting the imaging range (image size) of a panorama image. For example, the image size setting screen 300 is displayed immediately following performing a setting operation for the panorama image imaging mode. Also, the imaging range (image size) of the panorama image set at the image size setting screen 300 is the imaging range (image size) in the swing direction of the imaging apparatus 100.

The image size setting screen 300 is provided with an image size specifying bar 301, a specified position identifier 302, an OK button 303, and a return button 304.

The image size specifying bar 301 is a bar used to specify the panorama image imaging range (image size), and is displayed with the specified position identifier 302 displayed thereupon. For example, in the event that up to 360° can be specified as the panorama image imaging range (image size), "0°" is displayed at one end of the image size specifying bar 301 and "360°" at the other end thereof. Also, numerical values (e.g., 60°, 120°, and so on) are displayed at fixed intervals (e.g., at 60° intervals) are displayed on the image size specifying bar 301.

The panorama image imaging range (image size) can be specified by the user moving the specified position identifier 302 along the image size specifying bar 301 to the desired position. This moving operation of the specified position identifier 302 can be performed by operating the dial 192, or a touch operation on the input/output panel 200, for example.

The OK button 303 is a button pressed after a specification operation has been made to specify the panorama image imaging range (image size) to OK what has been specified. Also, information (image size information) relating to the panorama image imaging range (image size) decided by the operation of pressing the OK button 303 is output to the control unit 160 and held.

The return button 304 button is a button pressed in the case of returning to the display screen displayed immediately before, for example.

Note that with this example, an example is illustrated of specifying the image size using the image size specifying bar 301, but the image size may be specified by button pressing operations, or input operations in which numerical values are input, for example. For example, a selecting operation may be made in which the user selects a desired image size from multiple types of image sizes (e.g., image size button pressing operation). Also, the image size may be set by the user performing an input operation (e.g., input operation of numerical values of the image size (angle)).

Also, with this example, an example is illustrated of specifying the panorama image imaging range (image size) by user operations, but the imaging range may be set beforehand. For example, 180° may be set as a reference size.

Example of Relation Between Imaging Operation and Panorama Image

Figure 4A:
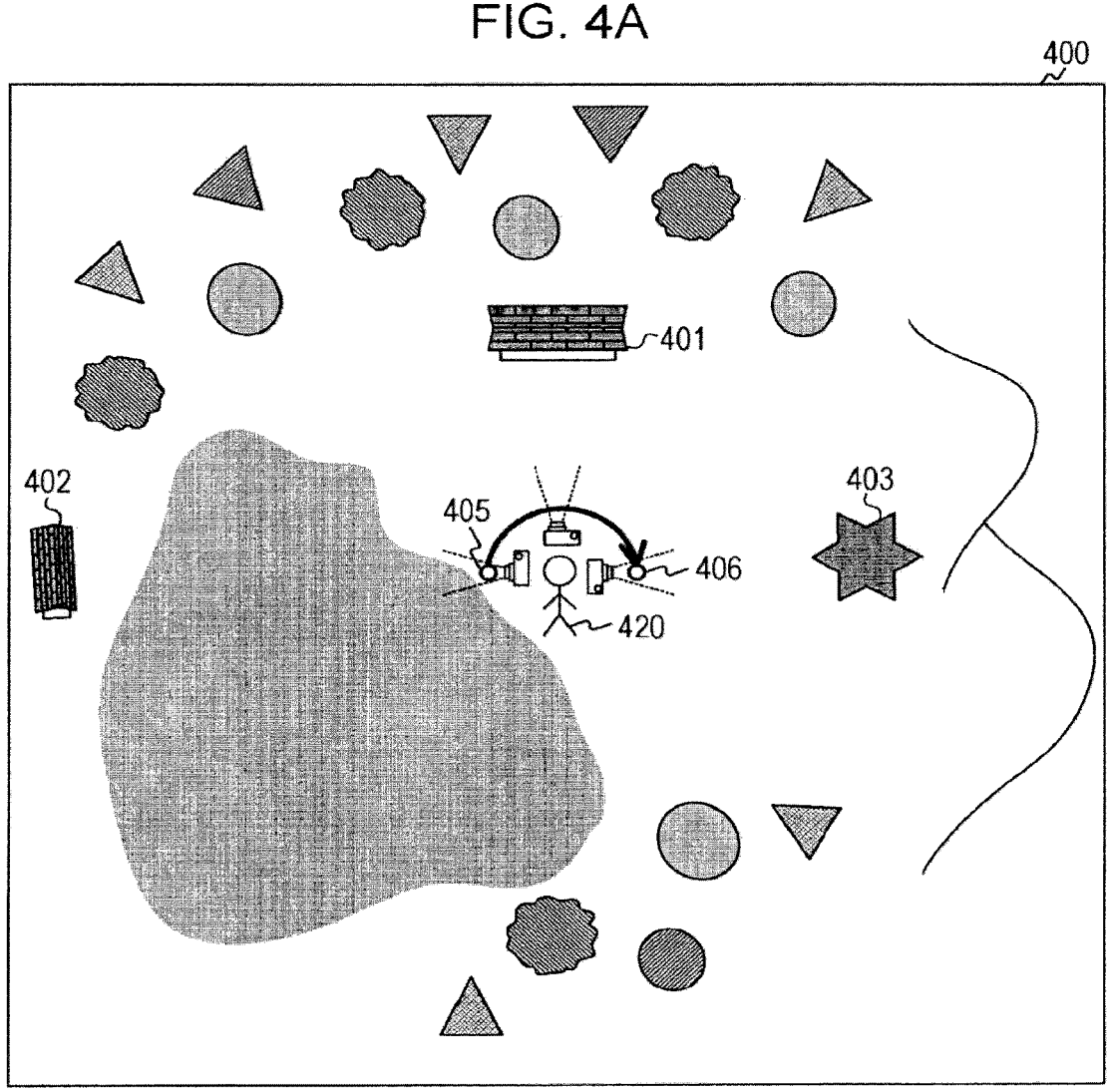
FIG. 4A is an image illustrating an example of a relation between an imaging operation in the case of generating a panorama image using the imaging apparatus according to the first embodiment of the present technology, and the panorama image taken by this imaging operation.
Figure 4B:
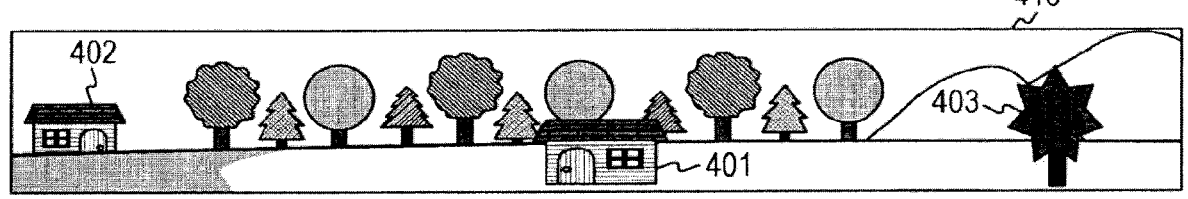
FIG. 4B is another image illustrating an example of a relation between an imaging operation in the case of generating a panorama image using the imaging apparatus according to the first embodiment of the present technology, and the panorama image taken by this imaging operation.

Next, a case of performing an imaging operation using the imaging apparatus 100 will be described. FIGS. 4A and 4B are images illustrating an example of a relation between an imaging operation in the case of generating a panorama image using the imaging apparatus 100 according to the first embodiment of the present technology, and the panorama image taken by this imaging operation.

FIG. 4A is a plan view illustrating a place 400 which is an object of imaging in the case of generating a panorama image using the imaging apparatus 100. The place 400 is a place including mountains, buildings 401 and 402, a large tree 403, a lake, and so forth, which are illustrated in a simplified manner in FIG. 4A to facilitate description. Also, FIG. 4A illustrates an example of performing a swing operation of the imaging apparatus 100 from the left side to the right side in a case where 180° has been set as the image size. In FIG. 4A, an example is illustrated of generating a panorama image by the user operating the imaging apparatus 100 such that the buildings 401 and 402 and the large tree 403 will be included in the panorama image. Note that the terms left and right as used in the embodiments of the present technology mean left and right with the user operating the imaging apparatus 100 as a reference.

FIG. 4B illustrates a panorama image 410 generated by the imaging operation shown in FIG. 4A. That is to say, the panorama image 410 is a panorama image including the buildings 401 and 402 and the large tree 403. We will thus assume a case where a user 420 wandering along the lakeside desires a panorama image including the buildings 401 and 402 and the large tree 403. In this case, the user 420 has to start the panorama image imaging operation at a start position 405 of the imaging operation and end the panorama image imaging operation at an end position 406 of the imaging operation.

In order to perform such an imaging operation, the user 420 has to look around the place 400, comprehend the imaging range of the panorama image, and start the imaging operation. However, it can be expected to be difficult to look around the place 400 and accurately comprehend the imaging range of the panorama image visually. Also, in the event that accurately comprehending the imaging range of the panorama image is difficult, the panorama image which the user 420 desires (a panorama image including the buildings 401 and 402 and the large tree 403) may not be generated.

Now, with the first embodiment of the present technology, an example will be illustrated where the deciding operation to decide the reference position in the panorama image after the panorama image imaging operation has started, is accepted before starting the panorama image imaging operation, and the panorama image imaging range is decided based on the decided reference position.

Example of Panorama Image Imaging Operation

FIGS. 5A through 10B are diagrams illustrating a transition example of the attitude of the imaging apparatus 100 according to the first embodiment of the present technology and a display screen displayed on the input/output panel 200. That is to say, FIGS. 5A, 6A, 7A, 8A, 9A, and 10A illustrate an example of transition of the attitude of the imaging apparatus 100. Note that in FIGS. 5A, 6A, 7A, 8A, 9A, and 10A, only the buildings 401 and 402 and the large tree 403 in the place 400 shown in FIG. 4A are shown, and others are omitted from illustration. Also, FIGS. 5B, 6B, 7B, 8B, 9B, and 10B illustrate an example of transition of the display screen displayed on the input/output panel 200 in accordance with change in the attitude of the imaging apparatus 100. FIGS. 5A through 10B illustrate an example of an imaging operation in a case that the image size has been set to 180°.

Figure 5A:
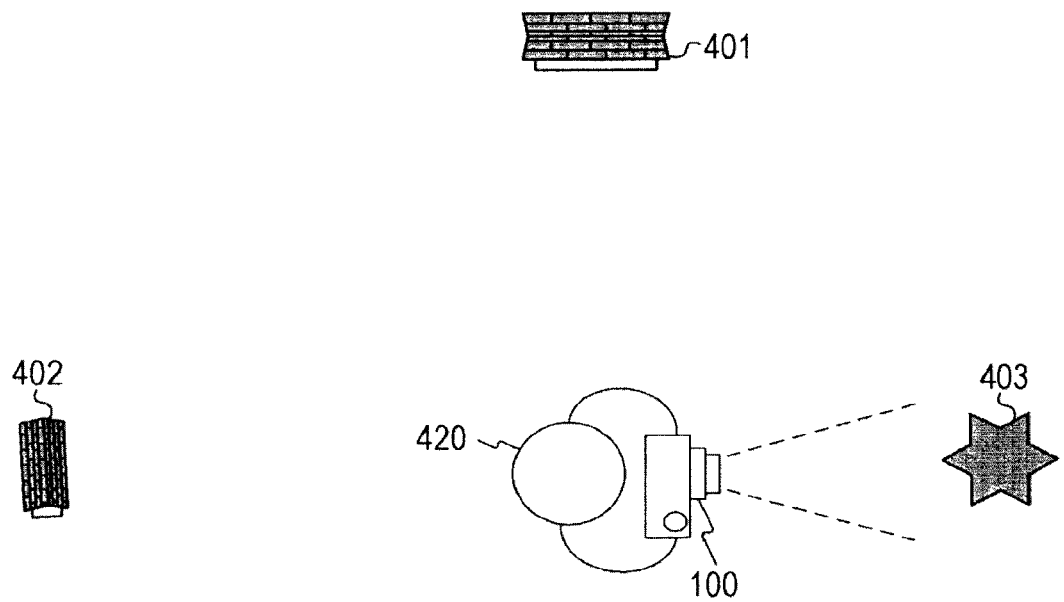
FIG. 5A is a diagram schematically illustrating a transition example of the attitude of the imaging apparatus according to the first embodiment of the present technology and a display screen displayed on the input/output panel.

FIG. 5A illustrates a state of the imaging apparatus 100, and the user 420 in a state of holding the imaging apparatus 100 in both hands, as viewed from above in a simplified manner. We will say that the user 420 is watching the LV image displayed on the input/output panel 200 while confirming the end position of the panorama image, for example.

Figure 5B:
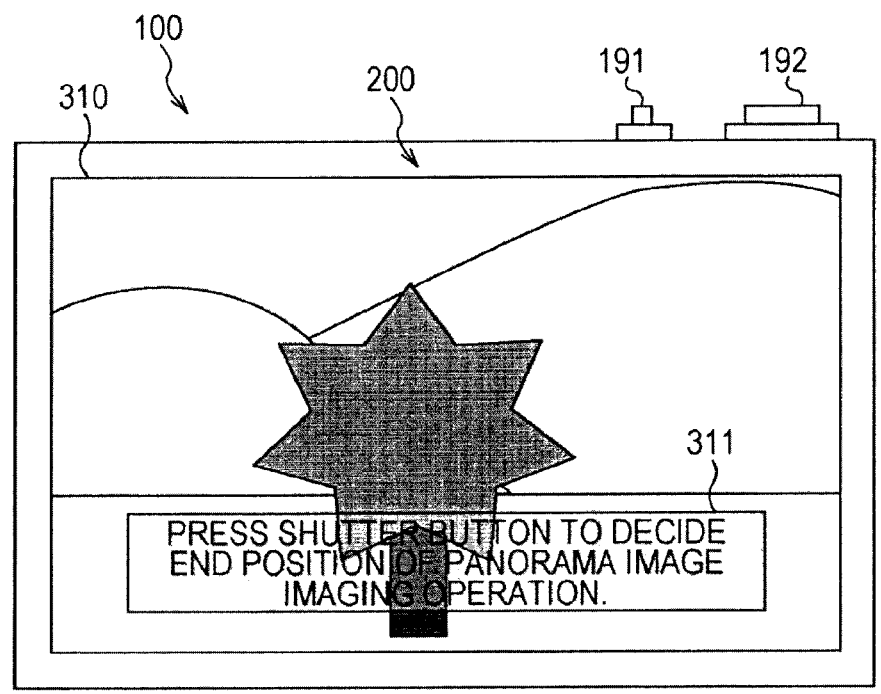
FIG. 5B is another diagram schematically illustrating a transition example of the attitude of the imaging apparatus according to the first embodiment of the present technology and a display screen displayed on the input/output panel.

FIG. 5B illustrates a display screen 310 displayed before the deciding operation to decide the end position of the panorama image is performed. The display screen 310 has the subject which is currently to be imaged displayed as an LV image, and a message display region 311 displayed superimposed on the LV image.

The message display region 311 is a region where messages for supporting operations performed by the user 420 are displayed. A message prompting the user to decide the end position of the panorama image imaging operation, for example, is displayed on the message display region 311.

For example, we will assume a case where the user 420 has set the panorama image imaging mode. For example, upon turning the power of the imaging apparatus 100 on, the imaging apparatus 100 starts up, and an LV image is displayed on the input/output panel 200. The 420 decides the end position (the position corresponding to the right end of the panorama image) out of the imaging range corresponding to the panorama image, while viewing the LV image displayed on the input/output panel 200. For example, in the case of deciding an imaging range including the large tree 403 as the end position as shown in FIG. 5B, the user 420 performs a full pressing operation (deciding operation) of the shutter button 191 in the state shown in FIG. 5A. In the event that a deciding operation of the end position has thus been performed, the control unit 160 decides the attitude of the imaging apparatus 100 at the time that this deciding operation was made to be the reference attitude of the imaging apparatus 100. That is to say, the attitude relating to the attitude information output from the attitude detecting unit 150 at the time that this deciding operation was performed is decided as the reference attitude of the imaging apparatus 100. Note that an example of a display screen displayed on the input/output panel 200 after the user 420 decides the end position of the panorama image imaging operation is illustrated in FIG. 6B.

FIG. 6A illustrates a state of the user 420 having full-pressed the shutter button 191 in the state shown in FIG. 5A, in a simplified manner. In this example, we will say that the set image size is θ1 (i.e., 180°), and description will be made regarding a method to decide the start position of the imaging operation in the horizontal direction.

For example, let us assume a case where the user 420 has full-pressed the shutter button 191 in the state shown in FIG. 5A. In this case, the start position 423 of the imaging operation is decided based on the set image size θ1, with the optical axis direction from the position 421 at the time of that operation (direction of end position 422) as a reference. Specifically, as shown in FIG. 6A, a position reached by rotating by an amount of θ1 in the swing direction on the rotational axis of the position 421 at the time of having performed the full-pressing operation of the shutter button 191, is decided as the start position 423 of the imaging operation. Note that in the case that the position 421 (the position of the 420 (i.e., the position of the imaging apparatus 100)) at the time of having performed the full-pressing operation of the shutter button 191 serves as the rotational axis, the position in the optical axis direction thereof is decided as the end position 422 of the imaging operation. The start position of the imaging operation in the vertical direction can be decided in the same way.

Figure 6B:
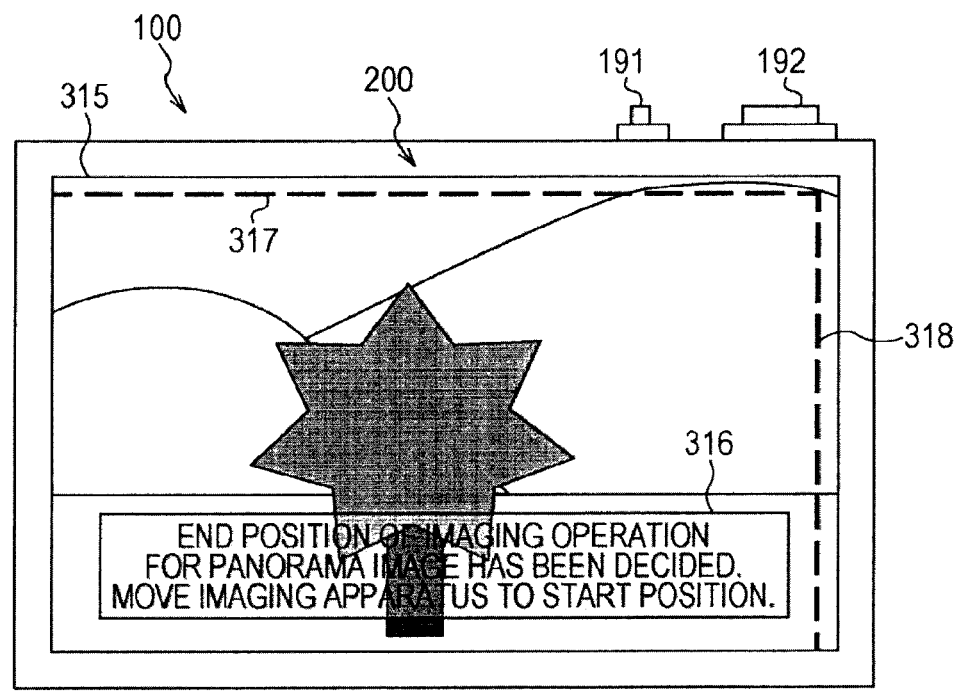
FIG. 6B is another diagram schematically illustrating a transition example of the attitude of the imaging apparatus according to the first embodiment of the present technology and a display screen displayed on the input/output panel.

FIG. 6B shows an operation assisting screen 315 displayed in the event that a deciding operation to decide the end position of the panorama image imaging operation has been performed. The operation assisting screen 315 displays the subject which is currently to be imaged displayed as an LV image, and a message display region 316 and operation supporting images 317 and 318 superimposed on the LV image.

The message display region 316 displays a message to the effect that the end position of the panorama image imaging operation has been decided, and a message prompting the user to move the imaging apparatus 100 to the start position of the panorama image imaging operation.

The operation supporting images 317 and 318 are images for supporting user operations relating to the panorama image imaging operation (swing operation of the imaging apparatus 100). For example, images for identifying subjects included in the panorama image imaging range (dotted lines representing a generally rectangular outline corresponding to the panorama image) are displayed as the operation supporting images 317 and 318.

Now, at the time of deciding the end position of the panorama image imaging operation, the swing direction (horizontal direction or vertical direction) of the imaging apparatus 100 is undecided, so the operation supporting images 317 and 318 alone are displayed without displaying operation supporting images corresponding to either swing direction. Also, an operation supporting image is displayed corresponding to one of the swing directions in accordance with change in the attitude of the imaging apparatus 100.

That is to say, in the event that the swing operation of the imaging apparatus 100 in the horizontal direction has been detected, a panorama image imaging range with the horizontal direction as the longitudinal direction is decided, and an operation supporting image corresponding to the horizontal direction is displayed. Also, in the event that the swing operation of the imaging apparatus 100 in the vertical direction has been detected, a panorama image imaging range with the vertical direction as the longitudinal direction is decided, and an operation supporting image corresponding to the vertical direction is displayed.

Note that a display method of an operation supporting image corresponding to change in the attitude of the imaging apparatus 100 will be described in detail with reference to FIG. 7A through FIG. 10B. Also, in the event that the swing direction of the imaging apparatus 100 (horizontal direction of vertical direction) has been set beforehand, an arrangement may be made where an operation supporting image is displayed corresponding to the set swing direction at the time of deciding the end position of the panorama image imaging operation.

Thus, after full-pressing of the shutter button 191, the operation assisting screen 315 is displayed on the input/output panel 200, so the user 420 can easily perform the swing operation of the imaging apparatus 100 following the operation assisting screen 315. Also, an example of a display screen displayed on the input/output panel 200 after the user has started the swing operation will be illustrated in FIG. 7B and others.

Figure 7A:
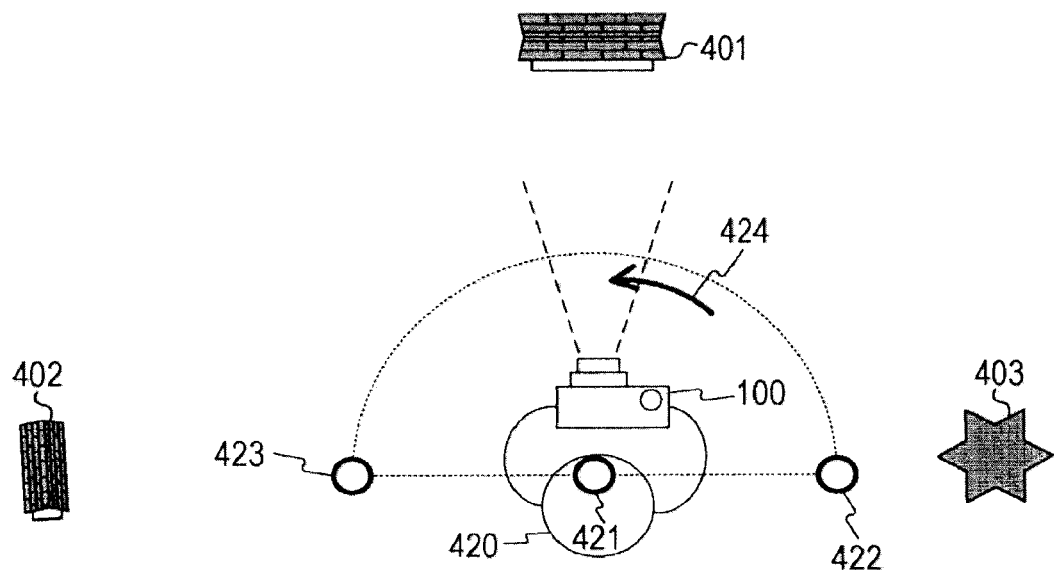
FIG. 7A is a diagram schematically illustrating a transition example of the attitude of the imaging apparatus according to the first embodiment of the present technology and a display screen displayed on the input/output panel.

FIG. 7A shows a state in which the user 420 is moving the imaging apparatus 100 in the direction of the arrow 424 from the state shown in FIG. 6A, in a simplified manner.

Figure 7B:
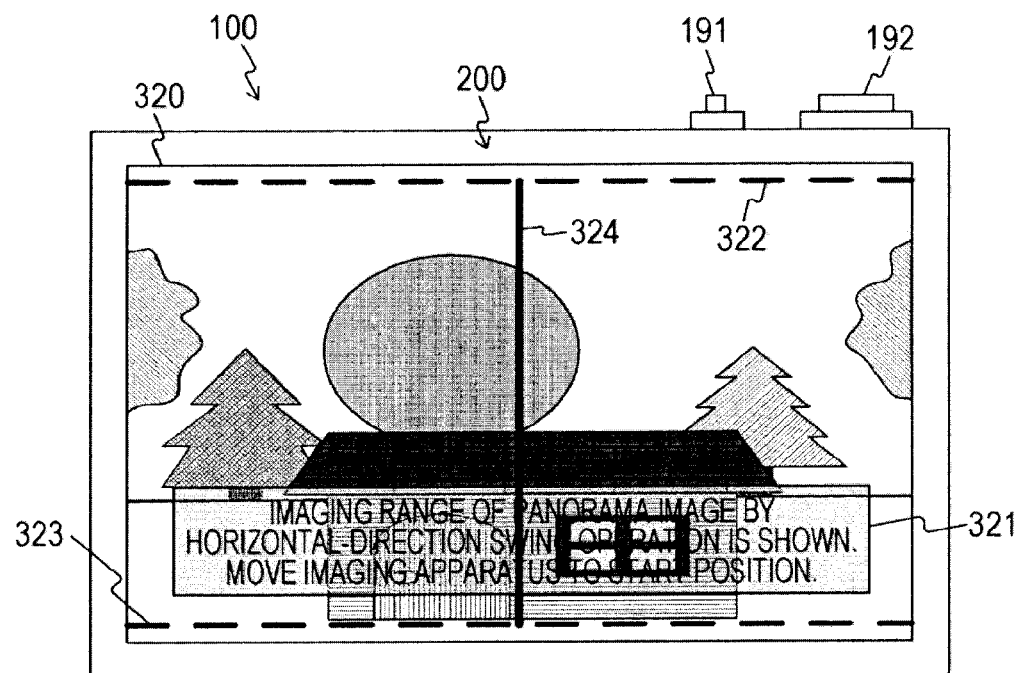
FIG. 7B is another diagram schematically illustrating a transition example of the attitude of the imaging apparatus according to the first embodiment of the present technology and a display screen displayed on the input/output panel.

FIG. 7B shows an operation assisting screen 320 displayed on the input/output panel 200 immediately after the user 420 has moved the imaging apparatus 100 in the direction of the arrow 424. Note that motion of the imaging apparatus 100 after the full-pressing operation of the shutter button 191 is determined by the control unit 160 based on the attitude information from the attitude detecting unit 150.

The operation assisting screen 320 displays the subject which is currently to be imaged displayed as an LV image, and a message display region 321 and operation supporting images 322 and 324 superimposed on the LV image. The message display region 321 displays a message to the effect of displaying the panorama image imaging range, and a message prompting the user to move the imaging apparatus 100 to the start position of the panorama image imaging operation.

The operation supporting images 322 through 324 are images for supporting user operations relating to the panorama image imaging operation (swing operation of the imaging apparatus 100), as described above. Specifically, the operation supporting images 322 and 323 are images for identifying the subject included in the panorama image imaging range, and may be dotted lines representing the outline of a generally rectangular shape corresponding to the panorama image (overall rectangular-shaped dotted lines). Also, the operation supporting images 322 and 323 are positioned on the LV image displayed on the operation assisting screen 320. Also, the operation supporting image 324 is a solid line indicating the center position in the panorama image (center position in the swing direction), and is situated on the LV image displayed on the operation assisting screen 320. Thus, the user 420 can easily comprehend the intermediate position in the panorama image by the operation supporting image 324 being displayed.

Now, the display position of the operation supporting image 324 is determined based on the set image size θ1 (i.e.,) 180°), and the end position 422 of the imaging operation. That is to say, the position "θ1/2" from the end position 422 of the imaging operation is decided as the display position for the operation supporting image 324.

For example, as shown in FIG. 7A, a vertical direction range and center position are schematically near the middle of the panorama image imaging range, as the imaging range thereof. Also, as shown in FIG. 8B, a vertical direction range and end position (left end portion) are schematically near the end position (left end portion) of the panorama image imaging range, as the imaging range thereof.

Now, a display method of the operation support images (operation support images 322, 323, etc.) will be described. An operation support image is displayed as a reference for the current operating position as to the overall amount of operation which has to be performed in the panorama image imaging operation (e.g., rotational angle of the swing operation). For example, the end position of the panorama image imaging operation is set as a reference position, and based on the amount of operation from this reference position (end position), an operation support image for one of the horizontal direction and vertical direction is decided as an operation support image to be displayed.

Specifically, the current amount of operation is calculated by the control unit 160, based on the detection results of amount of movement and direction of movement (detection results of the image processing unit 113) between images adjacent on the temporal axis (images generated by the imaging device 112). The control unit 160 then decides the operation support image (horizontal direction or vertical direction) to be displayed, based on the current operation amount, and changes the display state of the operation support image. For example, a motion vector corresponding to the overall motion of the image occurring due to the imaging apparatus 100 moving (i.e., a GMV) is detected as the amount of movement and direction of movement thereof. Also, the control unit 160 may calculate the current amount of operation based on the angular velocity detected by the attitude detecting unit 150. Further, the control unit 160 may calculate the current amount of operation using the amount of movement and direction of movement thereof and the angular velocity detected by the attitude detecting unit 150. In this case, the user can easily comprehend the panorama image imaging range by displaying an operation support image.

Also, the operation support image may be displayed in a different manner depending on whether an operation support image from the operation of deciding the end position 422 up throughout the swing operation to the start position 423, or an operation support image from the start position 423 throughout the swing operation to the end position 422. For example, the operation support image may be made to be displayed in a blinking manner for the operation support image from the operation of deciding the end position 422 up throughout the swing operation to the start position 423. Thus, by displaying the operation support image while performing the swing operation for preparation, the user can be notified that this is not a panorama image imaging operation but movement as preparation thereof.

Also, in the event that the imaging apparatus 100 has reached the start position 423 and a starting instruction operation has been performed for the panorama image imaging operation by the user 420, the display form of the operation support image may be changed from the blinking display to normal display (constant on). That is to say, the operation support image may be displayed normally during the swing operation from the start position 423 to the end position 422 (panorama image imaging operation). Accordingly, by changing the display form of the operation support image, whether currently preparing for the panorama image imaging operation or whether currently performing the panorama image imaging operation can be readily comprehended by the user.

Figure 8A:
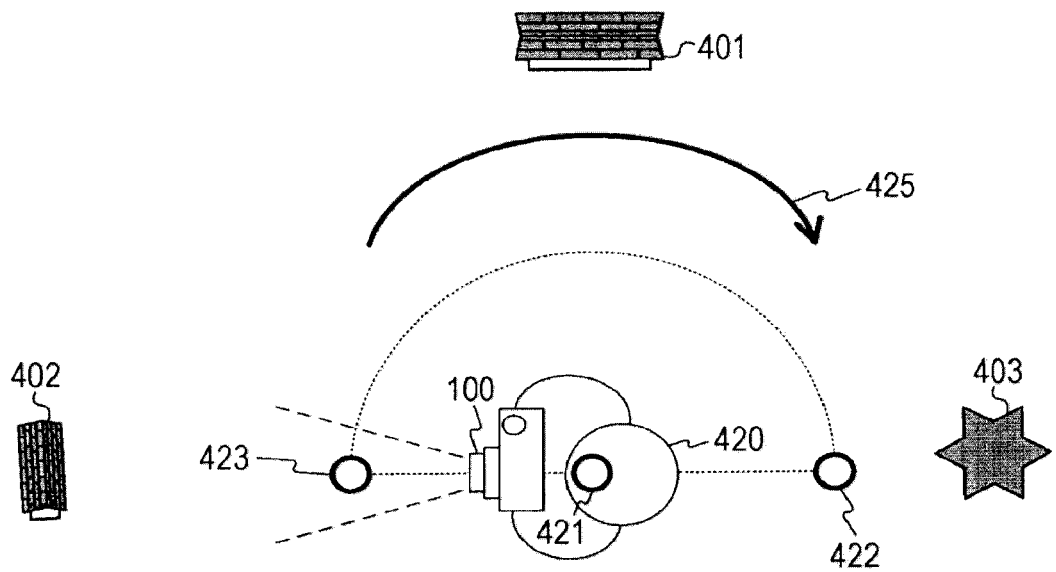
FIG. 8A is a diagram schematically illustrating a transition example of the attitude of the imaging apparatus according to the first embodiment of the present technology and a display screen displayed on the input/output panel.
Figure 8B:
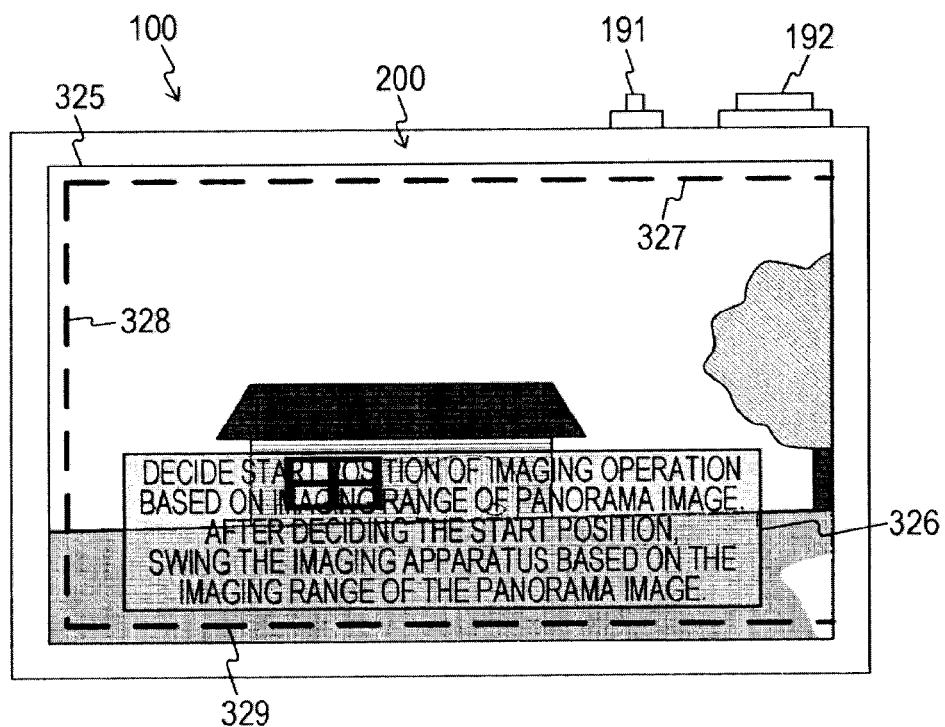
FIG. 8B is another diagram schematically illustrating a transition example of the attitude of the imaging apparatus according to the first embodiment of the present technology and a display screen displayed on the input/output panel.

FIG. 8A illustrates a state of the user 420 moving the imaging apparatus 100 to the start position 423 of the imaging operation. FIG. 8B shows an operation assisting screen 325 displayed on the input/output panel 200 at the time of the user 420 moving the imaging apparatus 100 to the start position 423 of the imaging operation. Note that whether or not the imaging apparatus 100 has reached the start position 423 is determined by the control unit 160 based on the attitude information from the attitude detecting unit 150.

An operation assisting screen 325 has operation supporting images 327 through 329 displayed instead of the operation supporting images 322 and 323 in the operation assisting screen 320 in FIG. 7B. The operation supporting images 327 and 329 are operation supporting images indicating vertical direction imaging range in the panorama image, and the operation supporting image 328 is an operation supporting image indicating the imaging range at the left edge of the panorama image.

A message display region 326 displays a message to the effect of prompting a start position deciding operation for the panorama image imaging operation based on the operation supporting images 327 through 329, and a message prompting the user to start the panorama image imaging operation after the deciding operation.

Thus, in the event of the imaging apparatus 100 having been moved to the start position 423 of the imaging operation, a message prompting the start position deciding portion for the panorama image imaging operation is displayed. Also, along with this display, a message to the effect of swinging the imaging apparatus 100 in the opposite direction as the swinging direction so far to start the imaging operation is displayed.

Thus, in the event that the user 420 performs a full-press operation of the shutter button 191 after the imaging apparatus 100 is moved to the start position 423 of the imaging operation and the operation assisting screen 325 is displayed on the input/output panel 200, the panorama image imaging operation is started. Also, upon the panorama image imaging operation being started, the operation supporting images 327 through 329 go from a blinking display to a constantly on state. Also, the operation supporting images 327 through 329 move in accordance with the motion of the imaging apparatus 100.

Now, in the event that the user 420 has performed a start position deciding operation (full-press operation of the shutter button 191) for example, it can be assumed that the position at the time of deciding may be different from the start position 423. For example, it can be assumed that the position may be shifted several degrees (e.g., one to five degrees) from the start position 423, with the position 421 as the center. In this case, the set image size may be changed based on the start position deciding operation by the user 420. For example, let us assume a case where the position at the time of the start position deciding operation is shifted +5° (center angle centered on the position 421) from the start position 423. In this case, the set image size (180°) can be changed to 185°.

Note that with this example, an example is illustrated where the full-press operation of the shutter button 191 by the user 420 is the start position deciding operation for the panorama image imaging operation, but an arrangement may be made wherein the imaging apparatus 100 automatically decides the start position at the time of having reached the start position 423. In this case, only a message to the effect that the panorama image imaging operation will be started is displayed, and the panorama image imaging operation is started automatically. Thus, upon the panorama image imaging operation being started, the operation supporting images change in accordance with the movement of the imaging apparatus 100. An example thereof will be described with reference to FIGS. 9A and 9B.

Figure 9A:
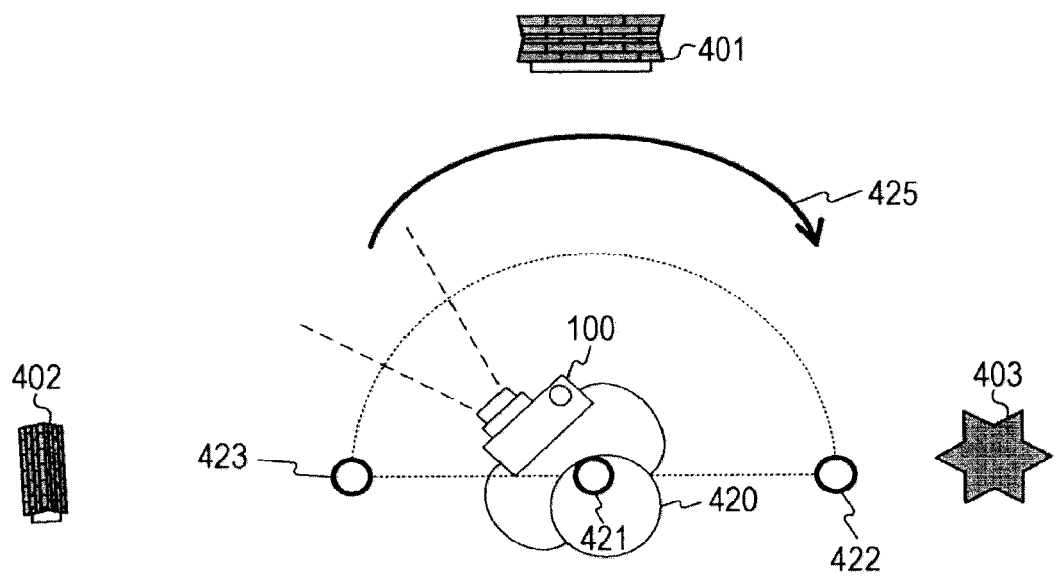
FIG. 9A is a diagram schematically illustrating a transition example of the attitude of the imaging apparatus according to the first embodiment of the present technology and a display screen displayed on the input/output panel.
Figure 9B:
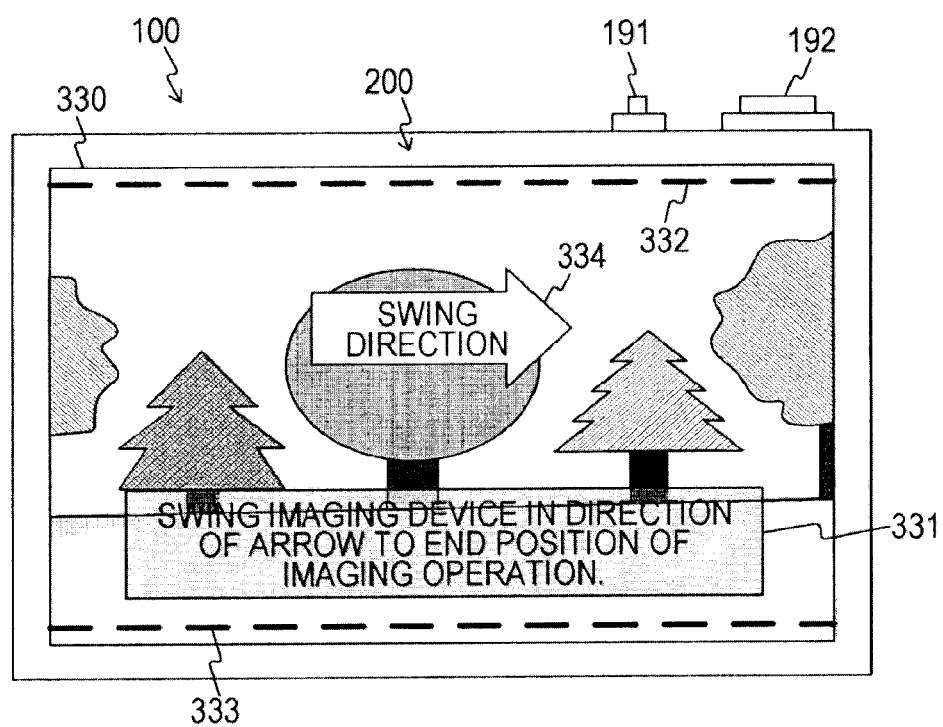
FIG. 9B is another diagram schematically illustrating a transition example of the attitude of the imaging apparatus according to the first embodiment of the present technology and a display screen displayed on the input/output panel.

FIG. 9A illustrates the transition of the imaging apparatus 100 moving from the imaging operation start position 423 to the imaging operation end position 422. FIG. 9B shows an operation assisting screen 330 displayed during the movement of the imaging apparatus 100 from the imaging operation start position 423 to the imaging operation end position 422. In this way, after then imaging apparatus 100 has started the imaging operation from the imaging operation start position 423, the operation assisting screen 330 is displayed in accordance with the movement of the imaging apparatus 100 until the imaging apparatus 100 reaches the imaging operation end position 422.

The operation assisting screen 330 displays the subject which is currently to be imaged displayed as an LV image, and a message display region 331, operation supporting images 332 and 333, and an arrow 334 superimposed on the LV image. The message display region 331 displays a message to the effect of performing a swing operation of the imaging apparatus 100 to the panorama image imaging operation end position.

The arrow 334 is an arrow for supporting user operations relating to the panorama image imaging operation (swing operation of the imaging apparatus 100). That is to say, the user can perform the panorama image imaging operation by swinging the imaging apparatus 100 in the direction which the arrow 334 indicates.

Figure 10A:
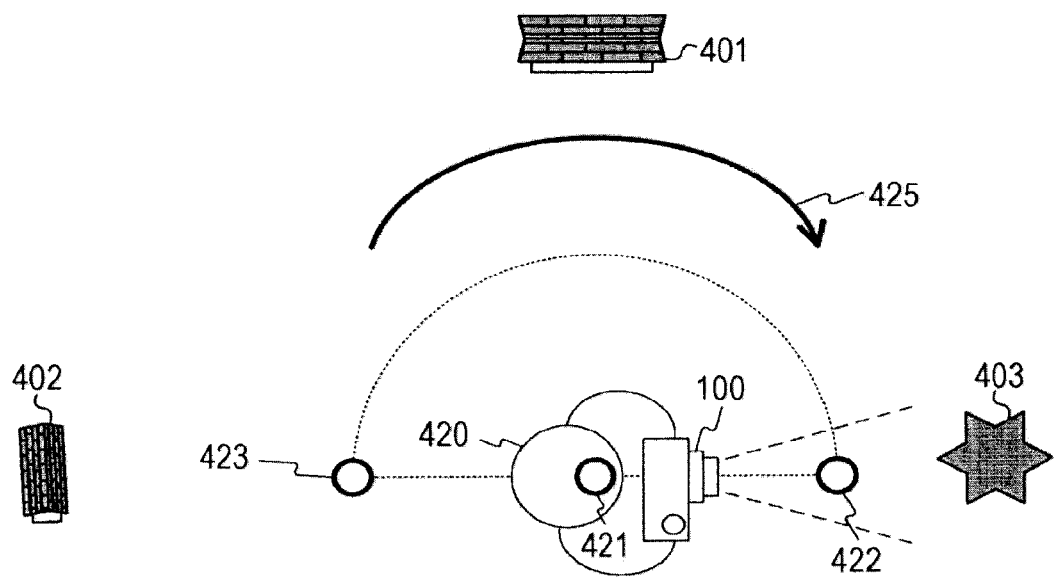
FIG. 10A is a diagram schematically illustrating a transition example of the attitude of the imaging apparatus according to the first embodiment of the present technology and a display screen displayed on the input/output panel.
Figure 10B:
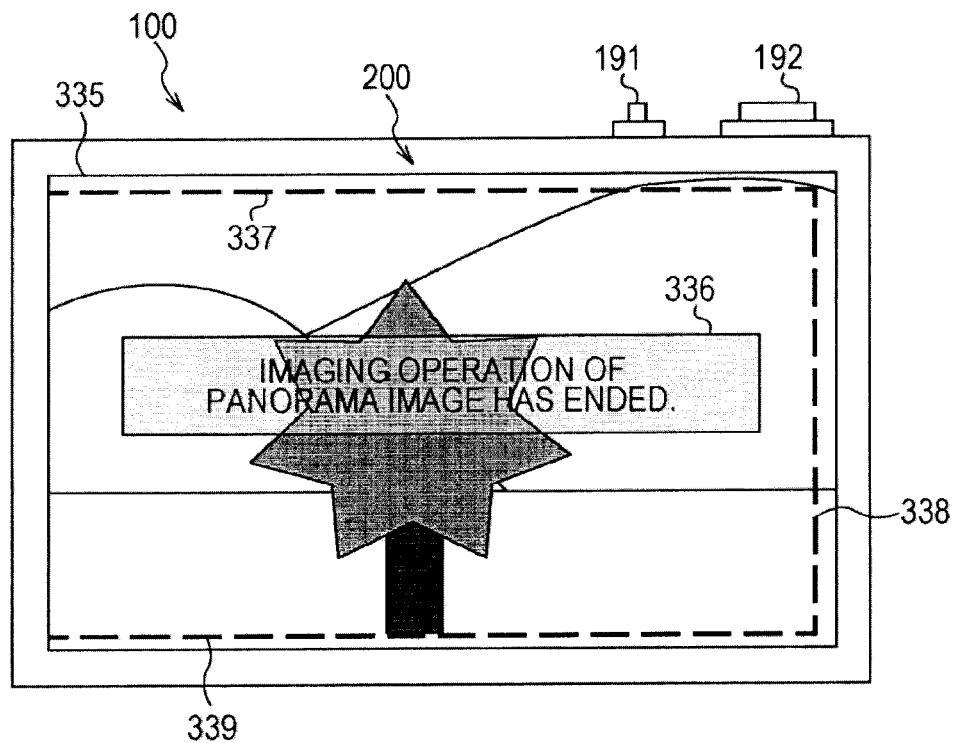
FIG. 10B is another diagram schematically illustrating a transition example of the attitude of the imaging apparatus according to the first embodiment of the present technology and a display screen displayed on the input/output panel.

FIG. 10A shows a state in which the user 420 has moved the imaging apparatus 100 to the end position 422 of the imaging operation, in a simplified manner. FIG. 10B shows an operation assisting screen 335 displayed on the input/output panel 200 at the time of the user 420 having moved the imaging apparatus 100 to the end position 422 of the imaging operation. As shown in FIG. 10B, upon the imaging apparatus 100 having been moved to the end position 422 of the imaging operation and the user 420 having performed an end instruction operation of the imaging operation, a message to the effect that the imaging operation has ended is displayed on a message display region 336.

Also, operation supporting images 337 through 339 which indicate the vertical direction imaging range and the right edge imaging range are displayed on the operation assisting screen 335, and the arrow shown in FIG. 9B is erased.

Thus, in the event that the user 420 has moved the imaging apparatus 100 to the end position 422 of the imaging operation, the imaging operation of the panorama image ends, and a message to the effect that the panorama image imaging operation has ended is displayed. Ending processing of the panorama image imaging operation is performed by the control unit 160 determining whether or not the imaging apparatus 100 has reached the end position 422, based on the attitude information from the attitude detecting unit 150.

Also, a panorama image is generated by the image combining unit 120 using the multiple images generated by the imaging operation. After the panorama image imaging operation has ended, the generated panorama image is recorded in the recording medium 140 by the recording control unit 130 as a still image file.

Note that with the first embodiment of the present technology, an example has been described where the imaging range (image size) of the panorama image is set beforehand, and ending processing of the panorama image imaging operation is performed using this image size. Note however, that an arrangement may be made wherein the image size is changed during the panorama image imaging operation, based on user operations. For example, the image size can be changed by moving the operation supporting image 338 indicating the imaging range at the right edge to the left or right during the panorama image imaging operation. This moving operation can be performed by an operation using the dial 192, for example, or a touch operation (tracing operation) on the input/output panel 200. Accordingly, the user can adjust the imaging range of the panorama image while confirming the imaging range thereof.

Note that there is a possibility that the user may not properly perform the swing operation while the imaging apparatus 100 moves from the start position 423 of the imaging operation to the end position 422 of the imaging operation. For example, it can be expected that the imaging apparatus 100 will move somewhat in the vertical direction as well, during the swing operation in the horizontal direction. In this case, the display position of the operation supporting image is displayed moved in accordance with the movement in the vertical direction. Also, in this case, a message may be displayed prompting a proper swing operation, so as to notify the user to that effect.

Thus, by displaying operation supporting images indicating the imaging range decided based on the deciding operation of the end position of the panorama image imaging range, the user can easily comprehend the imaging range of the panorama image before starting the panorama image imaging operation. That is to say, the user can easily confirm the panorama image imaging range by performing the swing operation of the imaging apparatus 100.

Also, the operation supporting images are displayed until the panorama image imaging operation ends. Accordingly, the user can easily shoot an intended panorama image by swinging the imaging apparatus 100 following the operation supporting images. That is to say, a panorama image according to user preferences can be easily generated.

Operation Example of Imaging Apparatus

Figure 11:
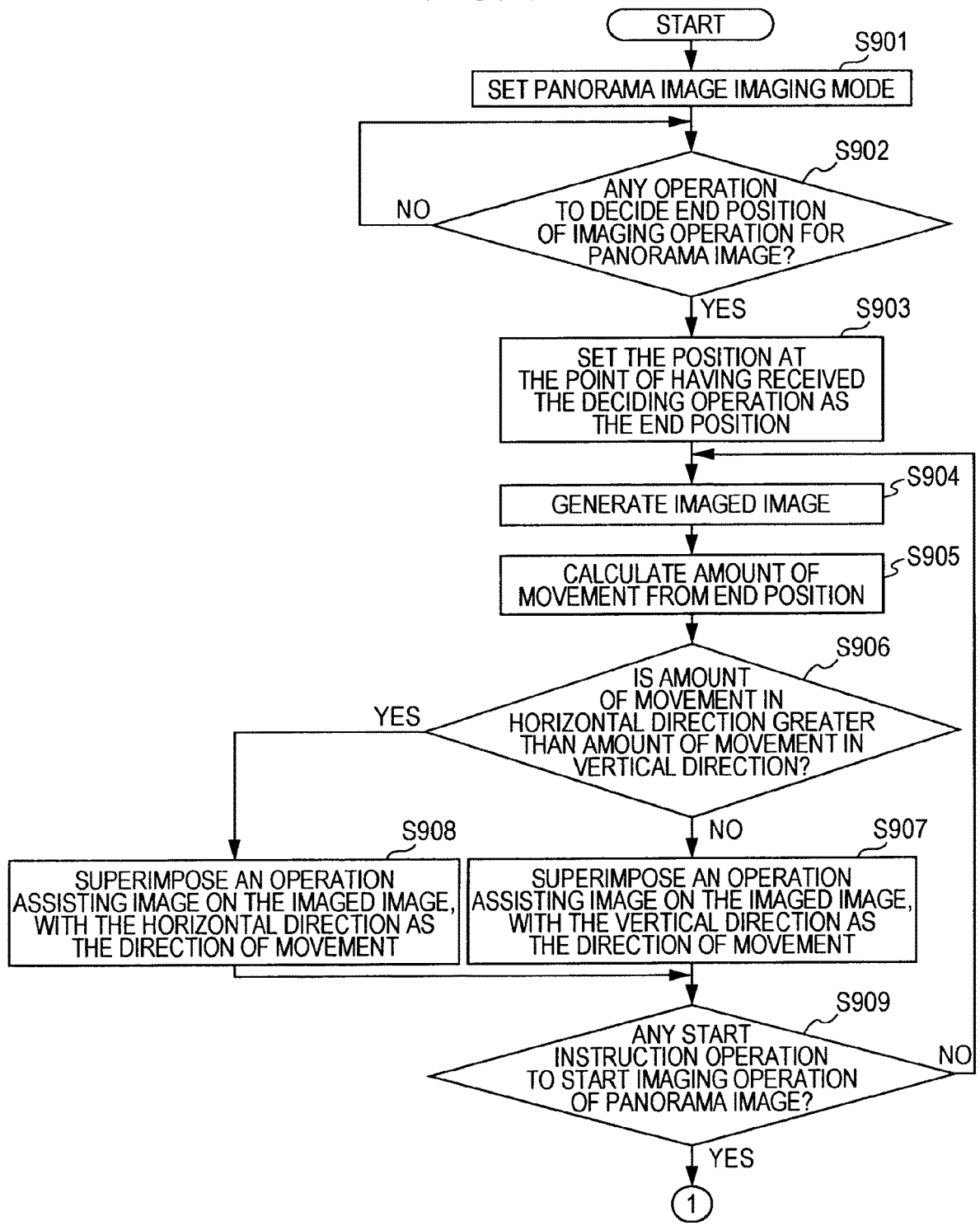
FIG. 11 is a flowchart illustrating an example of processing procedures of imaging control processing by the imaging apparatus according to the first embodiment of the present technology.
Figure 12:
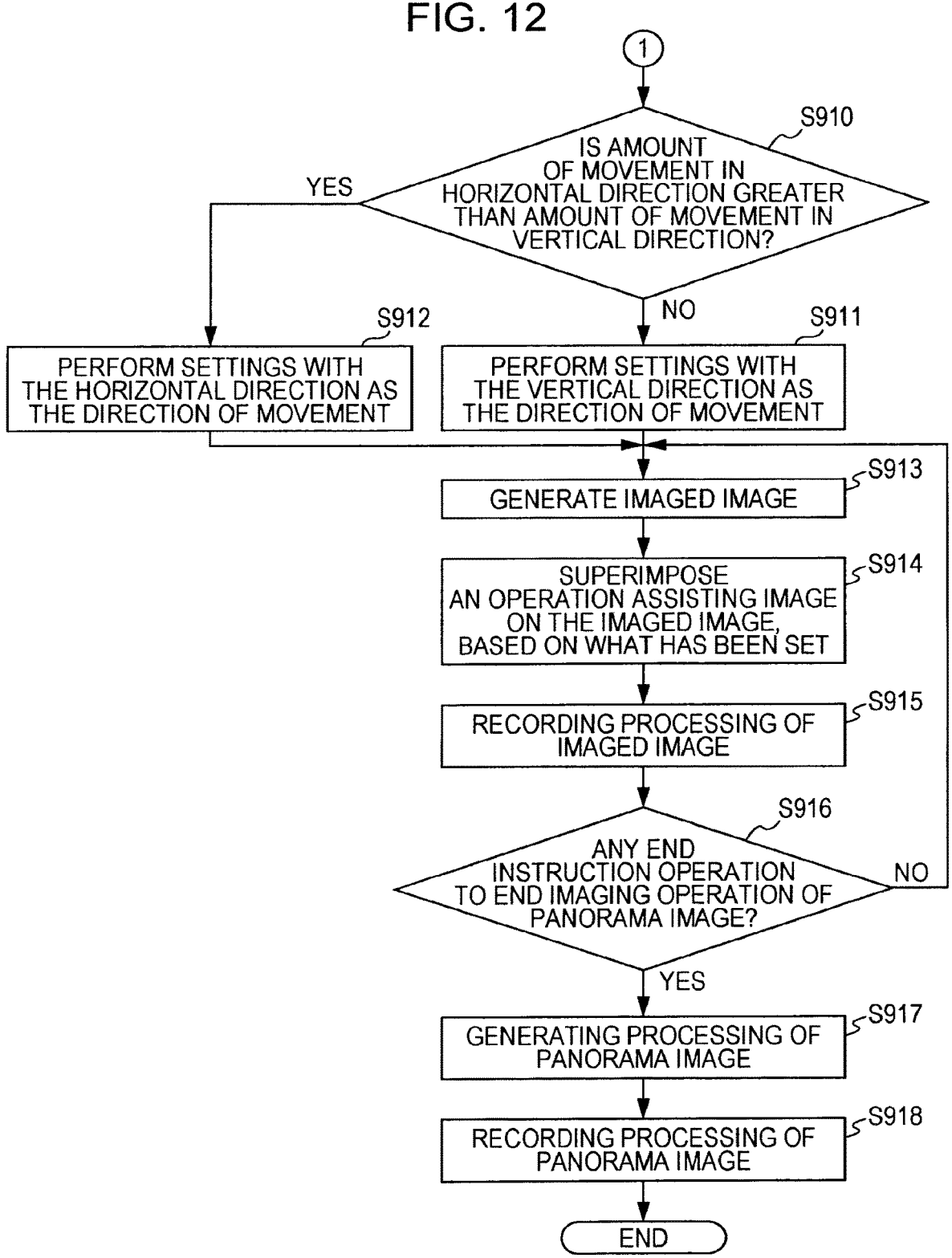
FIG. 12 is a flowchart illustrating an example of processing procedures of imaging control processing by the imaging apparatus according to the first embodiment of the present technology.

Next, operations of the imaging apparatus 100 according to the first embodiment of the present technology will be described with reference to the drawings. FIGS. 11 and 12 are a flowchart illustrating an example of processing procedures for imaging control processing by the imaging apparatus 100 according to the first embodiment of the present technology.

First, the panorama image imaging mode is set (step S901). Next, the control unit 160 determines regarding whether or not a deciding operation for the end position for the panorama image imaging operation has been performed (step S902), and in the event that no deciding operation has been performed, monitoring is continued.

In the event that a deciding operation has been performed (Yes in step S902), a positioned identified by the attitude of the imaging apparatus 100 at the time of that deciding operation having been accepted is set as the end position (step S903). That is to say, the control unit 160 decides the imaging range of the panorama image (horizontal direction and vertical direction), based on the end position. Note that step S902 is an example of the accepting described in the Summary. Also, step S903 is an example of the deciding described in the Summary.

Next, an imaged image is generated (step S904), and control unit 160 calculates the amount of movement (movement angle) from the end position, based on the attitude information from the attitude detecting unit 150 (step S905).

Next, the control unit 160 compares the amount of movement in the horizontal direction and the amount of movement in the vertical direction, with regard to the calculated amount of movement (step S906). In the event that the amount of movement in the horizontal direction is greater than the amount of movement in the vertical direction (Yes in step S906), the display control unit 170 displays an operation supporting image of which the horizontal direction is the direction of movement, superimposed on the LV image (step S908). For example, a portion of a rectangular dotted line of which the horizontal direction is the longitudinal direction (see FIGS. 7B and 8B, for example) is displayed on the display unit 180 as an operation supporting image.

On the other hand, in the event that the amount of movement in the horizontal direction is not greater than the amount of movement in the vertical direction (No in step S906), the display control unit 170 displays an operation supporting image of which the vertical direction is the direction of movement, superimposed on the LV image (step S907). For example, a portion of a rectangular dotted line of which the vertical direction is the longitudinal direction is displayed on the display unit 180 as an operation supporting image.

Next, the control unit 160 determines whether or not a start instruction operation (start position deciding operation) for the panorama image imaging operation has been performed (step S909), and in the event that the start instruction operation has not been performed, the flow returns to step S904. In the event that the start instruction operation for the panorama image imaging operation has been performed (Yes in step S909), the control unit 160 compares the amount of movement in the horizontal direction and the amount of movement in the vertical direction (step S910). In the event that the results of comparison show that the amount of movement in the horizontal direction is greater than the amount of movement in the vertical direction (Yes in step S910), the control unit 160 makes settings with the horizontal direction as the direction of movement (swing direction) (step S912).

On the other hand, in the event that the amount of movement in the horizontal direction is not greater than the amount of movement in the vertical direction (Yes in step S910), the control unit 160 makes settings with the vertical direction as the direction of movement (swing direction) (step S911). An operation supporting image is displayed based on the direction of movement (horizontal direction or vertical direction) set in this way. For example, in the event that the horizontal direction is set to be the direction of movement (swing direction) (step S912), a portion of a rectangular dotted line of which the horizontal direction is the longitudinal direction (see FIGS. 8B through 10B, for example) is displayed on the display unit 180 as an operation supporting image.

Next, an imaged image is generated (step S913). Next, the display control unit 170 displays the operation supporting image on the display unit 180 superimposed on the LV image, based on the direction of movement (horizontal direction or vertical direction) set by the control unit 160 (step S914). Next, recording processing of the generated imaged image is performed (step S915). With this processing, an imaged image used for the panorama image (one imaged image subjected to image processing by the image processing unit 113) is temporarily recorded.

Next, the control unit 160 determines whether or not an end instruction operation of the panorama image imaging operation has been performed (step S916), and in the event that an end instruction operation has not been performed, the flow returns to step S913. In the event that an end instruction operation has been performed (Yes in step S916), the image combining unit 120 generates a panorama image using images subjected to image processing by the image processing unit 113 (multiple images temporarily recorded) under control of the control unit 160 (step S917). Next, under control of the control unit 160, the recording control unit 130 records the panorama image generated by the image combining unit 120 in the recording medium 140 as an image file (step S918).

2. Second Embodiment

With the first embodiment according to the present technology, an example has been illustrated in which the end position for the panorama image imaging operation is decided based on user operations. Since the end position for the panorama image imaging operation is decided based on user operations, it can also be conceived to decide the end timing of the panorama image imaging operation using the imaged image at the time of that user operation (end position). Accordingly, with the second embodiment according to the present technology, an example will be illustrated where the end timing of the panorama image imaging operation is decided using the imaged image at the end position of the panorama image imaging operation.

Configuration Example of Imaging Apparatus

Figure 13:
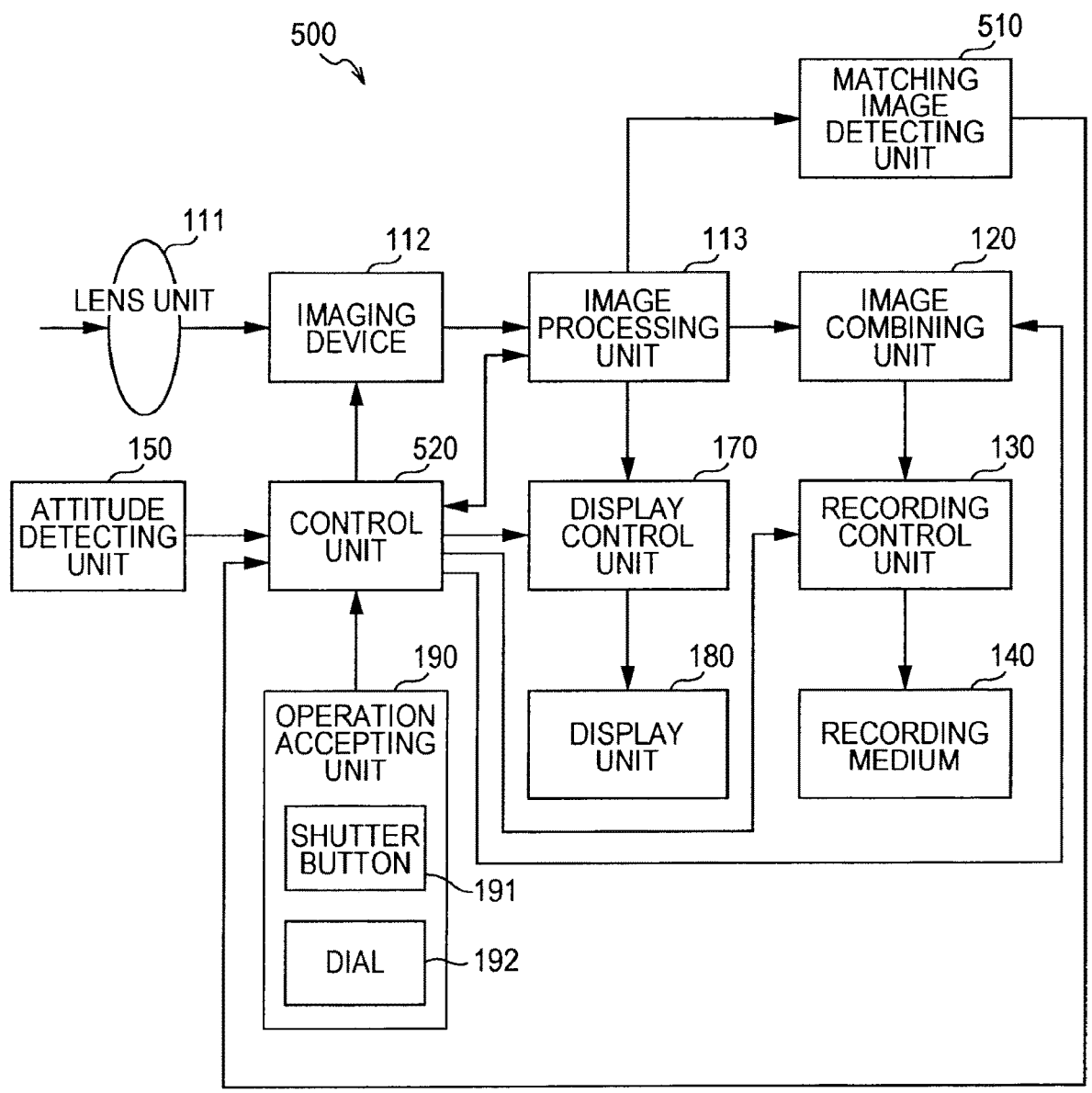
FIG. 13 is a block diagram illustrating a functional configuration example of an imaging apparatus according to a second embodiment of the present technology.

FIG. 13 is a block diagram illustrating a functional configuration example of an imaging apparatus 500 according to the second embodiment of the present technology. Note that the imaging apparatus 500 is a modification of the imaging apparatus 100 shown in FIG. 1. Accordingly, parts which are in common with those of the imaging apparatus 100 will share the same nomenclature and description of a part thereof will be omitted.

The imaging apparatus 500 has a matching image detecting unit 510 and a control unit 520. The matching image detecting unit 510 is for performing matching processing regarding images generated by the imaging device 112, and outputs the detection results thereof to the control unit 520. Specifically, in the event that a deciding operation for the end position of the panorama image imaging operation is performed, the matching image detecting unit 510 holds the image generated by the imaging device 112 (the image subjected to image processing by the image processing unit 113). The matching image detecting unit 510 then determines whether or not the image that is held (held image) and an image generated by the imaging device 112 following the attitude of the imaging apparatus 500 changing after accepting that deciding operation, and detects matching images.

The control unit 520 performs control to stop the panorama image imaging operation based on the detection results from the matching image detecting unit 510. Specifically, the control unit 520 determines whether the aforementioned held image and the image generated by the imaging device 112 during the panorama image imaging operation match, based on the detection results from the matching image detecting unit 510. In the event that these images match, the control unit 520 performs control to stop the panorama image imaging operation.

Example of Holding Image

Figure 14A:
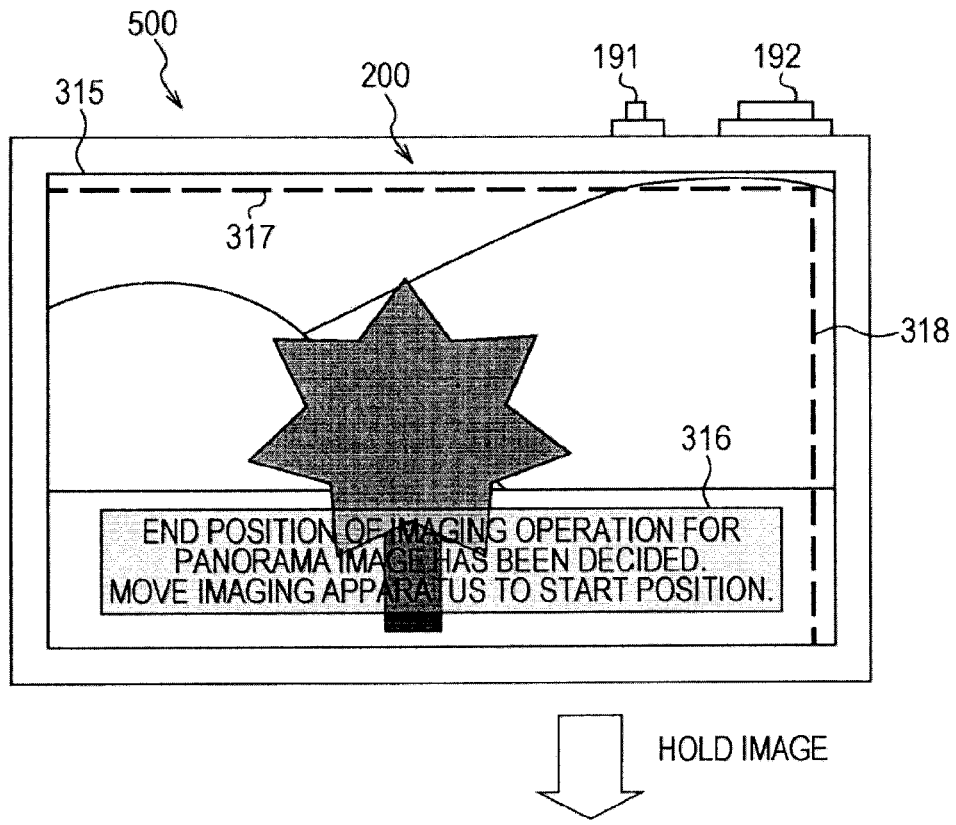
FIG. 14A is a diagram schematically illustrating an example of image holding in a case of holding an image in a matching image detecting unit according to the second embodiment of the present technology.
Figure 14B:
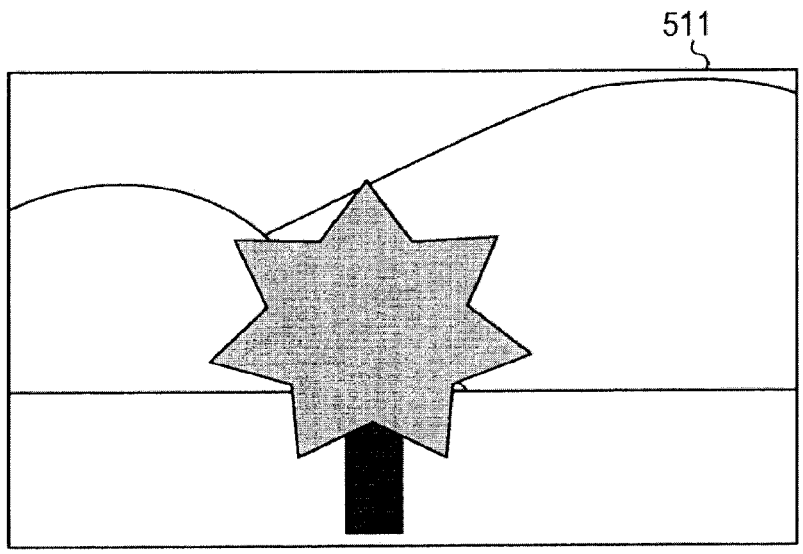
FIG. 14B is another diagram schematically illustrating an example of image holding in a case of holding an image in a matching image detecting unit according to the second embodiment of the present technology.

FIGS. 14A and 14B are diagrams schematically illustrating an example of image holding in a case of holding an image in the matching image detecting unit 510 according to the second embodiment of the present technology. FIG. 14A shows an operation assisting screen 315 displayed in a case of a deciding operation being performed to decide the end position of a panorama image imaging operation. Note that the operation assisting screen 315 shown in FIG. 14A is the same as that in FIG. 6B, so description here will be omitted.

FIG. 14B illustrates an image (held image 511) held in the matching image detecting unit 510, in a simplified manner. As shown in FIGS. 14A and 14B, the image (held image 511) generated by the imaging device 112 at the time of the deciding operation of the end position of the panorama image imaging operation and subjected to image processing by the image processing unit 113, is held in the matching image detecting unit 510. The matching image detecting unit 510 performs matching processing using the held image 511 with regard to the imaged image generated during the panorama image imaging operation. This matching processing will be described in detail with reference to FIGS. 15A and 15B.

Example of Detecting Matching Image

Figure 15A:
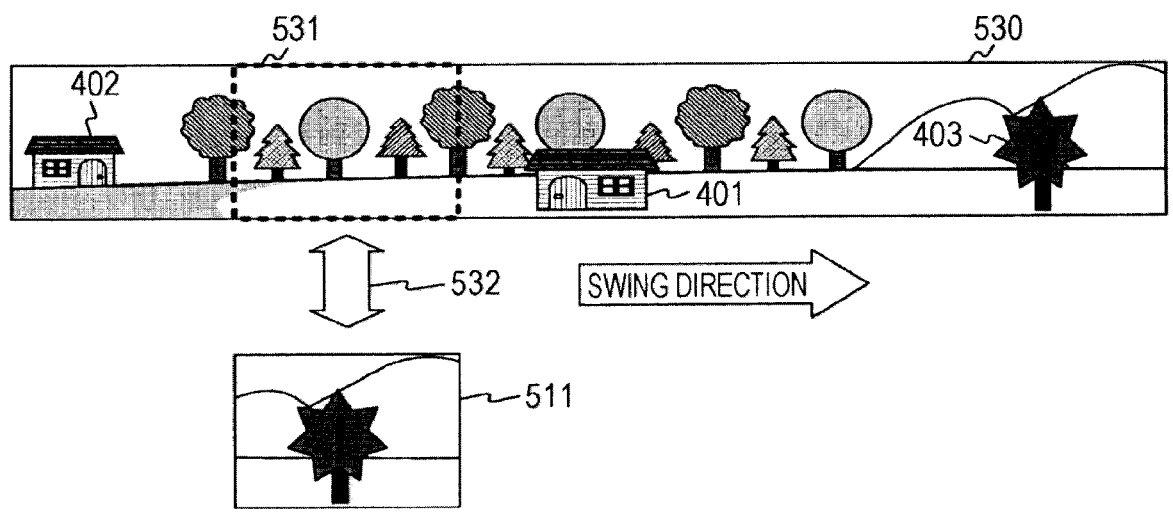
FIG. 15A is a diagram schematically illustrating matching processing with the matching image detecting unit according to the second embodiment of the present technology.
Figure 15B:
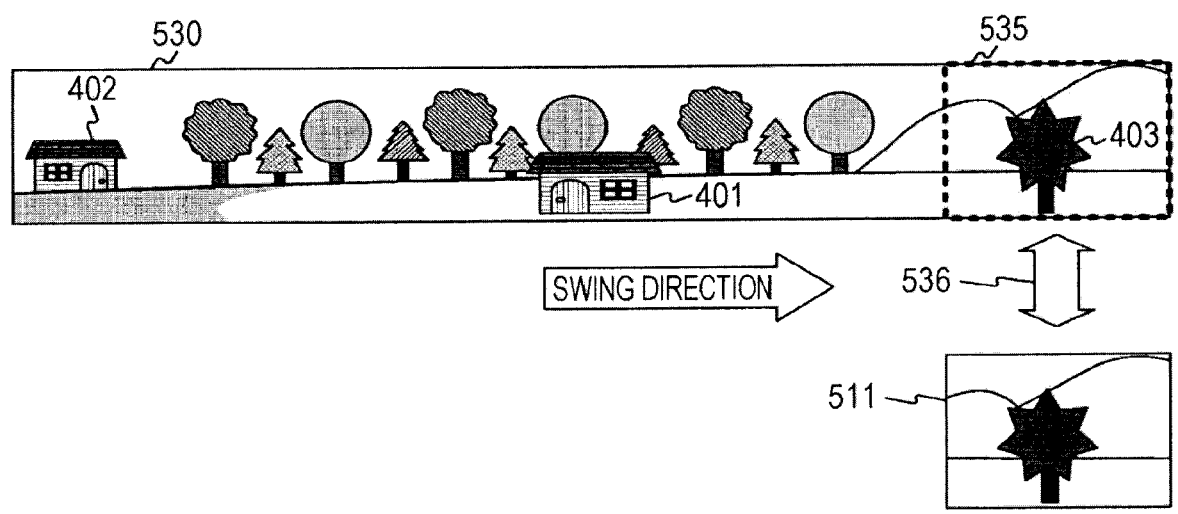
FIG. 15B is another diagram schematically illustrating matching processing with the matching image detecting unit according to the second embodiment of the present technology.

FIGS. 15A and 15B are diagrams schematically illustrating matching processing with the matching image detecting unit 510 according to the second embodiment of the present technology. FIG. 15A schematically illustrates matching processing for detecting an image matching the held image 511 (a matching image) during the panorama image imaging operation. Specifically, this illustrates the relation between an imaging range (panorama image imaging range 530) which is the object of imaging for the panorama image imaging operation, and an imaging range 531 which is the object of imaging with the imaging device 112. Also, matching processing 532 to determine whether or not the imaging range 531 and the held image 511 match is schematically shown.

As shown in FIG. 15A, matching processing between the imaged images generated while the swing operation of the imaging apparatus 500 is being performed (images shown within imaging range 531) and the held image 511 is sequentially performed.

Now, matching processing is processing in which the feature amounts of two images to be compared are compared, similarity of the feature amounts of the two images is calculated based on the comparison results, and determination is made regarding whether the two images match or not based on this similarity. For example, in the event that the calculated similarity is below a threshold, the two images to be compared are determined to not match, and in the event that the calculated similarity is at or above the threshold, the two images to be compared are determined to match.

FIG. 15B schematically illustrates a case where an image matching the held image 511 (an image shown within the imaging range 535) has been detected in the matching processing 536. As shown in FIG. 15B, in the event that an image matching the held image 511 (image shown within the imaging range 535) has been detected in the matching processing 536, the matching image detecting unit 510 outputs a notification to that effect to the control unit 520. Upon receiving the notification, the control unit 520 performs end processing to end the panorama image imaging operation. That is to say, the imaging operation ends after imaging operation of an image corresponding to the end position of the panorama image imaging operation has ended.

Now, in the event that an image matching the held image 511 is not detected in the matching processing, end processing is performed at the panorama image imaging range set beforehand (the end position (or a position advanced a predetermined angle from the end position)).

Also, while an example has been illustrated in which matching processing is sequentially performed while the swing operation of the imaging apparatus 500 is being performed, an arrangement may be made wherein matching processing is only performed within a certain range from the end position of the panorama image imaging operation that has been set beforehand. For example, matching processing may be started in the event of reaching within a range of ±5° from the end position. Accordingly, the load on the imaging apparatus 500 when performing imaging operations can be reduced. Also, matching processing can be suitably performed even in a case where a great part of the panorama has few features.

Operation Example of Imaging Apparatus

FIGS. 16 and 17 are a flowchart illustrating an example of processing procedures for imaging control processing by the imaging apparatus 500 according to the second embodiment of the present technology. FIGS. 16 and 17 are a modification of FIGS. 11 and 12, so portions common to FIGS. 11 and 12 will be denoted with the same reference numerals, and part of the description thereof will be omitted.

After the end position of the panorama image imaging operation has been set (step S903), the matching image detecting unit 510 holds an image generated by the imaging device 112 at the time of the deciding operation having been accepted (step S921).

Also, after recording processing of the generated imaged image has been performed (step S915), the matching image detecting unit 510 determines whether or not the generated image and the image that is held (held image) match (step S922). In the event that the generated image and the held image do not match (No in step S922), the flow returns to step S913. On the other hand, in the event that the generated image and the held image match (Yes in step S922), the matching image detecting unit 510 outputs a notification to that effect to the control unit 160. Thus, end processing of the panorama image imaging operation is performed, and the image combining unit 120 generates a panorama image (step S917).

3. Third Embodiment

With the first embodiment according to the present technology, an example has been illustrated in which the deciding operation of the end position and start position for the panorama image imaging operation is performed manually. Now, in the event that the image size (angle) of the panorama image has been set beforehand, it can be conceived to automatically decide the start position and end position of the panorama image imaging operation by deciding a predetermined position on the panorama image (e.g., intermediate position). Accordingly, with the third embodiment of the present technology, an example will be illustrated of automatically deciding the start position and end position of the panorama image imaging operation by deciding a predetermined position on the panorama image. Note that the configuration of the imaging apparatus according to the third embodiment according to the present technology is generally the same as that of the example shown in FIG. 1. Accordingly, portions which are in common with the first embodiment according to the present technology are denoted with the same reference numerals, and description thereof will be omitted.

Example of Panorama Image Imaging Operation

Figure 18A:
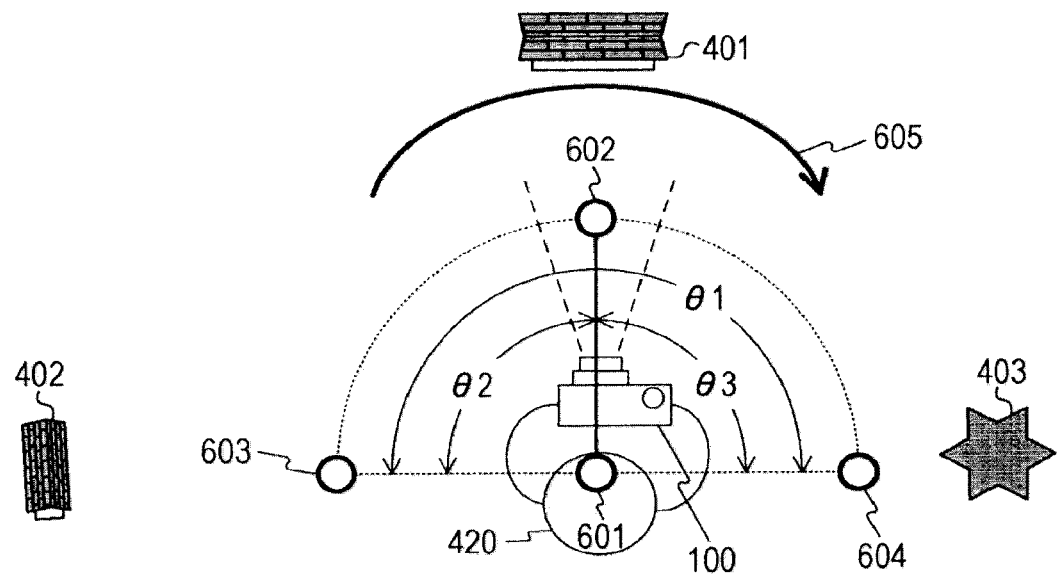
FIG. 18A is an image illustrating an example of a relation between the attitude of the imaging apparatus according to a third embodiment of the present technology, and the display screen displayed on the input/output panel.
Figure 18B:
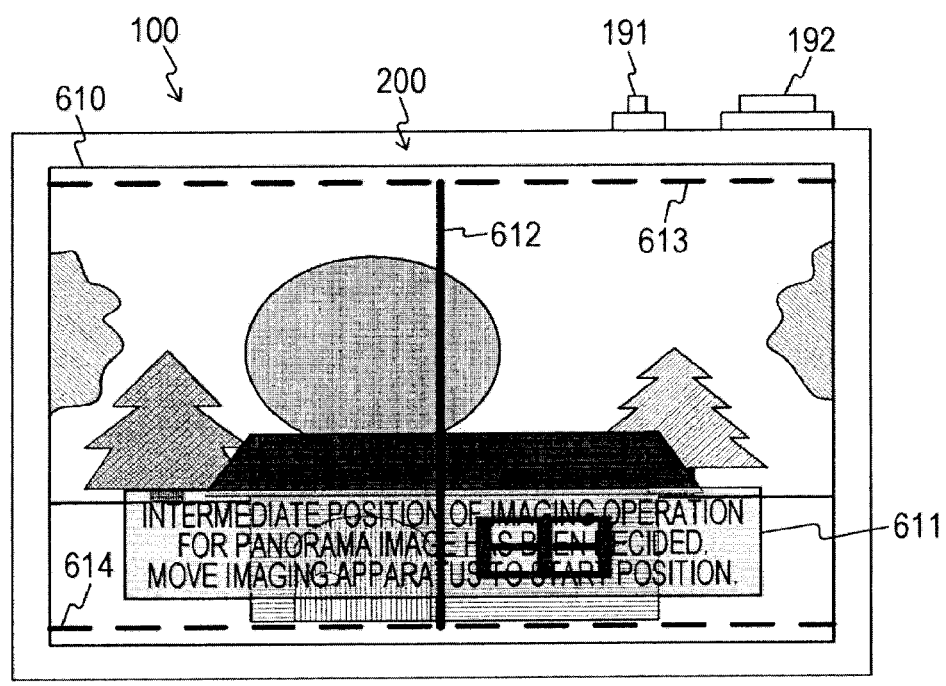
FIG. 18B is another image illustrating an example of a relation between the attitude of the imaging apparatus according to a third embodiment of the present technology, and the display screen displayed on the input/output panel.

FIGS. 18A and 18B are images illustrating an example of a relation between the attitude of the imaging apparatus 100 according to the third embodiment of the present technology, and the display screen displayed on the input/output panel 200. Note that in the same way as with FIG. 5A and other drawings, only the buildings 401 and 402 and the large tree 403 in the place 400 shown in FIG. 4A are shown, and others are omitted from illustration, to facilitate description, in FIG. 18A. Also, FIGS. 18A and 18B illustrate an example of imaging operations in a case where a 180° image size has been set beforehand.

FIG. 18A illustrates a state of the imaging apparatus 100, and the user 420 in a state of holding the imaging apparatus 100 in both hands, as viewed from above in a simplified manner. We will say that the user 420 has confirmed an intermediate position in the panorama image (a position equivalent to the center of the panorama image) while watching the subject displayed on the input/output panel 200, and has performed a deciding operation to decide the intermediate position of the panorama image. This deciding operation can be performed by a full-pressing operation of the shutter button 191.

For example, the user 420 decides the intermediate position in the panorama image while viewing the LV image displayed on the input/output panel 200. In the event that an imaging range including the building 401 is to be decided as the intermediate position as shown in FIG. 18A, for example, the user 420 performs a full-press operation (deciding operation) of the shutter button 191 in the state shown in FIG. 18A. In the event that an intermediate position deciding operation has been performed in this way, the control unit 160 takes the attitude of the imaging apparatus 100 at the time of that deciding operation having been made as a reference attitude. That is to say, the attitude relating to the attitude information output from the attitude detecting unit 150 at the time of the deciding operation having been made is decided as being the reference attitude of the imaging apparatus 100. Note that an example of a display screen displayed on the input/output panel 200 after the user 420 having decided the intermediate position of the panorama image imaging operation is shown in FIG. 18B.

Now, description will be made regarding a method for deciding the start position and end position of the imaging operation in the horizontal direction, with the set image size being θ1 (180°). Now, we will say that the user 420 has performed a full-press operation of the shutter button 191 in the state shown in FIG. 18A. In this case, a start position 603 and end position 604 of the imaging operation is decided based on the set image size θ1, with the optical axis direction from a position 601 at the time of making the operation (direction of intermediate position 602) as a reference. Specifically, based on the image size θ1, an angle) θ2 (90°) from the intermediate position 602 to the start position 603 of the imaging operation, and an angle θ3 (90°) from the intermediate position 602 to the end position 604 of the imaging operation, are decided. That is to say, θ2=θ1/2 and θ3=θ1/2 are calculated.

Note that a position other than the intermediate position may be decided as being the reference position. For example, in the event that 120° is decided as the image size, 40° (i.e., 40° from the start position) may be used as a reference position. In this case, θ2=θ1×θ(1/3) and θ3=θ1×θ(2/3) hold. Note that this reference position may be changed by user operations.

FIG. 18B shows an operation assisting screen 610 displayed at the time of the deciding operation to decide the intermediate position of the panorama image being performed. The operation assisting screen 610 has the subject currently being imaged as an LV image, and also a message display region 611 and operation supporting images 612 through 614 being displayed superimposed on the LV image.

The message display region 611 displays a message to the effect that the intermediate position of the panorama image imaging operation has been decided, and displays a message prompting the user to move the imaging apparatus 100 to the start position of the panorama image imaging operation.

The operation supporting images 612 and 613 are dotted lines (overall rectangular dotted lines) indicating the panorama image imaging range (rectangular shape), in the same way as with the first embodiment of the present technology, and are disposed on the LV image displayed on the operation assisting screen 610. Also, the operation supporting image 614 is a solid line indicating the center position in the panorama image (center position in the swing direction), and is situated on the LV image displayed on the operation assisting screen 610, in the same way as with the first embodiment of the present technology.

Note that the method for displaying operation assisting screens corresponding to change in the attitude of the imaging apparatus 100 is generally the same as with the first embodiment of the present technology, so description thereof will be omitted here. Thus, a panorama image according to user preferences can be easily generated even in a case of deciding a position other than the end position of the panorama image imaging operation (e.g., intermediate position) as a reference position.

4. Fourth Embodiment

With the first embodiment according to the present technology, an example of an imaging apparatus having a single imaging unit has been described. Now, a case where a single imaging apparatus has multiple imaging units (e.g., a main camera and auxiliary camera) is conceivable. In this case, while the panorama image imaging operation can be performed using one imaging unit (e.g., the main camera), using the other imaging unit (e.g., auxiliary camera) in the panorama image imaging operation is conceivable. Accordingly, with the fourth embodiment according to the present technology, an example of performing the panorama image imaging operation using an imaging apparatus having multiple imaging units will be illustrated.

Example of External Configuration of Imaging Apparatus

Figure 19A:
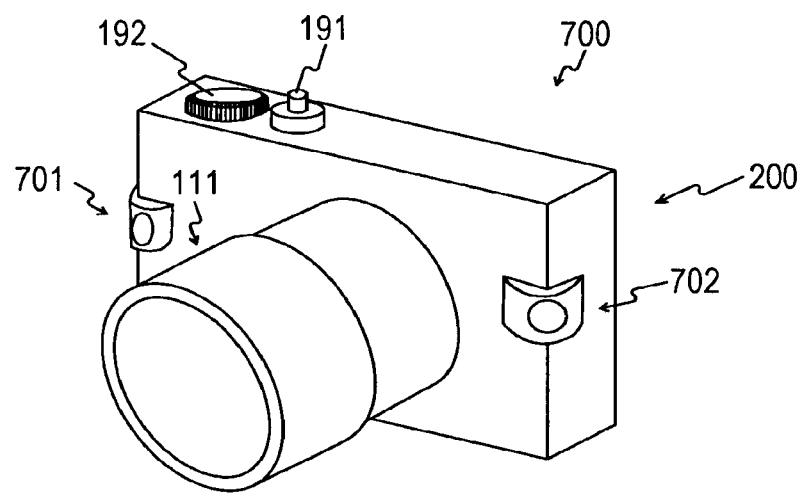
FIG. 19A is an external configuration diagram showing an external view of the imaging apparatus according to the fourth embodiment of the present technology.
Figure 19B:
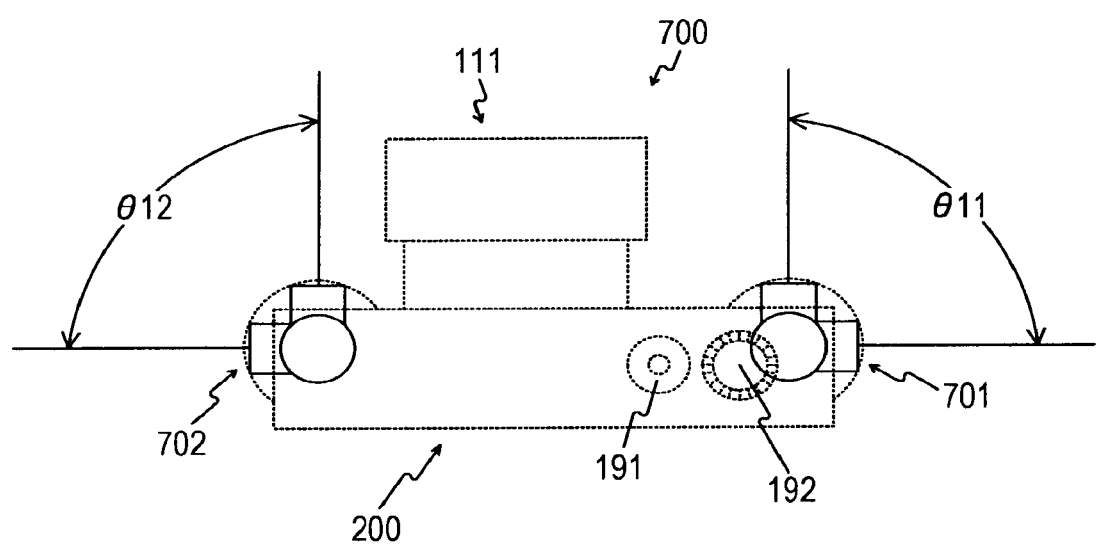
FIG. 19B is another external configuration diagram showing another external view of the imaging apparatus according to the fourth embodiment of the present technology.

FIGS. 19A and 19B are external configuration diagrams showing external views of the imaging apparatus 700 according to the fourth embodiment of the present technology. FIG. 19A is a perspective view illustrating the external view of the front side of an imaging apparatus 700. Also, FIG. 19B is an upper view illustrating the upper face of the imaging apparatus 700 (i.e., the face where the shutter button 191 and dial 192 are provided). Note that portions other than a right side lens unit 701 and a left side lens unit 702 are illustrated with dotted lines in a simplified manner, in FIG. 19B. Note that the imaging apparatus 700 is a partial modification of the imaging apparatus 100 shown in FIGS. 2A and 2B. Accordingly, in FIGS. 19A and 19B, parts which are the same as with the imaging apparatus 100 are denoted with the same reference numerals, and part of the description thereof will be omitted.

The imaging apparatus 700 has a right side lens unit 701 and a left side lens unit 702. The right side lens unit 701 and left side lens unit 702 are configured of multiple lenses which collect light from the subject (zoom lens, focusing lens, etc.), and are turnable in a particular direction (the horizontal direction in the example shown in FIGS. 19A and 19B). For example, the right side lens unit 701 may be turnable in the horizontal direction by $\theta 11$ (degrees), and the left side lens unit 702 turnable in the horizontal direction by $\theta 12$ (degrees). For example, $\theta 11=\theta 12=90$ (degrees) may be implemented.

In this case, a range from a position where the optical axis direction of the right side lens unit 701 and the optical axis direction of the lens unit 111 are parallel, to a position where the optical axis direction of the right side lens unit 701 and the optical axis direction of the lens unit 111 are orthogonal, may be the turning range of the right side lens unit 701. In the same way, a range from a position where the optical axis direction of the left side lens unit 702 and the optical axis direction of the lens unit 111 are parallel, to a position where the optical axis direction of the left side lens unit 702 and the optical axis direction of the lens unit 111 are orthogonal, may be the turning range of the left side lens unit 702.

Example of Functional Configuration of Imaging Apparatus

Figure 20:
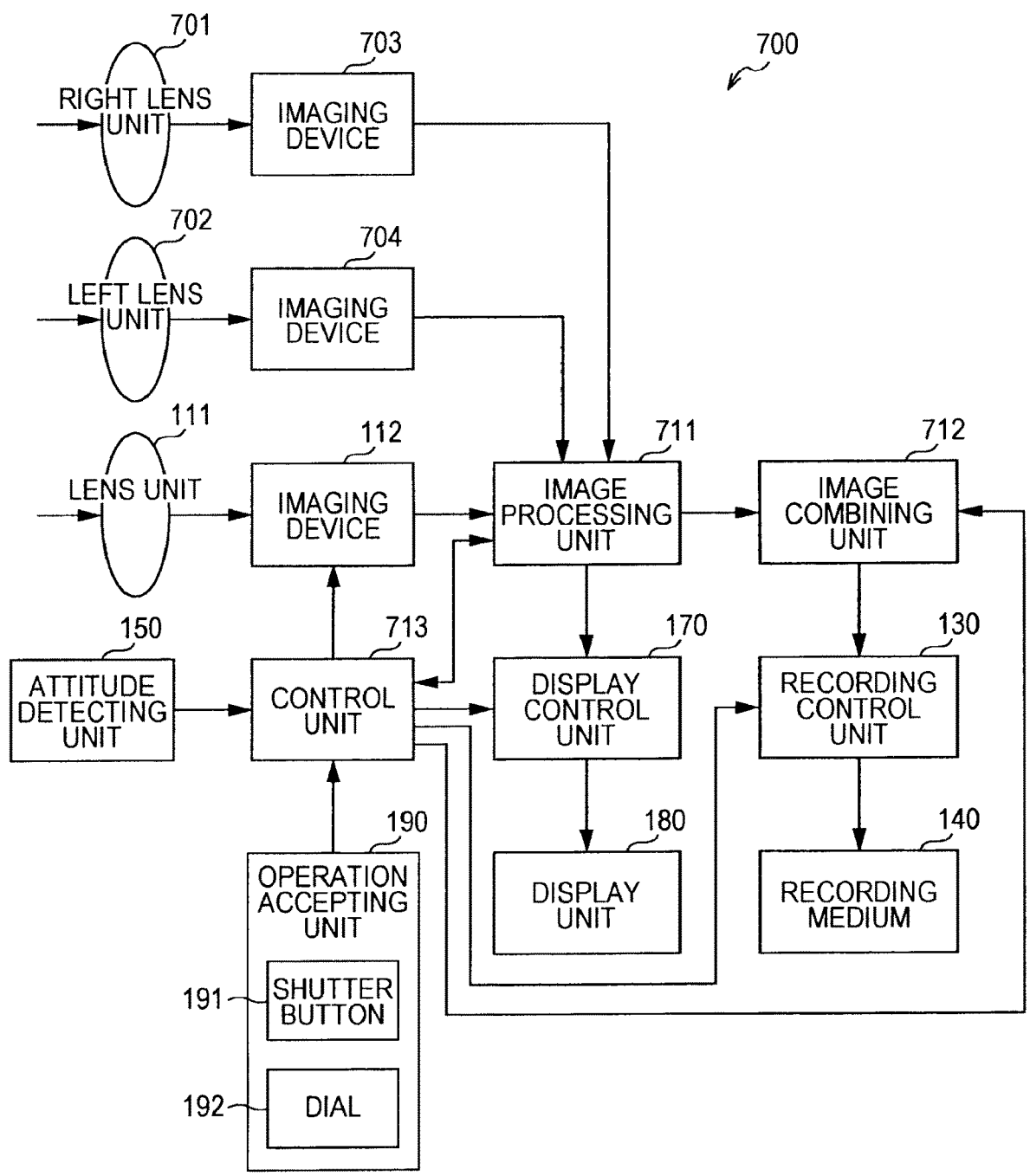
FIG. 20 is a block diagram illustrating a functional configuration example of the imaging apparatus according to the fourth embodiment of the present technology.

FIG. 20 is a block diagram illustrating a functional configuration example of the imaging apparatus 700 according to the fourth embodiment of the present technology. Note that the imaging apparatus 700 is a partial modification of the imaging apparatus 100 shown in FIG. 1. Accordingly, in FIG. 20, parts which are the same as with the imaging apparatus 100 are denoted with the same reference numerals, and part of the description thereof will be omitted.

The imaging apparatus 700 includes the right side lens unit 701, the left side lens unit 702, an imaging device 703, an imaging device 704, an image processing unit 711, an image combining unit 712, and a control unit 713. The right side lens unit 701 and left side lens unit 702 are the same as shown in FIGS. 19A and 19B. Light from the subject input via the right side lens unit 701 and an iris are supplied to the imaging device 703, and light from the subject input via the left side lens unit 702 and an iris are supplied to the imaging device 704.

The imaging device 703 converts the light input via the right side lens unit 701 (incident light from the subject) to generate an image (image data), and supplies the generated image to the image processing unit 711. The imaging device 704 converts the light input via the left side lens unit 702 (incident light from the subject) to generate an image (image data), and supplies the generated image to the image processing unit 711. Note that the imaging device 112 is an example of an imaging unit described in the Summary. Also, the imaging devices 703 and 704 are examples of a second imaging unit described in the Summary.

That is to say, the lens unit 111 and imaging device 112 function as the main camera, and the right side lens unit 701 and imaging device 703, and the left side lens unit 702 and imaging device 704, function as an auxiliary camera (sub camera). Also, the auxiliary camera may be situated such that the optical axis direction of the main camera and the optical axis direction of the auxiliary camera are different. Note that cameras with different functions may be used as the main camera and auxiliary camera. For example, an arrangement may be made wherein the main camera is a camera having resolution of around 12 million pixels, while the auxiliary camera is a camera having resolution of around 2 million pixels.

The image processing unit 711 processes various types of images with regard to the images (image data) generated by each of the imaging device 112, imaging device 703, and imaging device 704, under control of the control unit 713. Also, the image processing unit 711 supplies images (image data) subjected to image processing to the image combining unit 712 and display control unit 170.

The image combining unit 712 combines a panorama image using multiple image supplied from the image processing unit 711, and supplies the generated panorama image to the recording control unit 130, under control of the control unit 713.

In the event that a deciding operation is accepted in the state of the optical axis direction of the auxiliary camera facing the start position or end position of the panorama image imaging operation, the control unit 713 decides the panorama image imaging range based on the positional relation between the main camera and auxiliary camera. The deciding operation is a deciding operation where the intermediate position in the panorama image is decided to be the reference position.

Example of Screen for Setting Method for Shooting Panorama Image

Figure 21:
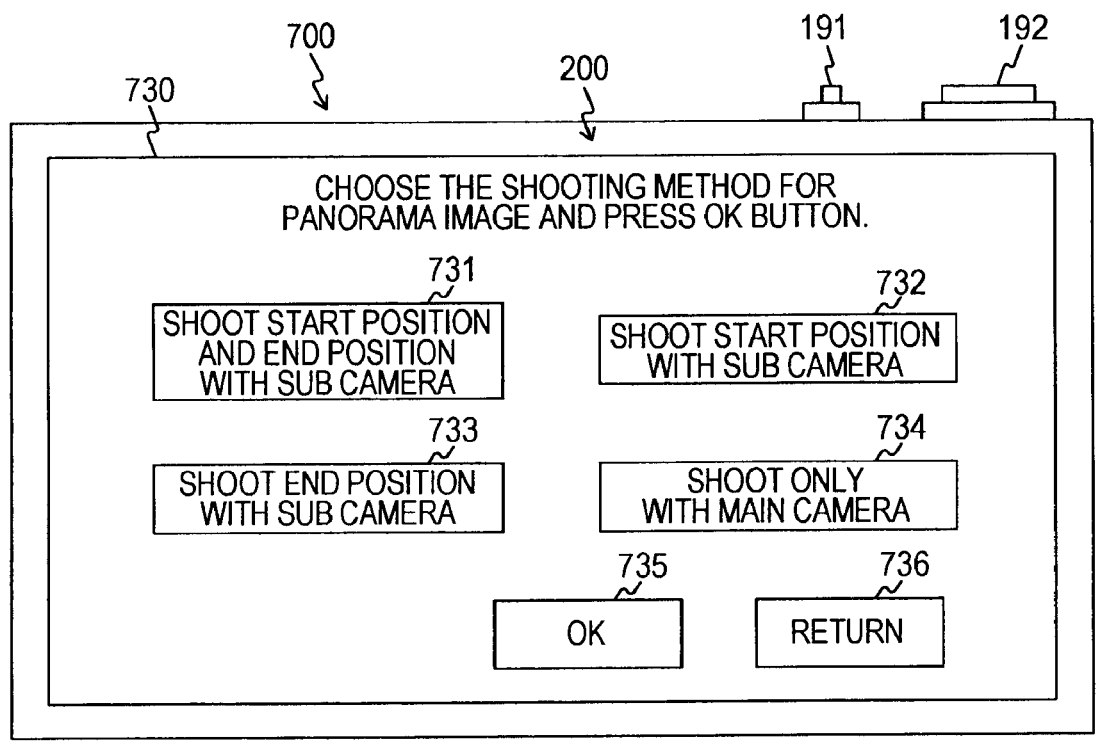
FIG. 21 is a diagram illustrating an example of a settings screen (shooting method setting screen) displayed on the input/output panel of the imaging apparatus according to the fourth embodiment of the present technology.

FIG. 21 is a diagram illustrating a setting screen (shooting method setting screen 730) displayed on the input/output panel 200 in the fourth embodiment according to the present technology. The shooting method setting screen 730 is a screen displayed on the input/output panel 200 at the time of setting the panorama image shooting method. For example, the shooting method setting screen 730 is displayed immediately after the panorama image imaging mode setting operation has been performed. The shooting method setting screen 730 includes selection buttons 731 through 734, an OK button 735, and a return button 736.

The selection buttons 731 through 734 are buttons used for setting the panorama image shooting method. Now, the panorama image shooting method corresponding to the setting button 734 corresponds to the shooting method illustrated with the first embodiment of the preset technology. Also, the panorama image shooting methods corresponding to selection buttons 731 through 733 will be described in detail with reference to FIGS. 22A through 24B. Note that in the following description, the panorama image shooting method corresponding to the selection button 731 will be called "first shooting method". Also, the panorama image shooting method corresponding to the selection button 732 will be called "second shooting method", and the panorama image shooting method corresponding to the selection button 733 will be called "third shooting method".

The OK button 735 is a button pressed after a selection operation has been made to select the panorama image shooting method, so as to finalize that selection. Also, information relating to the panorama image shooting method decided by a pressing operation of the OK button 735 (shooting method information) is output to the control unit 160 and held. The return button 736 is a button pressed to return to the display screen displayed immediately before.

Example of Panorama Image Imaging Operation (First Shooting Method)

Figure 22A:
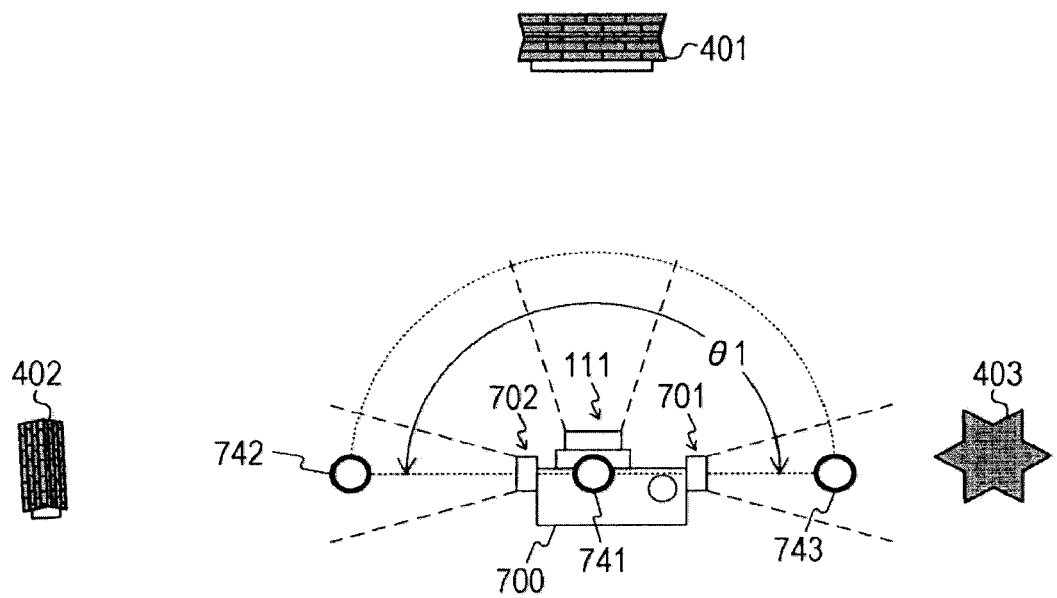
FIG. 22A is a diagram schematically illustrating a transition example of the attitude of the imaging apparatus according to the fourth embodiment of the present technology and a display screen displayed on the input/output panel.
Figure 22B:
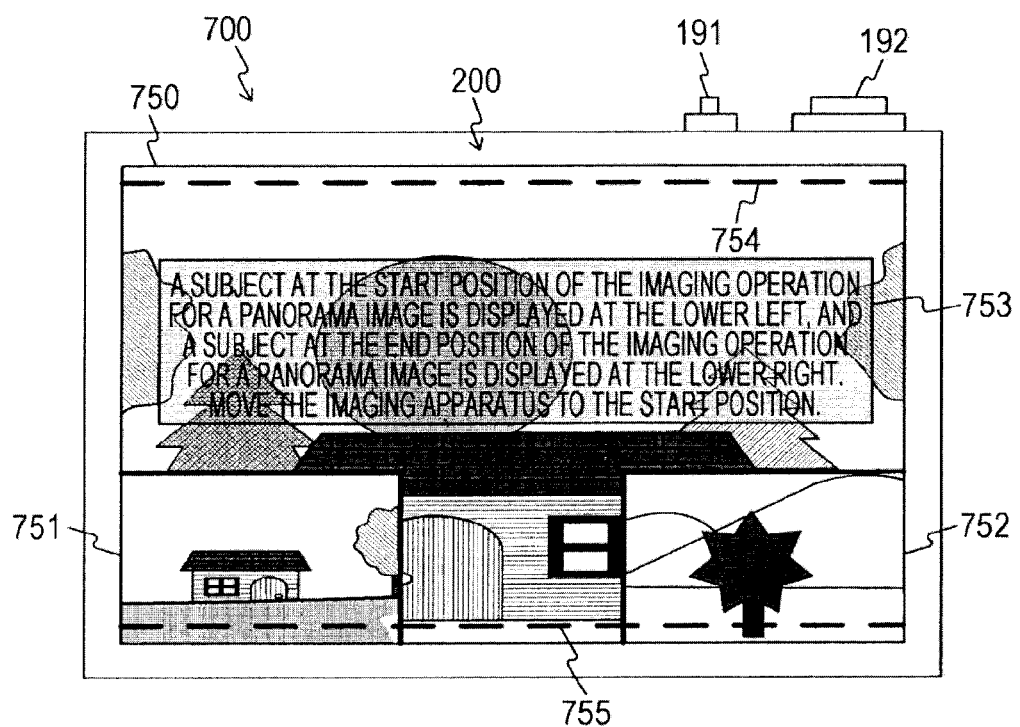
FIG. 22B is another diagram schematically illustrating a transition example of the attitude of the imaging apparatus according to the fourth embodiment of the present technology and a display screen displayed on the input/output panel.

FIGS. 22A and 22B are diagrams schematically illustrating a transition example of the attitude of the imaging apparatus 700 according to the fourth embodiment of the present technology and a display screen displayed on the input/output panel 200. Note that in the same way as with FIG. 5A and other drawings, only the buildings 401 and 402 and the large tree 403 in the place 400 shown in FIG. 4A are shown, and others are omitted from illustration, to facilitate description, in FIG. 22A. Also, FIGS. 22A and 22B illustrate an example of imaging operations in a case where a 180° image size has been set beforehand. Also, FIGS. 22A and 22B illustrate an example of imaging operations in a case where a first imaging method has been set (i.e., a case where a panorama image shooting method corresponding to the selection button 731 in FIG. 21 has been set).

Now, in the event that the first shooting method has been set, we will say that the optical axis directions of each of the right side lens unit 701 and left side lens unit 702 are determined based on the image size that has been set. For example, in the event that the image size that has been set is θ1, the optical axis directions of each of the right side lens unit 701 and left side lens unit 702 are each determined to be a position turned by θ1/2 from the optical axis direction of the lens unit 111. For example, in the event that the set image size is 180° as shown in FIG. 22A, the optical axis directions of each of the right side lens unit 701 and left side lens unit 702 are determined to be positions turned by 90° from the optical axis direction of the lens unit 111. That is to say, the optical axis direction of the lens unit 111 and the optical axis directions of the right side lens unit 701 and left side lens unit 702 are each determined to be at orthogonal positions. Note that the right side lens unit 701 and left side lens unit 702 can be automatically moved in accordance with the image size, by one or multiple driving units (not shown), under control of the control unit 713.

FIG. 22A illustrates a state of the imaging apparatus 700 in which the optical axis direction of the lens unit 111 is facing the direction of the building 401, as viewed from above, in a simplified manner. FIG. 22B shows an operation assisting screen 750 displayed in the event that a deciding operation to decide the intermediate position of the panorama image (deciding operations of start position and end position) has been performed.

The operation assisting screen 750 has a start position subject display region 751, an end position subject display region 752, a message display region 753, and operation supporting images 754 and 755, superimposed on the LV image. Note that the LV image is an image generated by the imaging device 112 based on the subject light input via the lens unit 111 (i.e., an image including the building 401). That is to say, this is an image including the subject which is currently being imaged by the main camera.

The start position subject display region 751 has displayed therein an image generated by the imaging device 704 based on the subject light input via the left side lens unit 702 (i.e., an image including the building 402). The end position subject display region 752 has displayed therein an image generated by the imaging device 703 based on the subject light input via the right side lens unit 701 (i.e., an image including the large tree 403).

The message display region 753 has displayed therein a message to the effect that the subjects existing at the start position and end position of the panorama image imaging operation are displayed, and a message prompting the user to move the imaging apparatus 700 to the start position of the panorama image imaging operation. The operation supporting images 754 and 755 are, in the same way as with the first embodiment according to the present technology, images (dotted lines) indicating the imaging range of the panorama image in the vertical direction.

Now, the user can confirm the position of the panorama image while watching the subjects displayed on the input/output panel 200 (the subjects existing at the start position, intermediate position, and end position), and perform a deciding operation to decide the intermediate position (start position and end position) of the panorama image. This deciding operation can be performed by full-pressing of the shutter button 191, in the same way as with the first embodiment according to the present technology.

For example, the user can decide the imaging range corresponding to the panorama image while viewing the LV image displayed on the input/output panel 200. For example, as shown in FIG. 22A, in a case where the position of the building 402 is to be the start position 742 and the position of the large tree is to be the end position 743, the user performs a full-press operation of the shutter button 191 (deciding operation) in the state shown in FIG. 22A. In the event that such a deciding operation has been performed, the control unit 713 takes the attitude of the imaging apparatus 700 at the time that the deciding operation was performed as being the reference attitude. That is to say, the attitude relating to the attitude information output from the attitude detecting unit 150 at the time of that deciding operation being performed is determined as the reference attitude of the imaging apparatus 700.

Now, the start position subject display region 751 and end position subject display region 752 may continue to display only the images from the time of the deciding operation, until the panorama image imaging operation ends. Accordingly, the user performing the panorama image imaging operation can easily visually comprehend the start position and end position of the panorama image imaging operation.

Thus, by displaying a subject equivalent to the start position 742 in the start position subject display region 751, and displaying a subject equivalent to the end position 743 in the end position subject display region 752, the user can easily comprehend the positions in the panorama image. Now, the method for displaying the operation supporting images in accordance with the change in attitude of the imaging apparatus 700 is generally the same as with the first embodiment according to the present technology, so description thereof will be omitted here.

Example of Panorama Image Imaging Operation (Second Shooting Method)

Figure 23A:
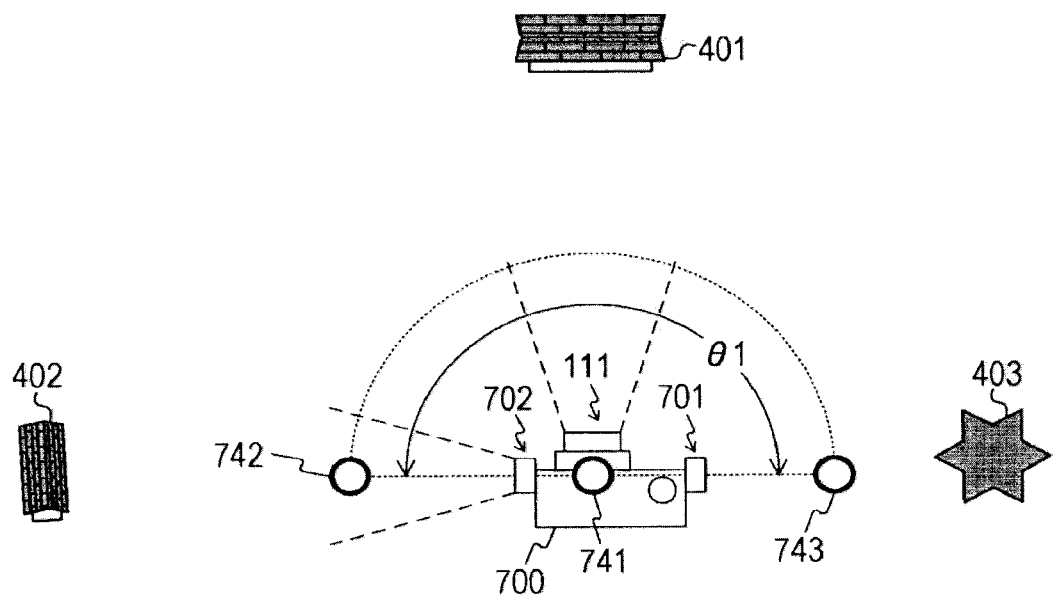
FIG. 23A is a diagram schematically illustrating a transition example of the attitude of the imaging apparatus according to the fourth embodiment of the present technology and a display screen displayed on the input/output panel.
Figure 23B:
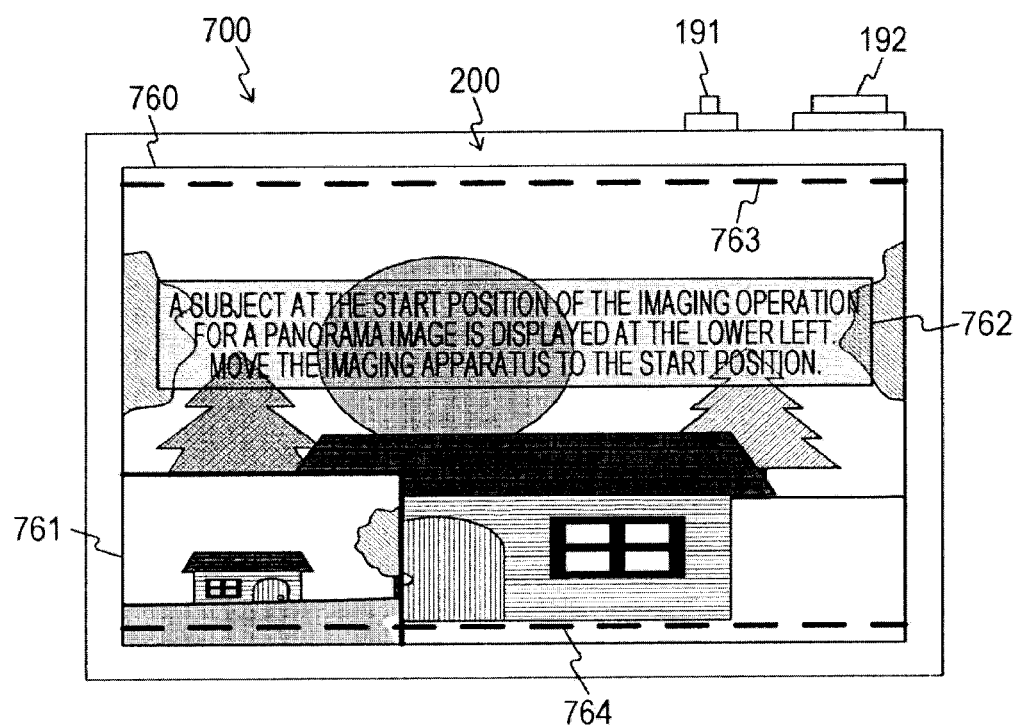
FIG. 23B is another diagram schematically illustrating a transition example of the attitude of the imaging apparatus according to the fourth embodiment of the present technology and a display screen displayed on the input/output panel.

FIGS. 23A and 23B are diagrams schematically illustrating a transition example of the attitude of the imaging apparatus 700 according to the fourth embodiment of the present technology and a display screen displayed on the input/output panel 200. Note that in the same way as with FIG. 5A and other drawings, only the buildings 401 and 402 and the large tree 403 in the place 400 shown in FIG. 4A are shown, and others are omitted from illustration, to facilitate description, in FIG. 23A. Also, FIGS. 23A and 23B illustrate an example of imaging operations in a case where a 180° image size has been set beforehand. Also, FIGS. 23A and 23B illustrate an example of imaging operations in a case where a second imaging method has been set (i.e., a case where a panorama image shooting method corresponding to the selection button 732 in FIG. 21 has been set).

Now, in the event that the second shooting method has been set, we will say that the optical axis direction of the left side lens unit 702 is determined based on the image size that has been set. For example, in the event that the image size that has been set is θ1, the optical axis directions of the left side lens unit 702 is determined to be a position turned by θ1/2 from the optical axis direction of the lens unit 111. For example, in the event that the set image size is 180° as shown in FIG. 23A, the optical axis direction of the left side lens unit 702 is determined to be a position turned by 90° from the optical axis direction of the lens unit 111. That is to say, the optical axis direction of the lens unit 111 and the optical axis direction of the left side lens unit 702 are determined to be at orthogonal positions. Note that the left side lens unit 702 can be automatically moved in accordance with the image size, by a driving unit (not shown), under control of the control unit 713.

FIG. 23A illustrates a state of the imaging apparatus 700 in which the optical axis direction of the lens unit 111 is facing the direction of the building 401, as viewed from above, in a simplified manner. FIG. 23B shows an operation assisting screen 760 displayed in the event that a deciding operation to decide the intermediate position (start position) of the panorama image has been performed.

The operation assisting screen 760 has a start position subject display region 761, a message display region 762, and operation supporting images 763 and 764, superimposed on the LV image. Note that the operation assisting screen 760 is generally the same as the operation supporting image 750 illustrated in FIG. 22B, other than the point that the end position subject display region 752 illustrated in FIG. 22B is not displayed therein. Accordingly, detailed description here will be omitted. Thus, by displaying a subject equivalent to the start position 742 in the start position subject display region 761, the user can easily comprehend the positions in the panorama image.

Example of Panorama Image Imaging Operation (Third Shooting Method)

Figure 24A:
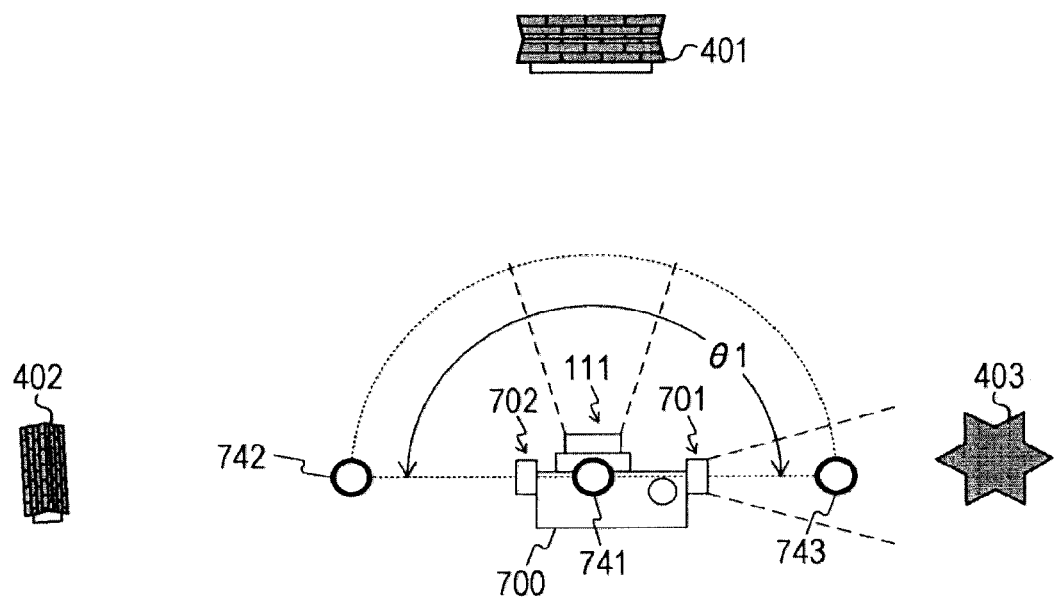
FIG. 24A is a diagram schematically illustrating a transition example of the attitude of the imaging apparatus according to the fourth embodiment of the present technology and a display screen displayed on the input/output panel.
Figure 24B:
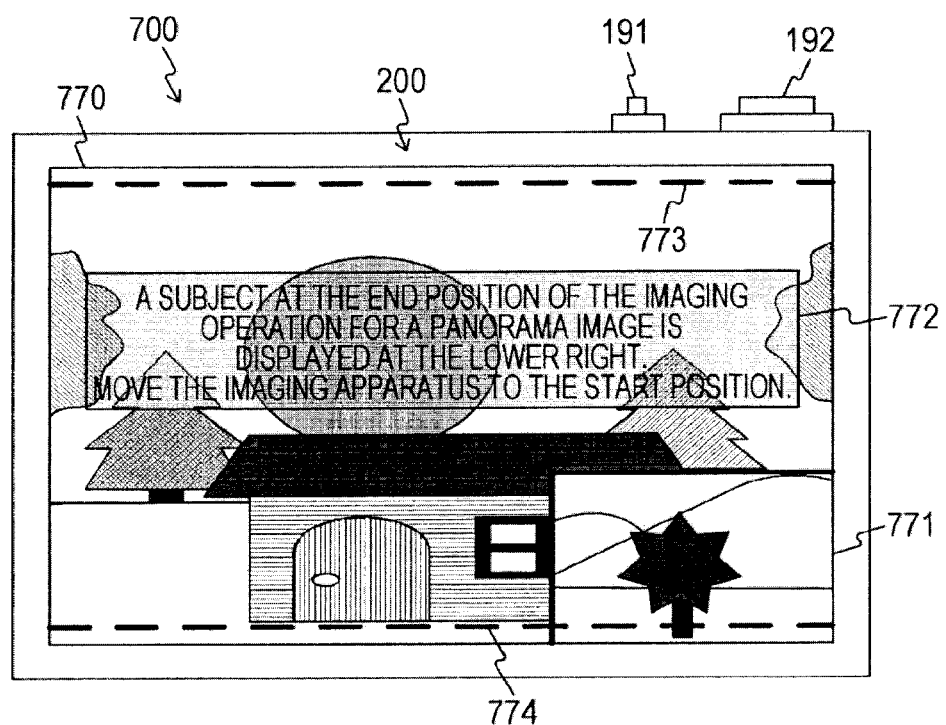
FIG. 24B is another a diagram schematically illustrating a transition example of the attitude of the imaging apparatus according to the fourth embodiment of the present technology and a display screen displayed on the input/output panel.

FIGS. 24A and 24B are diagrams schematically illustrating a transition example of the attitude of the imaging apparatus 700 according to the fourth embodiment of the present technology and a display screen displayed on the input/output panel 200. Note that in the same way as with FIG. 5A and other drawings, only the buildings 401 and 402 and the large tree 403 in the place 400 shown in FIG. 4A are shown, and others are omitted from illustration, to facilitate description, in FIG. 24A. Also, FIGS. 24A and 24B illustrate an example of imaging operations in a case where a 180° image size has been set beforehand. Also, FIGS. 24A and 24B illustrate an example of imaging operations in a case where a third imaging method has been set (i.e., a case where a panorama image shooting method corresponding to the selection button 733 in FIG. 21 has been set).

Now, in the event that the third shooting method has been set, we will say that the optical axis direction of right side lens unit 701 are determined based on the image size that has been set. For example, in the event that the image size that has been set is θ1, the optical axis directions of the right side lens unit 701 is determined to be a position turned by θ1/2 from the optical axis direction of the lens unit 111. For example, in the event that the set image size is 180° as shown in FIG. 24A, the optical axis direction of the right side lens unit 701 is determined to be a position turned by 90° from the optical axis direction of the lens unit 111. That is to say, the optical axis direction of the lens unit 111 and the optical axis direction of the right side lens unit 701 are determined to be at orthogonal positions. Note that the right side lens unit 701 can be automatically moved in accordance with the image size, by a driving unit (not shown), under control of the control unit 713.

FIG. 24A illustrates a state of the imaging apparatus 700 in which the optical axis direction of the lens unit 111 is facing the direction of the building 401, as viewed from above, in a simplified manner. FIG. 24B shows an operation assisting screen 770 displayed in the event that a deciding operation to decide the intermediate position (end position) of the panorama image has been performed.

The operation assisting screen 770 has a start position subject display region 771, a message display region 772, and operation supporting images 773 and 774, superimposed on the LV image. Note that the operation assisting screen 770 is generally the same as the operation supporting image 750 illustrated in FIG. 22B, other than the point that the start position subject display region 751 illustrated in FIG. 22B is not displayed therein. Accordingly, detailed description here will be omitted. Thus, by displaying a subject equivalent to the end position 743 in the end position subject display region 771, the user can easily comprehend the positions in the panorama image.

Note that an arrangement may be made where, using an image generated with the auxiliary camera, start processing of the imaging operation at the start position of the panorama image imaging operation, or end processing of the imaging operation at the end position of the panorama image imaging operation, is automatically performed. For example, the second embodiment according to the present technology may be applied. Specifically, an image displayed in the start position subject display region (i.e., an image generated by the imaging device 704) is held, and the start position of the panorama image imaging operation is detected by matching processing between the held image and the images generated by the imaging device 112. In the event that the start position has been detected, the start processing of the panorama image imaging operation is automatically performed. In the same way, an image displayed in the end position subject display region (i.e., an image generated by the imaging device 703) is held, and the end position of the panorama image imaging operation is detected by matching processing between the held image and the images generated by the imaging device 112. In the event that the end position has been detected, the end processing of the panorama image imaging operation is automatically performed.

Example of Generating Panorama Image Using Image of Auxiliary Camera

So far, examples of using images generated by the main camera for generating a panorama image have been illustrated. Here, an example will be described of using images generated by the main camera and images generated by the auxiliary camera to generate a panorama image.

Figure 25A:
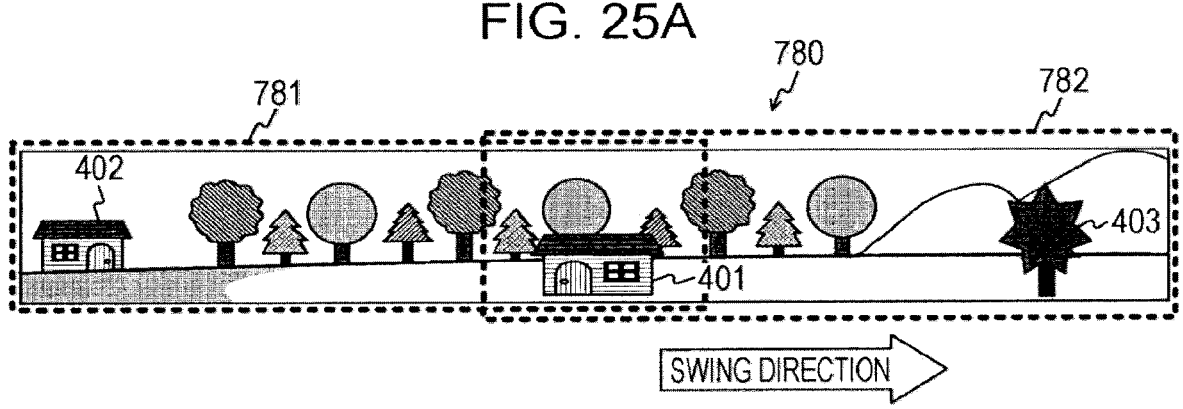
FIG. 25A is a diagram illustrating an example of combining a panorama image using images generated by multiple imaging units according to the fourth embodiment of the present technology.
Figure 25B:
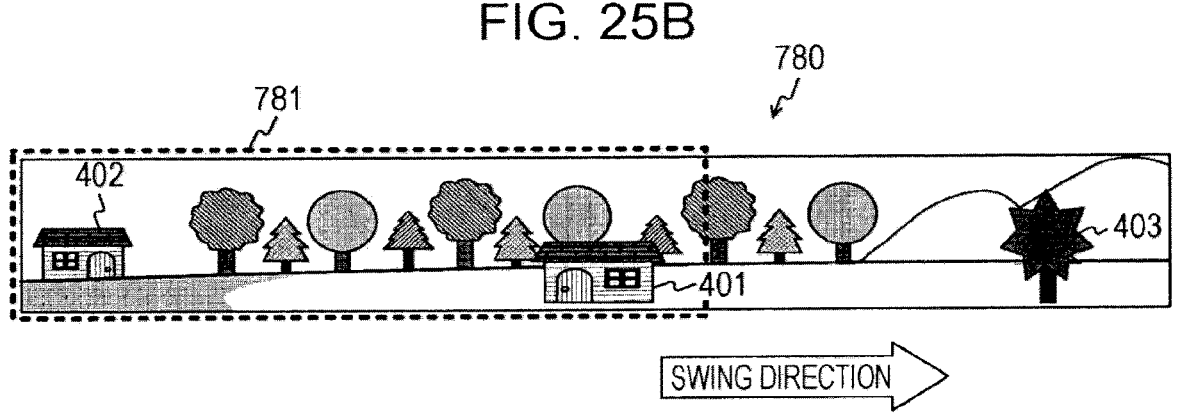
FIG. 25B is another diagram illustrating an example of combining a panorama image using images generated by multiple imaging units according to the fourth embodiment of the present technology.
Figure 25C:
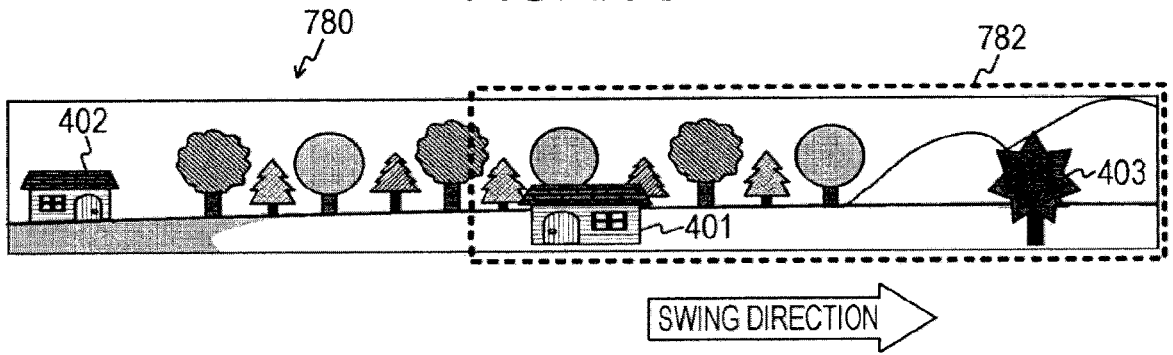
FIG. 25C is a further diagram illustrating an example of combining a panorama image using images generated by multiple imaging units according to the fourth embodiment of the present technology.

FIGS. 25A through 25C are diagrams illustrating an example of combining a panorama image using images generated by multiple imaging units according to the fourth embodiment of the present technology. Herein, in a case of taking a scene with great differences in light and dark (e.g., a sunset scene shown in FIG. 32A) as the panorama image imaging range, it can be assumed that the dynamic range of the imaging device 112 which the imaging apparatus 700 has will be insufficient. In a case of insufficient dynamical range of the imaging device 112 in this way, there may be cases where the bright portions in the panorama image become saturated and exhibit whiteout, while the dark portions in the panorama image become exhibit blackout.

Now, there exists a technique in which a combined image with an extended dynamic range is generated, by combining a long-exposure-time image and a short-exposure-time image with different exposure times, for example. Note that the long-exposure-time image and short-exposure-time image are imaged images continuously generated under different exposure conditions. Specifically, the short-exposure-time image is an imaged image of which the exposure time is relatively short, for example, with priority on relatively bright portions of the subjects in the same shooting scene. On the other hand, the long-exposure-time image is an imaged image of which the exposure time is relatively long, for example, with priority on relatively dark portions of the subjects in the same shooting scene. Accordingly, a combined image in which highlight and shadow gradients have been reproduced can be generated by combining the long-exposure-time image and short-exposure-time image, and the dynamic range can be expanded.

Accordingly, with the example shown in FIGS. 25A through 25C, an example is illustrated of expanding the dynamic range using images generated by multiple imaging devices. FIG. 25A illustrates an example of generating a panorama image using images generated by the imaging devices 112, 703, and 704.

We will say that, for example, an imaging range to be imaged by the imaging device 112 is a main camera imaging range 780. We will also say that an imaging range to be imaged by the imaging device 704 is an auxiliary camera imaging range 781, and an imaging range to be imaged by the imaging device 703 is an auxiliary camera imaging range 782.

For example, the imaging device 112 generates a normal imaging image, and the imaging devices 703 and 704 generate multiple imaged images with different exposure conditions (long-exposure-time image and short-exposure-time image). Specifically, the imaging devices 703 and 704 generate a long-exposure-time image and a short-exposure-time image by imaging the same subject twice in a row, with different exposure conditions from those of the imaging device 112 during the panorama image imaging operation.

The image combining unit 712 generates a panorama image with an expanded dynamic range in at least a partial region, by combining multiple images generated by the imaging devices 703 and 704 with the multiple images generated by the imaging device 112. For example, the image combining unit 712 decides the combining ratio of pixels in accordance with luminance of the pixels making up the short-exposure-time image, and performs high dynamic range combining processing regarding the images output from the image processing unit 711 (long-exposure-time image and short-exposure-time image), based on this combining ratio. In this case, the image combining unit 712 performs positioning regarding the images output from the image processing unit 711 (normal imaged images, long-exposure-time images, and short-exposure-time images) by performing matching processing, and thereby can perform combining processing.

FIG. 25B illustrates an example of generating a panorama image using images generated by the imaging devices 112 and 704. Also, FIG. 25C illustrates an example of generating a panorama image using images generated by the imaging devices 112 and 703. Note that with the examples in FIGS. 25B and 25C, an image can be generated wherein the dynamic range has been expanded regarding only a portion of the panorama image. In this case, either imaging operation can be selected in accordance with the subject.

Example of Imaging Apparatus Having Auxiliary Cameras Capable of Turning in Direction Other than Horizontal Direction So far, description has been made regarding an example of generating panorama images using auxiliary cameras turnable in the horizontal direction. Now, in the event of generating panorama images of which the vertical direction is the longitudinal direction, generating panorama images using auxiliary cameras turnable in the vertical direction can be expected. Accordingly, in this example, an example of an imaging apparatus having auxiliary cameras capable of turning in a direction other than the horizontal direction is illustrated.

Figure 26A:
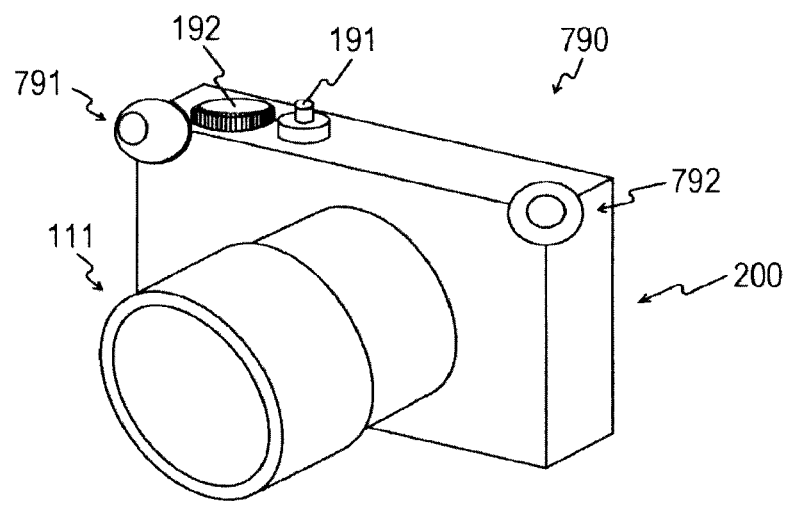
FIG. 26A is external configuration diagram showing an external view of an imaging apparatus according to the fourth embodiment of the present technology.
Figure 26B:
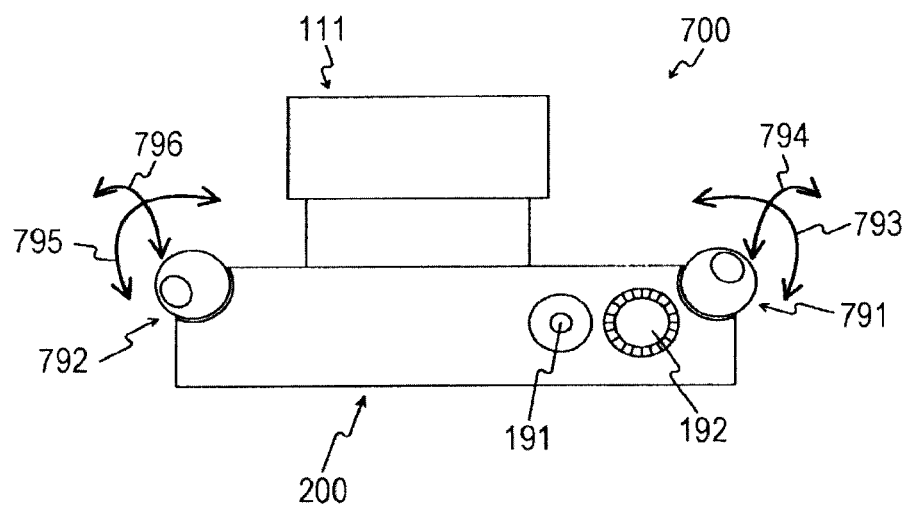
FIG. 26B is another external configuration diagram showing another external view of an imaging apparatus according to the fourth embodiment of the present technology.

FIGS. 26A and 26B are external configuration diagrams showing external views of the imaging apparatus 790 according to the fourth embodiment of the present technology. FIG. 26A is a perspective view illustrating the external view of the front side of an imaging apparatus 790. Also, FIG. 26B is an upper view illustrating the upper face of the imaging apparatus 790 (i.e., the face where the shutter button 191 and dial 192 are provided). Note that the imaging apparatus 790 is a partial modification of the imaging apparatus 700 shown in FIGS. 19A and 19B. Accordingly, in FIGS. 26A and 26B, parts which are the same as with the imaging apparatus 700 are denoted with the same reference numerals, and part of the description thereof will be omitted.

The imaging apparatus 790 has a right side lens unit 791 and a left side lens unit 792. The right side lens unit 791 and left side lens unit 792 are configured of multiple lenses which collect light from the subject (zoom lens, focusing lens, etc.), and are turnable in various directions (e.g., with the example in FIGS. 26A and 26B, the horizontal direction and vertical direction). For example, we will say that the right side lens unit 791 is turnable in the direction of the arrow 793 in the horizontal direction, and is turnable in the direction of the arrow 794 in the vertical direction. Also, we will say that the left side lens unit 792 is turnable in the direction of the arrow 795 in the horizontal direction, and is turnable in the direction of the arrow 796 in the vertical direction. Note that the right side lens unit 791 and left side lens unit 792 can be automatically moved in accordance with the image size, by a driving unit (not shown), under control of the control unit 713.

Thus, the fourth embodiment of the present technology can be applied to an imaging apparatus having auxiliary cameras turnable in directions other than the horizontal direction.

5. Modification

With the first through fourth embodiments, examples have been illustrated in which operation supporting images indicating a panorama image imaging range are displayed. This modification illustrates another display example of operation supporting images. Note that this modification is a partial modification of the imaging apparatus 100 shown in FIG. 1. Accordingly, with this modification, parts which are the same as with the imaging apparatus 100 are denoted with the same reference numerals, and part of the description thereof will be omitted. Also, with this modification, the message display region displayed in the operation supporting images will be omitted from illustration.

Example of Changing Color Outside Panorama Image Imaging Range

Figure 27A:
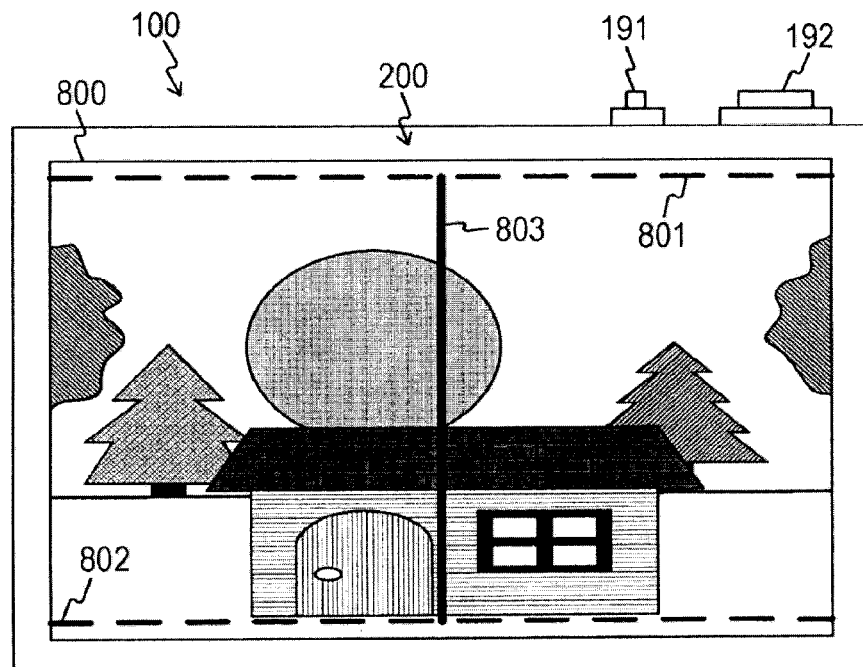
FIG. 27A is a diagram illustrating a display example of an operation assisting screen displayed on the imaging apparatus according to a modification of an embodiment of the present technology.
Figure 27B:
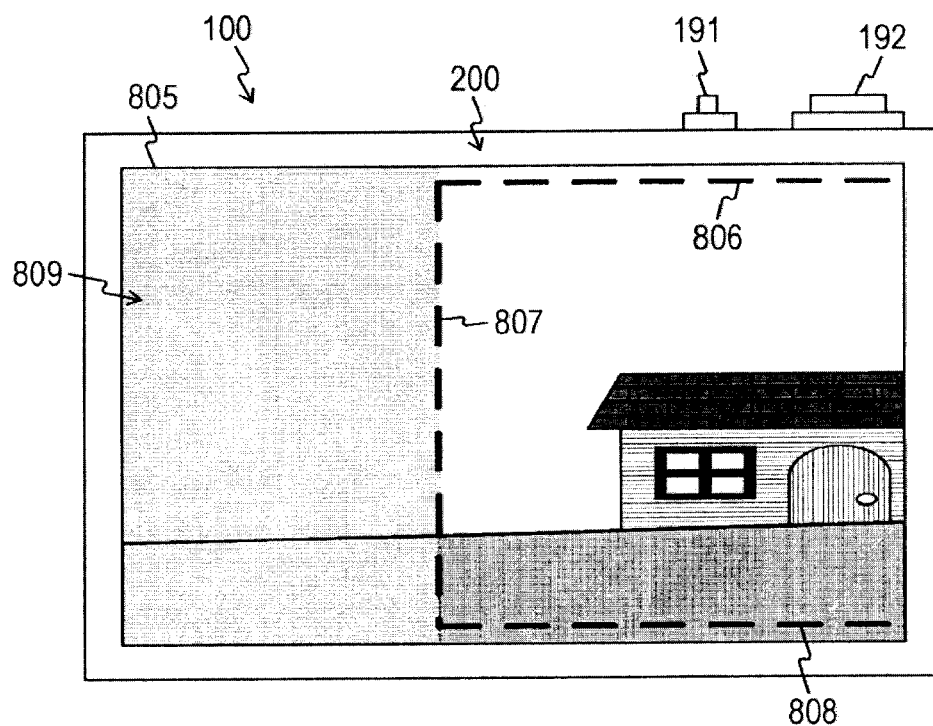
FIG. 27B is another diagram illustrating a display example of an operation assisting screen displayed on the imaging apparatus according to a modification of an embodiment of the present technology.

FIGS. 27A and 27B are diagrams illustrating a display example of an operation assisting screen displayed on the imaging apparatus 100 according to a modification of an embodiment of the present technology. FIG. 27A illustrates a display example of an operation assistant screen 800 displayed in the case of imaging a subject equivalent to the center position of the panorama image (center position in the swing direction). Note that the operation assistant screen 800 is generally the same as the operation assistant screen 320 illustrated in FIG. 7B and the operation assistant screen 610 illustrated in FIG. 18B, so description thereof will be omitted here.

FIG. 27B shows a display example of an operation assistant screen 805 displayed in a case where a subject equivalent to near the start position in the panorama image is to be imaged. With the example in FIG. 27B, a case is illustrated where the imaging apparatus 100 is swung past the start position in the panorama image. In this case, an operation supporting image 807 indicating the imaging range at the left end of the panorama image is displayed toward the middle of the screen.

Figure 28A:
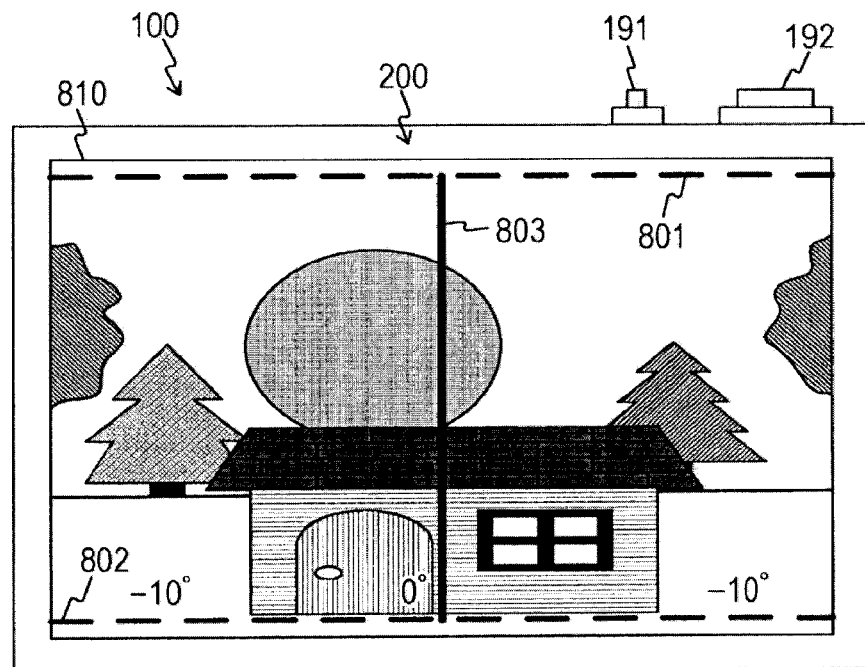
FIG. 28A is a diagram illustrating a display example of an operation assisting screen displayed on the imaging apparatus according to a modification of an embodiment of the present technology.
Figure 28B:
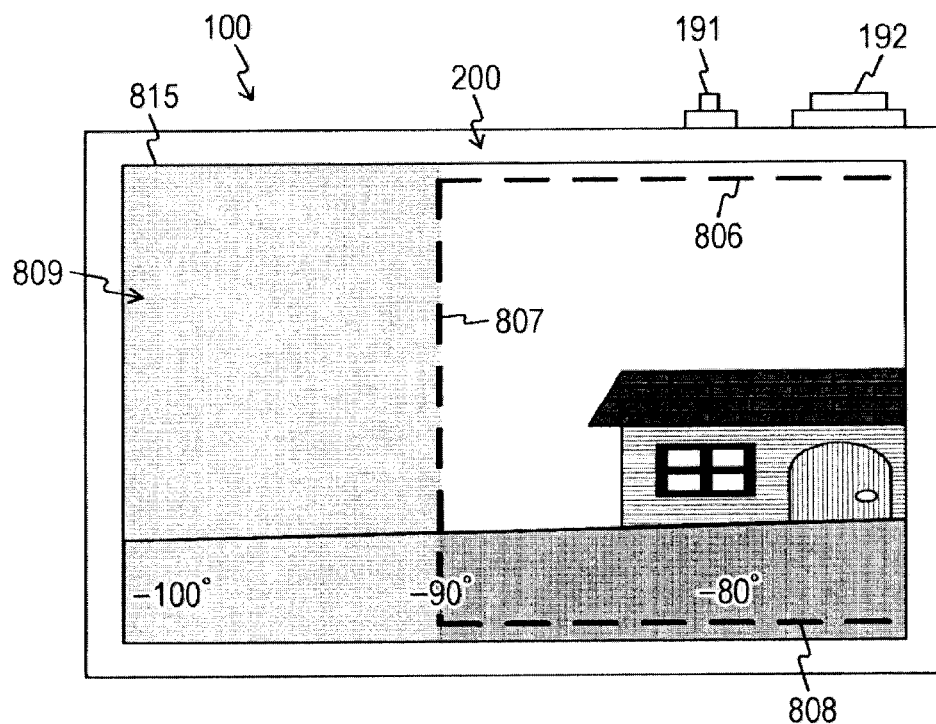
FIG. 28B is another diagram illustrating a display example of an operation assisting screen displayed on the imaging apparatus according to a modification of an embodiment of the present technology.

Also, with the display example in FIG. 27B, the color outside of the panorama image imaging range is changed. For example, a region 809 outside the panorama image imaging range may be made to be gray. Thus, by displaying with a different form, the user can be notified to the effect that the region 809 outside the panorama image imaging range is a region which is likely not to be included in the panorama image. Example of Displaying Angle of Panorama Image Imaging Range FIGS. 28A and 28B are diagrams illustrating a display example of an operation assisting screen displayed on the imaging apparatus 100 according to a modification of an embodiment of the present technology. FIGS. 28A and 28B illustrate an example of displaying angles corresponding to the panorama image imaging range.

FIGS. 28A and 28B illustrate a display example of operation assistant screens 810 and 815 where angles corresponding to the panorama image imaging range are displayed. An operation assistant screen 810 differs from the operation assistant screen 800 in FIG. 27A in that angles corresponding to the panorama image imaging range are displayed, but is generally the same as with the operation assistant screen 800 regarding other points. Also, an operation assistant screen 815 differs from the operation assistant screen 805 in FIG. 27B in that angles corresponding to the panorama image imaging range are displayed, but is generally the same as with the operation assistant screen 805 regarding other points. Accordingly, portions which are the same as with the operation assistant screens 800 and 805 will be described denoted with the same reference numerals.

Figure 29A:
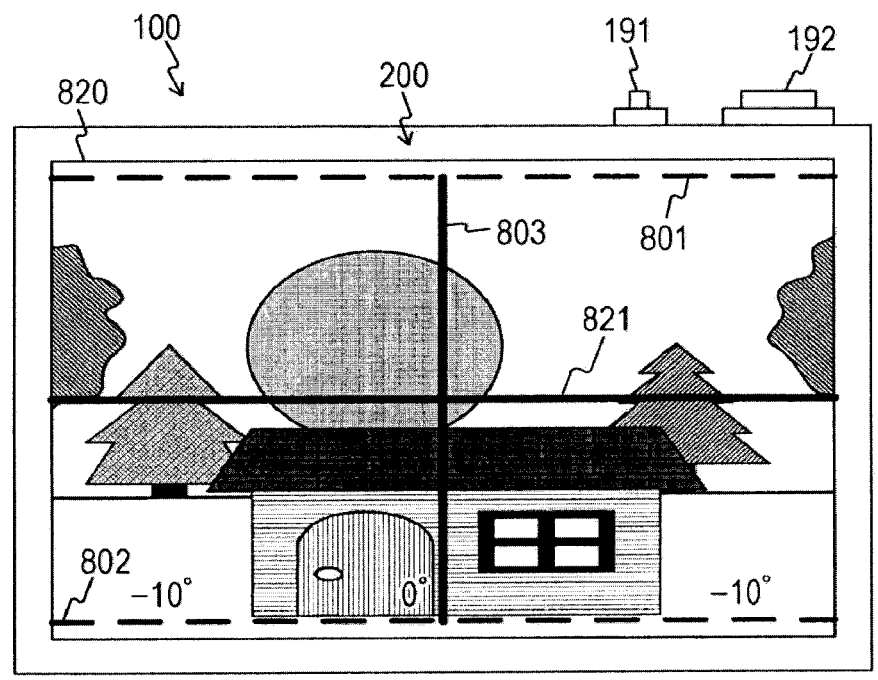
FIG. 29A is a diagram screen displayed on the imaging apparatus according to a modification of an embodiment of the present technology.
Figure 29B:
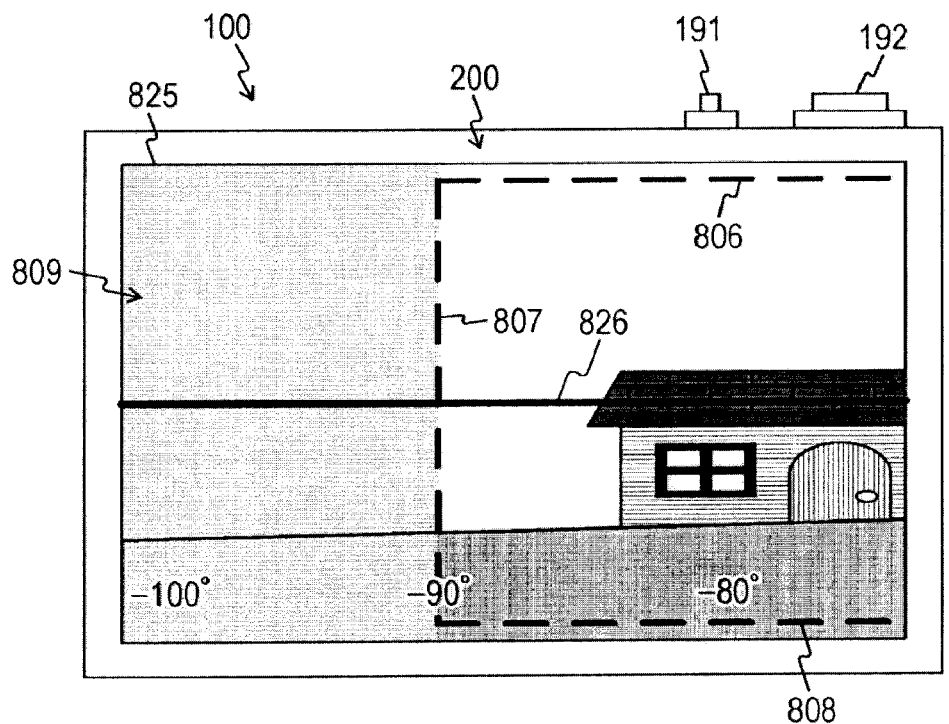
FIG. 29B is another diagram screen displayed on the imaging apparatus according to a modification of an embodiment of the present technology.

For example, angles corresponding to the panorama image imaging range are displayed along operation supporting images 802 and 808 at the lower portion. These angles are angles in the case of the center position of the panorama image being 0°. Thus, the user can easily comprehend an accurate imaging range by angles corresponding to the panorama image imaging range being displayed.
Example of Displaying Operation Supporting Image Showing Center of Panorama Image Imaging Range FIGS. 29A and 29B are diagrams illustrating a display example of an operation assisting screen displayed on the imaging apparatus 100 according to a modification of an embodiment of the present technology. FIGS. 29A and 29B show an example of displaying an operation supporting image indicating the center of the panorama image imaging range (center in the direction orthogonal to the swing direction).

FIGS. 29A and 29B illustrate a display example of operation assisting screens 820 and 825 indicating the center of the panorama image imaging range. An operation assistant screen 820 differs from the operation assistant screen 810 in FIG. 28A in that an operation supporting image 821 is displayed, but is generally the same as with the operation assistant screen 810 regarding other points. Also, an operation assistant screen 825 differs from the operation assistant screen 815 in FIG. 28B in that an operation supporting image 826 is displayed, but is generally the same as with the operation assistant screen 815 regarding other points. Accordingly, portions which are the same as with the operation assistant screens 810 and 815 will be described denoted with the same reference numerals.

Figure 30A:
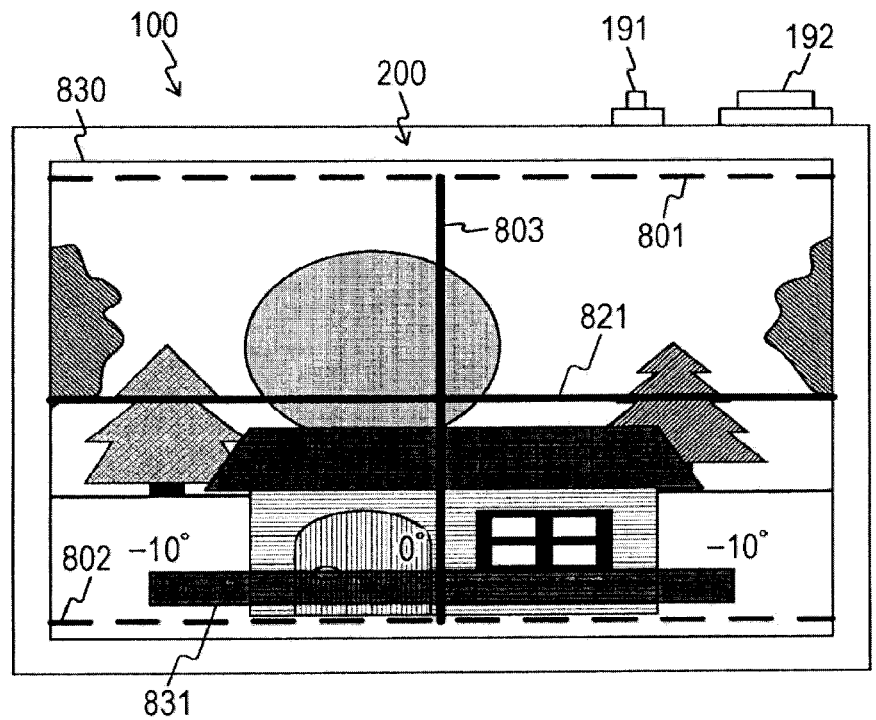
FIG. 30A is a diagram illustrating a display example of an operation assisting screen displayed on the imaging apparatus according to a modification of an embodiment of the present technology.
Figure 30B:
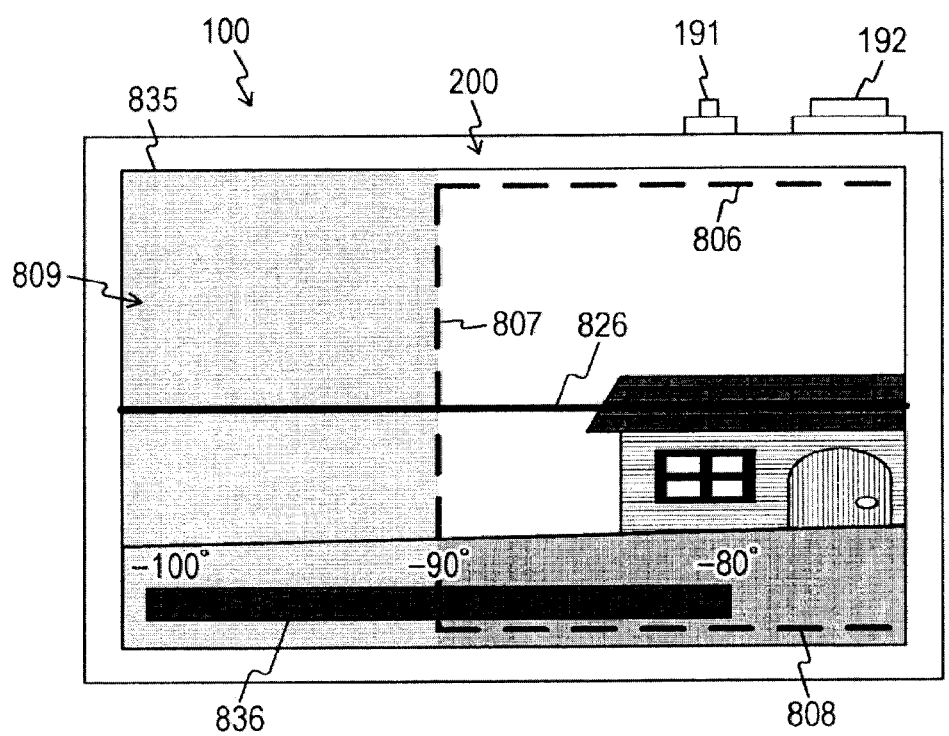
FIG. 30B is another diagram illustrating a display example of an operation assisting screen displayed on the imaging apparatus according to a modification of an embodiment of the present technology.

For example, in the event that the swing direction is the horizontal direction, the operation supporting images 821 and 826 indicating the center of the panorama image imaging range in the vertical direction. By thus displaying the operation supporting images 821 and 826, the user can easily comprehend the swing direction of the panorama image and the center of the panorama image imaging range in the vertical direction.
Example of Displaying Operation Supporting Image Indicating Predetermined Range from Reference Position in Panorama Image FIGS. 30A and 30B are diagrams illustrating a display example of an operation assisting screen displayed on the imaging apparatus 100 according to a modification of an embodiment of the present technology. FIGS. 30A and 30B show an example of displaying an operation supporting image indicating a predetermined range from the reference position in the panorama image. This reference position may be, for example, the center position of the panorama image, or an edge position of the panorama image.

FIGS. 30A and 30B illustrate a display example of operation assisting screens 830 and 835 where an operation supporting image indicating the predetermined range from the reference position in the panorama are displayed. An operation assistant screen 830 differs from the operation assistant screen 820 in FIG. 29A in that an operation supporting image 831 is displayed, but is generally the same as with the operation assistant screen 820 regarding other points. Also, an operation assistant screen 835 differs from the operation assistant screen 825 in FIG. 29B in that an operation supporting image 836 is displayed, but is generally the same as with the operation assistant screen 825 regarding other points. Accordingly, portions which are the same as with the operation assistant screens 820 and 825 will be described denoted with the same reference numerals.

Figure 31:
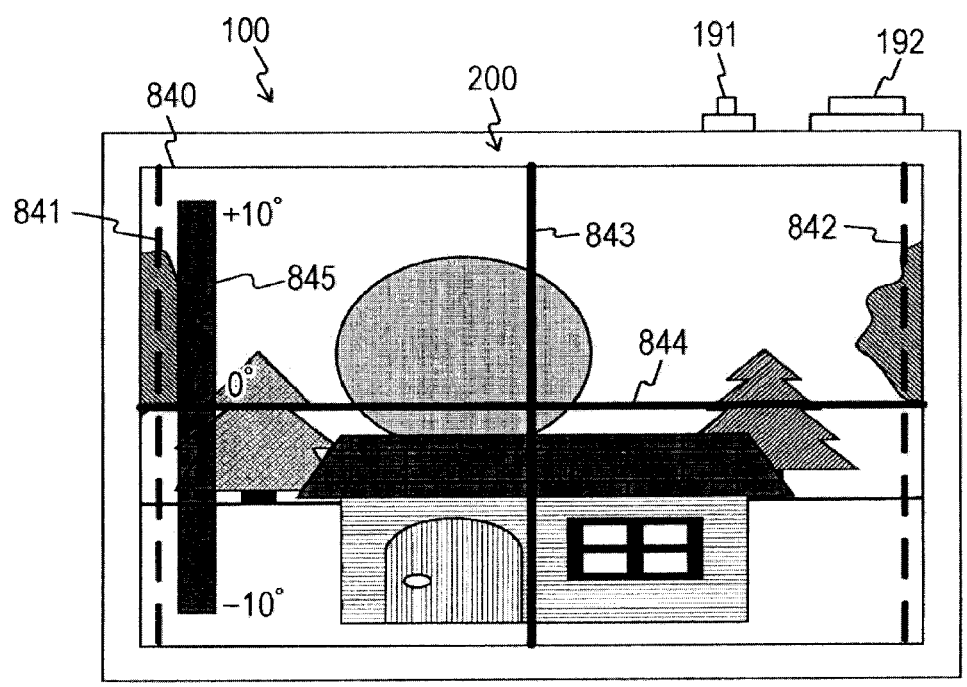
FIG. 31 is a diagram illustrating a display example of an operation assisting screen displayed on the imaging apparatus according to a modification of an embodiment of the present technology.

For example, as shown in FIG. 30A, the operation supporting image 831 indicating a predetermined range (e.g., ±10°) from a center position (the center position in the swing direction) in the panorama image is displayed. Also, for example, as shown in FIG. 30B, the operation supporting image 836 indicating a predetermined range (e.g., ±10°) from a left edge position (the left edge position in the swing direction) in the panorama image is displayed. Thus, by displaying the operation supporting images 831 and 836, the user can easily comprehend that this is a predetermined range from the reference position of the panorama image.
Display Example of Operation Supporting Image in Case that Swing Direction is Vertical Direction So far, display examples of operation supporting images have been illustrated with regard to cases where the swing direction is the horizontal direction. However, as described above, embodiments of the present technology can be applied to cases where the swing direction is the vertical direction, as well. Accordingly, FIG. 31 illustrates a display example of operation supporting images in a case where the swing direction is the vertical direction. FIG. 31 is a diagram illustrating a display example of an operation assisting screen displayed on the imaging apparatus 100 according to a modification of an embodiment of the present technology.

Note that an operation assisting screen 840 shown in FIG. 31 is the operation assisting screen 830 shown in FIG. 30A that has been changed to an operation assisting screen in a case that the swing direction is the vertical direction, and is generally the same as the operation assisting screen 830 other than this point. That is to say, the operation supporting images 841 through 845 correspond to the operation supporting images 801 through 803 and 821 and 831 shown in FIG. 30A.

Thus, by displaying various types of operation supporting images, panorama image imaging operations can be performed easily, and a panorama image according to user preferences can be easily generated. Also, these operation supporting images may be changeable by user operations. Accordingly, the user can perform panorama image imaging operations using operation supporting images according to user preferences.

Figure 32A:
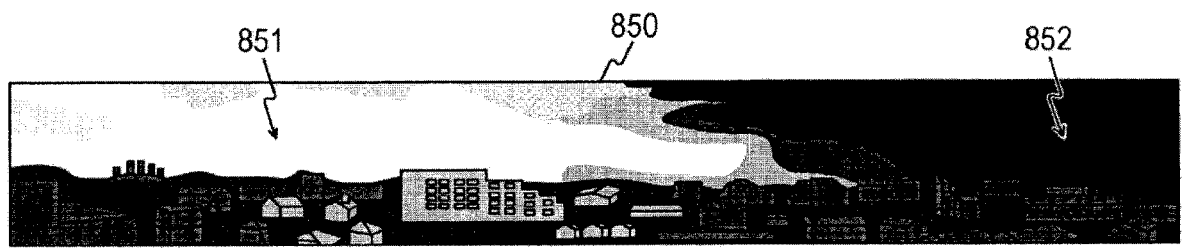
FIG. 32A is a diagram illustrating the relation between the imaging range of a panorama image generated by an imaging apparatus according to a modification of an embodiment of the present technology, and an imaging operation.
Figure 32B:
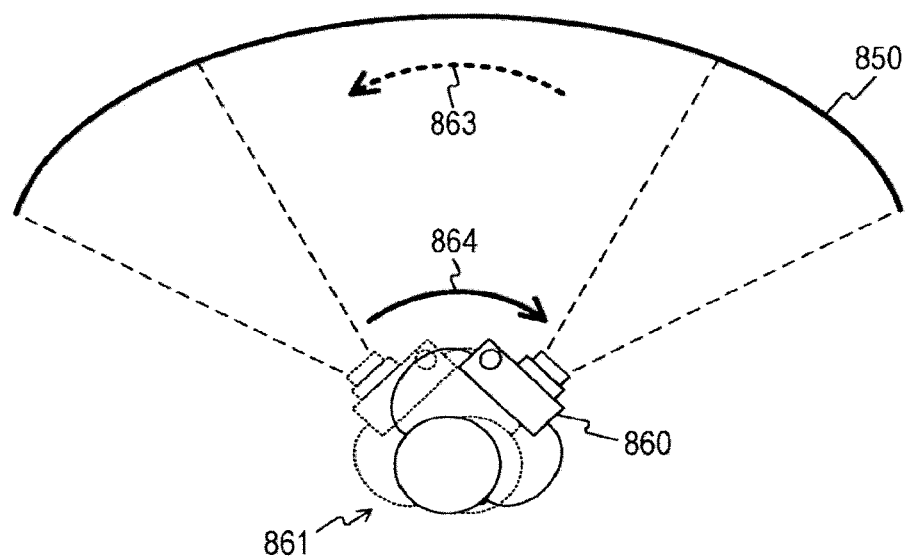
FIG. 32B is another diagram illustrating the relation between the imaging range of a panorama image generated by an imaging apparatus according to a modification of an embodiment of the present technology, and an imaging operation.

Example of Performing Exposure Control Using Information of Brightness from End Position to Start Position of Panorama Image Imaging Operation FIGS. 32A and 32B are diagrams illustrating the relation between the imaging range of a panorama image generated by an imaging apparatus 860 according to a modification of an embodiment of the present technology, and an imaging operation.

FIG. 32A shows a panorama image imaging range 850 in a case of generating a panorama image by an imaging apparatus 860, with a sunset scene as the subject. Generally, the imaging range of a panorama image is a relatively wide range, so relatively bright portions and relatively dark portions may coexist within the panorama image. For example, as illustrated in FIG. 32A, in the case of taking a panorama image with a sunset scene as the subject, a relatively bright portion (bright region 851) and a relatively dark portion (dark region 852) often coexist in the panorama image imaging range 850.

In such a case, the user 861 can be expected to find a portion in the panorama image imaging range 850 with brightness that is just right, and to perform exposure adjustment by manual operations. However, it can also be expected that finding a portion in the panorama image imaging range 850 with brightness that is just right will be difficult.

FIG. 32B illustrates the panorama image imaging operation in a case of generating a panorama image with an imaging apparatus 860. Now, with the first and second embodiments of the present technology, examples have been described wherein the imaging apparatus is moved from the end position to the start position of the panorama image imaging operation, and then the imaging apparatus is moved from the start position to the end position. That is to say, the imaging apparatus 860 makes one reciprocal movement between the start position and end position, as indicated by swing directions 863 and 864 in FIG. 32B. In this case, with a swing operation from the end position to the start position (swing direction 863), the imaging apparatus 860 can gather various types of information in the panorama image imaging range 850. Accordingly, with this modification, and example will be illustrated wherein brightness information of the panorama image imaging range 850 is gathered during the swinging of the imaging apparatus 860 from the end position to the start position of the panorama image imaging operation, and this obtained brightness information is used to automatically set the exposure for the panorama image.

For example, a brightness according to user preferences is set beforehand in a brightness setting screen. For example, in the event of including sky in the panorama image imaging range, the panorama image can often be made to look relatively beautiful by locking the exposure at a somewhat brighter portion. Accordingly, in the event of including sky in the panorama image imaging range, for example, settings can be made in which the exposure is locked at a somewhat brighter portion. In the event of performing a panorama image imaging operation in a case of exposure conditions having been set in this way, the imaging apparatus 860 automatically sets exposure based on the exposure conditions.

Also, let us assume that the imaging apparatus 860 is an imaging apparatus callable of setting multiple imaging modes (e.g., scenery mode, sunset mode, night lights mode, snow mode, beach mode, underwater mode). In this case, exposure of the panorama image can be automatically set using brightness information obtained from the panorama image imaging range 850, based on the imaging mode that has been set. Such settings allow a panorama image according to user preferences to be easily generated.

Example of Panorama Image Imaging Operation in a Case of Moving on a Straight Line With the first through fourth embodiments of the present technology, examples have been illustrated wherein the panorama image imaging operation is performed by the user performing a swing operation of the imaging apparatus with the position of the imaging apparatus as a reference. However, a case can be expected where a panorama image imaging operation is performed by moving the imaging apparatus along a straight line generally parallel to the subject, for example. Accordingly, an example of performing a panorama image imaging operation by moving the imaging apparatus along a straight line generally parallel to the subject will be described below.

Figure 33A:
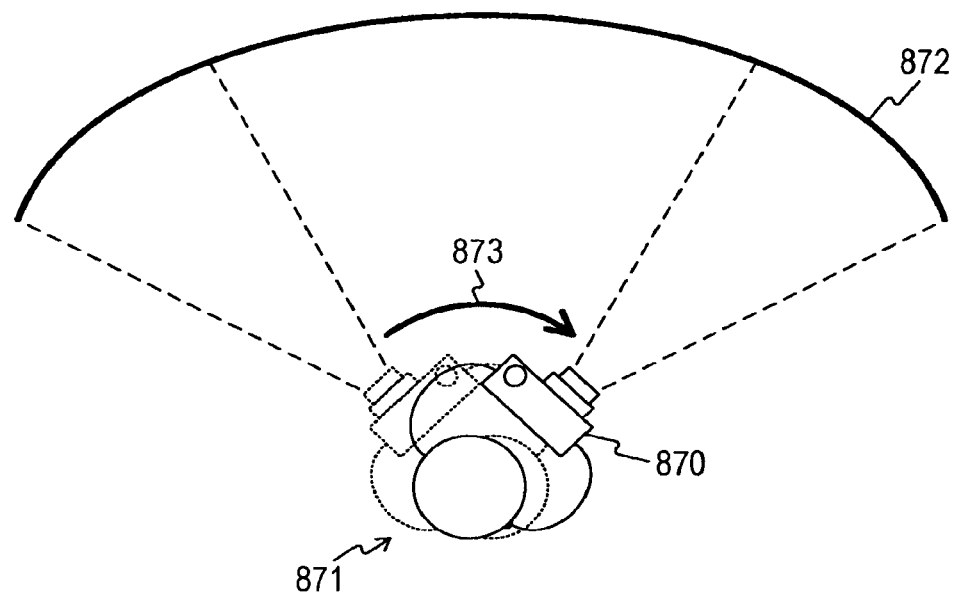
FIG. 33A is a diagram schematically illustrating an imaging operation performed at the time of generating a panorama image by an imaging apparatus according to a modification of an embodiment of the present technology.
Figure 33B:
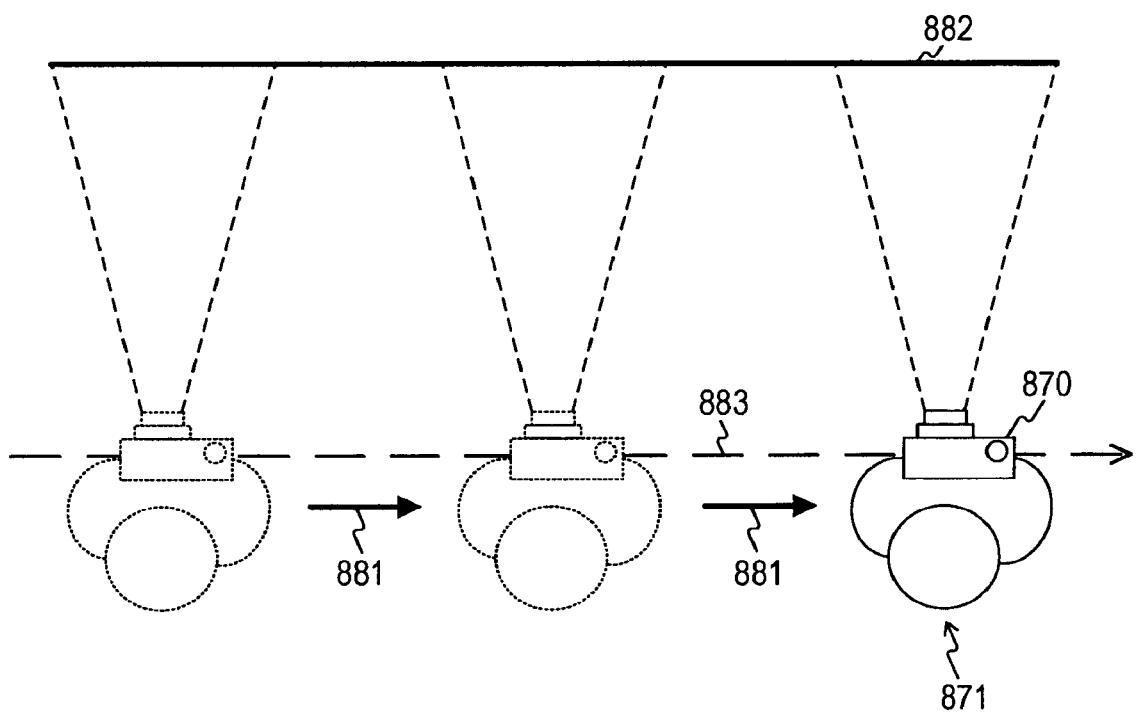
FIG. 33B is another diagram schematically illustrating an imaging operation performed at the time of generating a panorama image by an imaging apparatus according to a modification of an embodiment of the present technology.

FIGS. 33A and 33B are diagrams schematically illustrating an imaging operation performed at the time of generating a panorama image by an imaging apparatus 870 according to a modification of an embodiment of the present technology. FIG. 33A schematically illustrates a state of the imaging operation to generate a panorama image by rotating the imaging apparatus 870 in the horizontal direction (swing direction 873) with the position of the imaging apparatus 870 (position of user 871) as the center of rotation, as viewed from above. Also, in FIG. 33A, the panorama image imaging range of the panorama image generated by this imaging operation is schematically illustrated with a solid line as panorama image imaging range 872. Note that the example shown in FIG. 33A is the same as examples shown in the first through fourth embodiments, so description thereof will be omitted here.

FIG. 33B schematically illustrates an imaging operation to generate a panorama image by moving the imaging apparatus 870 along a straight line 883 generally parallel to the subject, as viewed from above. The imaging operation shown in FIG. 33B is, for example, a panorama image imaging operation performed using a moving device such as a vehicle or the like which can move at a constant speed, with the optical axis direction of the imaging apparatus 870 being orthogonal to the direction of movement 881 thereof.

For example, a vehicle which the user 871 is riding while holding the imaging apparatus 870 in the hands moves in the direction of movement 881 at a constant or changing speed. Also, in FIG. 33B, the panorama image imaging range of the panorama image generated by this imaging operation is schematically illustrated with a solid line as panorama image imaging range 882.

In this way, with the example shown in FIG. 33B, the position of the imaging apparatus 870 is sequentially changed along the straight line 883, so the distance traveled along the straight line is used as change in the attitude of the imaging apparatus 870, instead of rotational angle. Also, positions on the straight line are used for the start position and end position of the panorama image imaging operation.

Note that while examples of an imaging apparatus having an imaging unit have been described with the embodiments of the present technology, the embodiments of the present technology can be applied to an imaging apparatus of which the imaging unit is detachable.

Also, while examples of generating a panorama image by combining still images have been described with the embodiments of the present technology, the embodiments of the present technology can be applied to a case of generating a panorama image using moving images generated by moving image imaging operations. Also, the embodiments of the present technology can be applied to a case of generating a multi-view panorama image as well.

Also, the embodiments of the present technology can be applied to image processing devices such as a cellular phone with imaging functions, a personal digital terminal with imaging function, or the like.

Note that the above-described examples are examples of carrying out the present technology, and that there is correspondence between specific elements disclosed in the embodiments and the features in the claims. In the same way, there is correspondence between the features in the claims and specific elements disclosed in the embodiments bearing the same names. Note however, that the present technology is not restricted to the embodiments, and can be carried out by making various modifications to the embodiments without departing from the essence thereof.

Also, the processing procedures described in the above embodiments may also be understood to be a method having these series of procedures, and also may be understood to be a program causing a computer to execute these series of procedures and a recording medium to stored the program. Examples of this recording medium include CD (Compact Disc), MD (MiniDisc), DVD (Digital Versatile Disk), memory card, Blu-ray Disc (registered trademark), and so forth.

Also, the present technology may have the following configurations.

(1) An apparatus including:
a reference position receiving unit configured to receive intermediate or end panorama reference position information input by a user; and
a control unit configured to control an imaging device to begin generating a plurality of images to be used to generate a panoramic image based on the intermediate or end panorama reference position information input by the user after the reference position receiving unit receives the intermediate or end panorama reference position information.

(2) The apparatus according to (1), wherein the intermediate panorama reference position information includes a center position of the panorama image.

(3) The apparatus according to (1) or (2), further comprising: the imaging device configured to generate the plurality of images.

(4) The apparatus according to (1), wherein the end panorama reference position information includes a reference image, and the control unit controls the imaging device to end generating the plurality of images when a current image matches the reference image.

(5) The apparatus according to (1) to (4), further comprising: an attitude detecting unit configured to detect a current orientation of the apparatus.

(6) The apparatus according to (5), wherein the end panorama reference position information includes an end panorama reference position orientation, and the control unit ends generating the plurality of images when the current orientation matches the end panorama reference position orientation.

(7) The apparatus according to (5), wherein the control unit receives an image width from the user and determines a start point orientation based on the image width and the end panorama reference position information.

(8) The apparatus according to (5), wherein the intermediate panorama reference position information includes an intermediate panorama reference position orientation, and the control unit receives an image width from the user and determines a start point orientation and an end point orientation based on the image width and the intermediate panorama reference position orientation.

(9) The apparatus according to (1) to (8), wherein the control unit receives an image width from the user and determines a start point and an end point based on the image width and the intermediate panorama reference position information.

(10) The apparatus according to (3), wherein the imaging device includes a main imaging device and a sub imaging device.

(11) The apparatus according to (10), wherein the sub imaging device images an end panorama reference image, and the control device ends generating the plurality of images when a current image matches the end panorama reference position image.

(12) The apparatus according to (10), wherein the sub imaging device images a start panorama reference image, and the control device starts generating the plurality of images when a current image matches the start panorama reference position image.

(13) The apparatus according to (12), wherein the sub imaging device images an end panorama reference image, and the control device ends generating the plurality of images when a current image matches the end panorama reference position image.

(14) The apparatus according to (10), wherein the main imaging device images all of the plurality of images for the panoramic image.

(15) The apparatus according to (1) to (14), wherein the apparatus is a mobile phone, the mobile phone transmits the plurality of images to a server, and receives the panoramic image from the server.

(16) The apparatus according to (1) to (15), wherein the control unit is configured to control the imaging device to begin generating the plurality of images to be used to generate the panoramic image based on panorama reference position information for a plurality of reference points input by the user after the reference position receiving unit receives the panorama reference position information for the plurality of reference points.

(17) The apparatus according to (16), wherein the control unit receives the panorama reference position information for the plurality of reference points including at least a start point and a center point.

(18) The apparatus according to (1) to (17), wherein the control unit is configured to control the imaging device to begin generating the plurality of images to be used to generate the panoramic image based on an end panorama reference position image input by the user after the reference position receiving unit receives the end panorama reference position image, and to control the imaging device to end generating the plurality of images when a current image matches the end panorama reference position image.

(19) A method including:
receiving intermediate or end panorama reference position information input by a user; and
controlling an imaging device to begin generating a plurality of images to be used to generate a panoramic image based on the intermediate or end panorama reference position information input by the user after the reference position receiving unit receives the intermediate or end panorama reference position information.

(20) A non-transitory computer readable medium encoded with a program that, when loaded on a processor, causes the processor to perform a method including:
receiving intermediate or end panorama reference position information input by a user; and
controlling an imaging device to begin generating a plurality of images to be used to generate a panoramic image based on the intermediate or end panorama reference position information input by the user after the reference position receiving unit receives the intermediate or end panorama reference position information.

What is claimed is:

1. An image capturing apparatus, comprising:
a display; and
circuitry configured to
automatically set an intended direction in which images will be captured in order to generate a panorama image when an amount of movement of the image capturing apparatus with regard to a first direction is greater than an amount of movement of the image capturing apparatus with regard to a second direction different from the first direction after receiving a start instruction for a panorama image capturing operation by a user,
capture a plurality of images while the image capturing apparatus is moved in the intended direction by the user after the intended direction is set,
generate the panorama image using at least part of each of the plurality of images based on the intended direction, and
display the panorama image on the display.

2. The image capturing apparatus according to claim 1, wherein the panorama image capturing operation is performed according to a panorama image imaging mode set according to an imaging mode setting operation.

3. The image capturing apparatus according to claim 1, wherein the circuitry is further configured to cause the display to display a message to prompt a start position deciding operation for the panorama image imaging operation.

4. The image capturing apparatus according to claim 1, wherein the circuitry is further configured to cause the display to display a first image and a second image for supporting user operation with a live view (LV) image.

5. The image capturing apparatus according to claim 4, wherein the first and second image are superimposed on the LV image.

6. The image capturing apparatus according to claim 4, wherein the first image indicates a current operating position.

7. The image capturing apparatus according to claim 4, wherein the second image indicates a direction for swinging the image capturing apparatus.

8. The image capturing apparatus according to claim 7, wherein the second image is an arrow image.

9. The image capturing apparatus according to claim 4, wherein the circuitry is configured to erase the second image when the panorama image imaging operation is complete.

10. The image capturing apparatus according to claim 1, wherein the circuitry is configured to record the panorama image.

11. The image capturing apparatus according to claim 7, wherein the circuitry is configured to notify the user when the user does not properly perform swinging of the image capturing apparatus according to the direction for swinging the image capturing apparatus.

12. An image capturing method for an image capturing apparatus, comprising:
automatically setting, with processing circuitry, an intended direction in which images will be captured in order to generate a panorama image when an amount of movement of the image capturing apparatus with regard to a first direction is greater than an amount of movement of the image capturing apparatus with regard to a second direction different from the first direction after receiving a start instruction for a panorama image capturing operation by a user;
capturing, with the processing circuitry, a plurality of images while the image capturing apparatus is moved in the intended direction by the user after the intended direction is set;
generating, with the processing circuitry, the panorama image using at least part of each of the plurality of images based on the intended direction; and
displaying, with the processing circuitry, the panorama image on a display of the image capturing apparatus.

13. A non-transitory computer-readable medium encoded with computer-readable instructions that, when executed by processing circuitry of an image capturing apparatus, causes the processing circuitry to perform a method comprising:
automatically setting an intended direction in which images will be captured in order to generate a panorama image when an amount of movement of the image capturing apparatus with regard to a first direction is greater than an amount of movement of the image capturing apparatus with regard to a second direction different from the first direction after receiving a start instruction for a panorama image capturing operation by a user;
capturing a plurality of images while the image capturing apparatus is moved in the intended direction by the user after the intended direction is set;
generating the panorama image using at least part of each of the plurality of images based on the intended direction; and
displaying the panorama image on a display of the image capturing apparatus.

* * * * *